(12) United States Patent
Gillingham et al.

(10) Patent No.: US 8,951,321 B2
(45) Date of Patent: Feb. 10, 2015

(54) PULSE JET AIR CLEANER COMPONENTS; FEATURES; ASSEMBLIES; AND, METHODS

(75) Inventors: Gary Ray Gillingham, Prior Lake, MN (US); Fred H. Wahlquist, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 1902 days.

(21) Appl. No.: 11/887,657

(22) PCT Filed: Mar. 30, 2006

(86) PCT No.: PCT/US2006/012071
§ 371 (c)(1),
(2), (4) Date: Oct. 12, 2009

(87) PCT Pub. No.: WO2006/105438
PCT Pub. Date: Oct. 5, 2006

(65) Prior Publication Data
US 2010/0031616 A1    Feb. 11, 2010

Related U.S. Application Data

(60) Provisional application No. 60/666,781, filed on Mar. 31, 2005, provisional application No. 60/678,092, filed on May 5, 2005.

(51) Int. Cl.
*B01D 46/00* (2006.01)
*B01D 46/24* (2006.01)
*B01D 46/12* (2006.01)
(Continued)

(52) U.S. Cl.
CPC ........ *B01D 46/2414* (2013.01); *B01D 46/0005* (2013.01); *B01D 46/0068* (2013.01); *B01D 46/125* (2013.01); *B01D 46/4227* (2013.01); *B01D 46/52* (2013.01); *F02M 35/08* (2013.01);
(Continued)

(58) Field of Classification Search
USPC ........... 55/302, 283, 290, 294, 498, 502, 529, 55/385.1, 357; 95/278, 279, 280; 210/411, 210/412, 493.1, 333.01, 791, 797, 798; 60/312, 336
See application file for complete search history.

(56) References Cited

U.S. PATENT DOCUMENTS

| | | |
|---|---|---|
| 710,624 A | 12/1902 | Sly |
| 2,044,221 A | 6/1936 | Myers et al. |

(Continued)

FOREIGN PATENT DOCUMENTS

| | | |
|---|---|---|
| DE | 296 13 098 | 10/1996 |
| FR | 2473348 | 7/1981 |
| WO | WO 2004/052504 A2 | 6/2004 |

OTHER PUBLICATIONS

Exhibit B, EP Search Report and Written Opinion corresponding to application EP 11177547.
(Continued)

*Primary Examiner* — Duane Smith
*Assistant Examiner* — Minh-Chau Pham
(74) *Attorney, Agent, or Firm* — Merchant & Gould P.C.

(57) ABSTRACT

According to the present disclosure a pulse jet air cleaner components, features and assemblies are described, as well as methods of use. Preferred v-pack configurations, scavenge arrangements, pulse jet arrangements and filter cartridge retention arrangements, are shown and described, for example.

14 Claims, 38 Drawing Sheets

(51) Int. Cl.
 *B01D 46/42* (2006.01)
 *B01D 46/52* (2006.01)
 *F02M 35/08* (2006.01)

(52) U.S. Cl.
 CPC ..... *B01D 2265/025* (2013.01); *B01D 2271/022* (2013.01)
 USPC .............................................. 55/302; 55/484

(56) References Cited

U.S. PATENT DOCUMENTS

| | | |
|---|---|---|
| 2,329,356 A | 11/1943 | Moore |
| 2,853,153 A | 9/1958 | Sexton |
| 2,966,959 A | 1/1961 | Neumann |
| 3,166,391 A | 1/1965 | Keser |
| 3,383,841 A | 5/1968 | Olson et al. |
| 3,393,498 A | 7/1968 | Shoen |
| 3,402,531 A | 9/1968 | Farr |
| 3,423,908 A | 1/1969 | Hart |
| 3,434,269 A | 3/1969 | Hyatt |
| 3,507,100 A | 4/1970 | Neumann |
| 3,576,095 A | 4/1971 | Rivers |
| 3,593,503 A | 7/1971 | Andrews |
| 3,691,736 A | 9/1972 | Neumann |
| 3,816,984 A | 6/1974 | Neumann |
| 3,870,489 A | 3/1975 | Shaddock |
| 3,999,964 A | 12/1976 | Carr |
| 4,002,443 A | 1/1977 | Lorenz |
| 4,009,011 A | 2/1977 | Ross |
| 4,124,361 A | 11/1978 | Revell |
| 4,127,457 A | 11/1978 | Hirozawa et al. |
| 4,129,429 A | 12/1978 | Humbert et al. |
| 4,204,846 A | 5/1980 | Brenholt |
| 4,214,882 A | 7/1980 | Brenholt |
| 4,217,122 A | 8/1980 | Shuler |
| 4,225,328 A | 9/1980 | Stiehl |
| 4,233,044 A | 11/1980 | Allan |
| 4,242,115 A | 12/1980 | Harold et al. |
| 4,247,315 A | 1/1981 | Neümann |
| 4,251,246 A | 2/1981 | Andreychek |
| 4,266,953 A | 5/1981 | Matthys et al. |
| 4,266,956 A | 5/1981 | Revell |
| 4,272,262 A | 6/1981 | Britt et al. |
| 4,290,792 A | 9/1981 | Eckstein et al. |
| 4,298,474 A | 11/1981 | Sillers, Jr. |
| 4,299,597 A | 11/1981 | Oetiker et al. |
| 4,303,423 A | 12/1981 | Camplin et al. |
| 4,306,896 A | 12/1981 | O'Dell |
| 4,322,231 A | 3/1982 | Hilzendeger et al. |
| 4,323,376 A | 4/1982 | Rosenquest |
| 4,331,459 A | 5/1982 | Copley |
| 4,334,900 A | 6/1982 | Neumann |
| 4,359,330 A | 11/1982 | Copley |
| 4,364,251 A | 12/1982 | Nishihara et al. |
| 4,395,269 A | 7/1983 | Schuler |
| 4,407,664 A | 10/1983 | Sillers, Jr. |
| 4,411,674 A | 10/1983 | Forgac |
| 4,452,616 A | 6/1984 | Gillingham et al. |
| 4,482,365 A | 11/1984 | Roach |
| 4,482,366 A | 11/1984 | Camplin et al. |
| 4,498,914 A | 2/1985 | Erickson |
| 4,504,293 A | 3/1985 | Gillingham et al. |
| 4,509,960 A | 4/1985 | Engel |
| 4,514,193 A | 4/1985 | Booth |
| 4,537,608 A | 8/1985 | Koslow |
| 4,560,396 A | 12/1985 | O'Dell |
| RE32,185 E | 6/1986 | Copley |
| 4,622,995 A | 11/1986 | Gillingham |
| 4,637,825 A | 1/1987 | Howeth |
| 4,650,506 A | 3/1987 | Barris et al. |
| 4,743,280 A | 5/1988 | Pappas |
| 4,746,340 A | 5/1988 | Durre et al. |
| 4,765,810 A | 8/1988 | Wetzel |
| 4,767,425 A | 8/1988 | Camplin et al. |
| 4,786,293 A | 11/1988 | Labadie |
| 4,822,386 A | 4/1989 | Duchesneau |
| 4,871,380 A | 10/1989 | Meyers |
| 4,895,581 A | 1/1990 | Starling |
| 4,904,282 A | 2/1990 | Stuble et al. |
| 4,925,468 A | 5/1990 | Kishi et al. |
| 4,961,762 A | 10/1990 | Howeth |
| 5,013,333 A | 5/1991 | Beaufoy et al. |
| 5,042,999 A | 8/1991 | Ernst et al. |
| 5,094,675 A | 3/1992 | Pitt et al. |
| 5,117,899 A * | 6/1992 | Skimehorn .................. 165/48.1 |
| 5,174,797 A | 12/1992 | Yow, Sr. et al. |
| 5,207,811 A | 5/1993 | Buonpastore |
| 5,223,011 A | 6/1993 | Hanni |
| 5,273,563 A | 12/1993 | Pasch et al. |
| 5,305,493 A | 4/1994 | Prenn |
| 5,346,533 A | 9/1994 | Jelich et al. |
| 5,391,218 A | 2/1995 | Jorgenson et al. |
| 5,401,285 A | 3/1995 | Gillingham et al. |
| 5,505,754 A | 4/1996 | Gasser |
| 5,512,074 A | 4/1996 | Hanni et al. |
| 5,562,746 A | 10/1996 | Raether |
| 5,575,826 A | 11/1996 | Gillingham et al. |
| 5,616,171 A | 4/1997 | Barris et al. |
| 5,622,537 A | 4/1997 | Kahlbaugh et al. |
| 5,656,049 A | 8/1997 | Diachuk |
| 5,669,947 A | 9/1997 | Diachuk |
| 5,672,399 A | 9/1997 | Kahlbaugh et al. |
| 5,683,479 A | 11/1997 | Gillingham et al. |
| 5,693,109 A | 12/1997 | Coulonvaux et al. |
| 5,755,842 A | 5/1998 | Patel et al. |
| 5,797,973 A | 8/1998 | Dudrey et al. |
| 5,803,954 A | 9/1998 | Gunter et al. |
| 5,830,249 A | 11/1998 | Hori et al. |
| 5,863,313 A | 1/1999 | Coulonvaux |
| 5,897,676 A | 4/1999 | Engel et al. |
| 5,931,988 A | 8/1999 | LeBlanc et al. |
| 6,090,173 A | 7/2000 | Johnson et al. |
| 6,113,674 A | 9/2000 | Graham et al. |
| 6,129,852 A | 10/2000 | Elliott et al. |
| 6,235,195 B1 | 5/2001 | Tokar |
| 455,826 A1 | 4/2002 | Gillingham et al. |
| 6,485,538 B1 | 11/2002 | Toyoshima |
| 6,517,919 B1 | 2/2003 | Griffin |
| 6,605,131 B2 | 8/2003 | Vanderveen et al. |
| 6,676,721 B1 | 1/2004 | Gillingham et al. |
| 6,872,237 B2 | 3/2005 | Gillingham et al. |
| 6,908,494 B2 | 6/2005 | Gillingham et al. |
| 7,090,711 B2 | 8/2006 | Gillingham et al. |
| 7,195,659 B2 * | 3/2007 | Sporre et al. .................... 55/302 |
| 7,282,075 B2 * | 10/2007 | Sporre et al. .................... 55/302 |
| 7,585,343 B2 * | 9/2009 | Clements ....................... 55/302 |
| 7,967,898 B2 * | 6/2011 | Sporre et al. .................... 95/280 |
| 8,021,455 B2 * | 9/2011 | Adamek et al. ................. 55/486 |
| 2006/0150589 A1 * | 7/2006 | Crow .............................. 55/357 |
| 2011/0308211 A1 * | 12/2011 | Bader et al. ..................... 55/497 |

OTHER PUBLICATIONS

Exhibit C, Declaration of Randall A. Engelland and Charles D. Jensen of Jun. 29, 2012.

Declaration of Randy Engelland and Chuck Jensen dated Nov. 27, 2013.

* cited by examiner

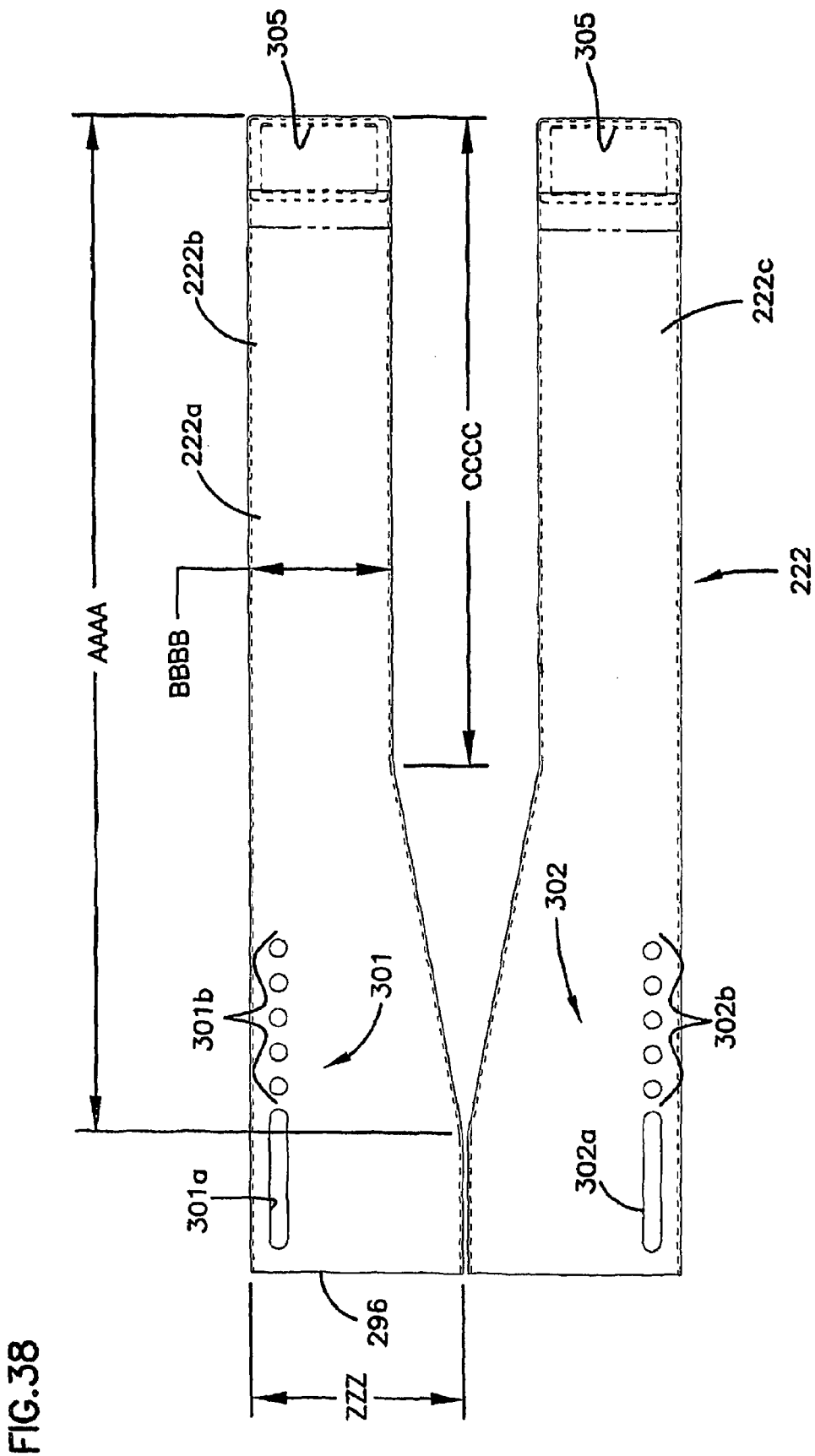

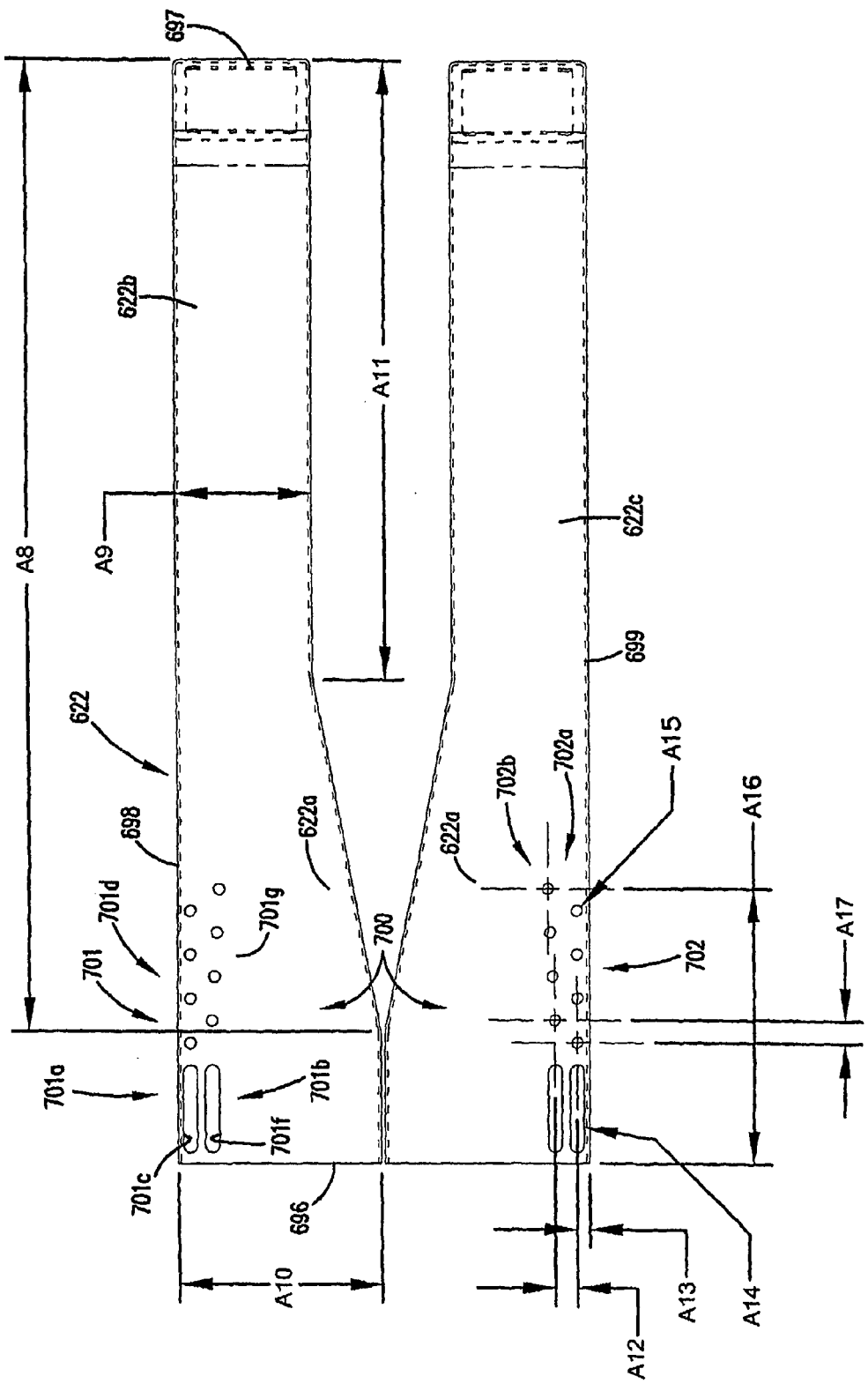

US 8,951,321 B2

PULSE JET AIR CLEANER COMPONENTS; FEATURES; ASSEMBLIES; AND, METHODS

This application is being filed on 28 Sep. 2007, as a National Stage of PCT International Patent application No. PCT/US2006/012071, filed on 30 Mar. 2006, incorporated herein by reference in the name of Donaldson Company, Inc., a U.S. national corporation, applicant for the designation of all countries except the U.S., and Gary Ray Gillingham and Fred H. Wahlquist, both citizens of the U.S., applicants for the designation of the U.S. only, and a claim of priority to U.S. Provisional Patent Application Ser. Nos. 60/666,781, filed Mar. 31, 2005, and 60/678,092, filed May 5, 2005 is made to the extent appropriate. U.S. 60/666,781 and 60/678,092 are incorporated herein by reference.

FIELD OF THE DISCLOSURE

The present disclosure relates to air cleaners. It particularly concerns features of air cleaner arrangements configured for pulse jet cleaning operation. Specific advantageous features, overall assemblies and methods are described.

BACKGROUND OF THE DISCLOSURE

Various equipment is operated by internal combustion engines, such as diesel engines. Such equipment is often designed to be operated in particularly severe environments. Examples are: military vehicles such as tanks, armored vehicles or transport construction equipment; and, agricultural, construction and mining equipment. In such environments, combustion air drawn from the environment and directed into the engine, can contain substantial particulate contaminant therein. Air cleaners are used for removal of this contaminant. Typical air cleaners utilize a filter having filter media therein, through which the intake air is directed. Particulates are deposited on or in the filter media.

In some instances, precleaners, for example cyclonic precleaners, are used before the air is directed into the barrier media. An example of such an arrangement is described in U.S. Pat. No. 5,575,826 incorporated herein by reference.

In some instances, the filter media is contained within a serviceable filter cartridge. By the term "serviceable" in this context, it is meant that the filter cartridge is of a design that is to be removed from, and be replaced in, the air cleaner, in time.

In order to extend the service lifetime for the filter cartridge, and to maintain equipment performance, in some instances it is desirable to provide for periodic cleaning of the serviceable filter cartridge, without removal of the serviceable filter cartridge from the air cleaner. This can be conducted with a pulse jet cleaning system. Examples of such systems are described in U.S. Pat. Nos. 5,575,826 and 6,676,721, incorporated herein by reference. In general with such assemblies, pulse air flow is selectively intermittently directed through selected portions of a filter cartridge, to eject collected dust from the filter cartridge. The ejected dust falls to a bottom of the air cleaner, to be scavenged therefrom by a scavenge system.

Improvements in such assemblies are generally desirable.

SUMMARY OF THE INVENTION

According to the present disclosure, selected pulse jet air cleaner systems and components and assemblies for use in pulse jet air cleaner systems are shown. The systems include features that provide for efficient pulse jet cleaning of cartridges that have fairly narrow long v-pack assemblies, for example. Also preferred scavenger arrangements or preferred features of scavenger arrangements are shown, for efficient scavenging of pulse jet air cleaners. A variety of specific, advantageous features for use in such assemblies are provided, as well as methods of use.

It is not a requirement that all of the advantageous features described herein, be incorporated in any given pulse jet air cleaner system, for the air cleaner system to be provided with some advantage according to the present disclosure.

BRIEF DESCRIPTION OF THE DRAWINGS

FIG. 3 being toward an opposite end of that viewable in FIG. 2 and showing the assembly with a precleaner removed.

FIG. 8 being taken generally orthogonal to the view of FIG. 11.

in FIG. 19 the biasing and lock mechanism being shown in an unlocked orientation and with a filter cartridge operably positioned therein.

FIG. 38 is an enlarged view of a portion of FIG. 37.

FIG. 38A is a view analogous to FIG. 38, but showing the alternate scavenge aperture arrangement of FIG. 24A.

DETAILED DESCRIPTION

I. The Assembly of FIGS. 1-22

A. General Air Cleaner Assembly and Operation, FIGS. 1-2.

Figure 1:
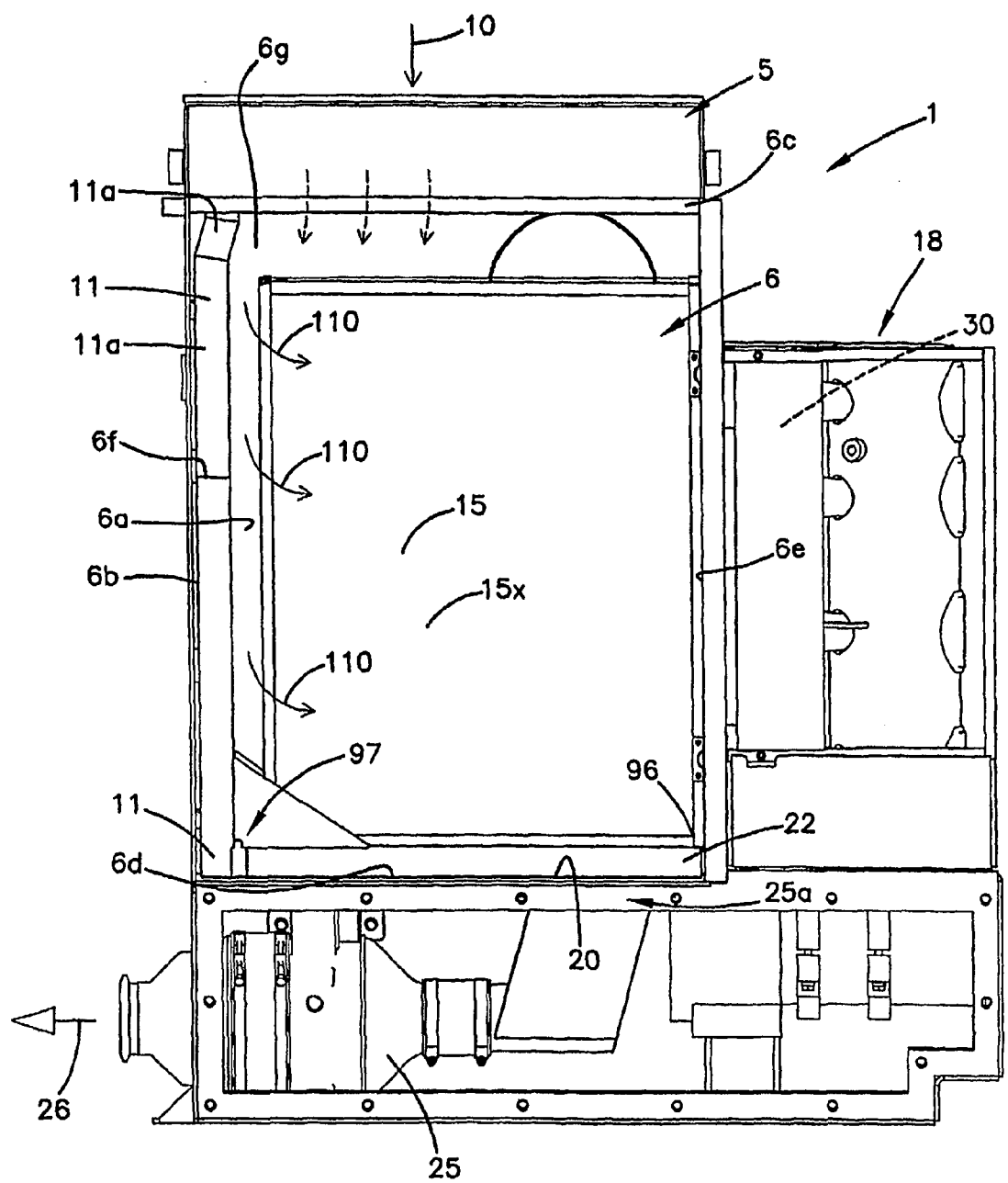
FIG. 1 is a schematic side elevational view of a first air cleaner system or assembly according to the present disclosure; the assembly in FIG. 1 being shown with a side panel and certain other componentry removed, to provide a viewing of internal detail.

The reference numeral 1, FIG. 1, generally indicates an air cleaner assembly including selected features according to the present disclosure. The air cleaner assembly 1 comprises a precleaner stage 5 and a barrier filter stage 6. In FIG. 1, assembly 1 is shown with a side panel facing the viewer removed, so that selected internal structure can be viewed. FIG. 1 is schematic. For the particular assembly 1 depicted, the precleaner stage 5 is positioned above the barrier stage 6, although alternatives are possible in alternate assemblies using the selected principles according to the present disclosure.

In operation, air enters precleaner stage 5 in the direction indicated by arrow 10. The precleaner stage 5 would typically comprise a frame or housing including a plurality of cyclonic separators such as, for example, described in U.S. Pat. Nos. 4,008,059; 4,050,913; 4,289,611; 3,448,563; 3,713,280; 4,985,058; and, 4,976,748, the complete disclosures of these seven references being incorporated herein by reference. Such separators will generally cause separation of some dust or other particulate material under centrifugal force. The dust is then removed from precleaner stage 5, by upper or precleaner scavenger portion 11a of scavenger system 11. Partially cleaned air from the precleaner stage 5 is then directed into interior 6a of barrier filter stage 6.

For the example equipment depicted, the precleaner 5 is removable from barrier filter stage 6. In this manner service access is provided to an interior 6a of barrier filter stage 6, through an upper end provided when precleaner 5 is removed. The barrier filter stage 6 can be viewed as comprising a housing 6b having: a top 6c, a bottom 6d; a first air flow outlet end 6e; and opposite, second, end 6f. There is also provided side panel 6g and an opposite side panel, removed for viewing in FIG. 1 but shown generally in FIG. 2 at 6h. As a result, barrier filter stage 6 can be viewed as a sub housing or a barrier filter housing.

In FIG. 1, serviceable filter cartridge 15 is operably positioned within interior 6a of barrier filter stage 6. The typical filter cartridge 15 has a v-pack shape described in greater detail below. Examples of v-packs but with different specific features are generally shown and described in U.S. Pat. Nos. 6,676,721 and Des. 455,826, incorporated herein by reference. The particular filter cartridge 15 has certain unique v-pack filter dimensions and configurations discussed in greater detail below. Filter cartridge 15 is generally configured for "out-to-in" flow, during filtering. That means that the air flow would generally pass through filter media portions of the cartridge 15, in a direction from exterior 15x of the cartridge 15, to an interior 15i, FIG. 9, of the cartridge 15, during filtering.

The assembly 1 includes a pulse jet assembly or arrangement 18. The pulse jet assembly or arrangement 18 is configured to direct selected jet pulses of air through the filter cartridge 15, in a direction generally opposite to normal filtering flow, i.e., directed in-to-out with respect to direction of flow through the media. Such jet pulses can be directed to knock affected dust or other particulates off of the exterior 15x of the filter cartridge 15, and into bottom region 20 of barrier filter stage 6. From here the dust or other particulates is removed by a barrier filter stage scavenge arrangement, or lower scavenger arrangement 22 of scavenger system 11. A blower arrangement for operation of the upper scavenge portion 11a and lower scavenge arrangement 22 is indicated generally at 25, with the scavenger outlet or exhaust shown at arrow 26. A blower takeoff from the lower scavenge arrangement 22 is shown at 25a, at a location closer to end 6e than end 6f.

Figure 2:
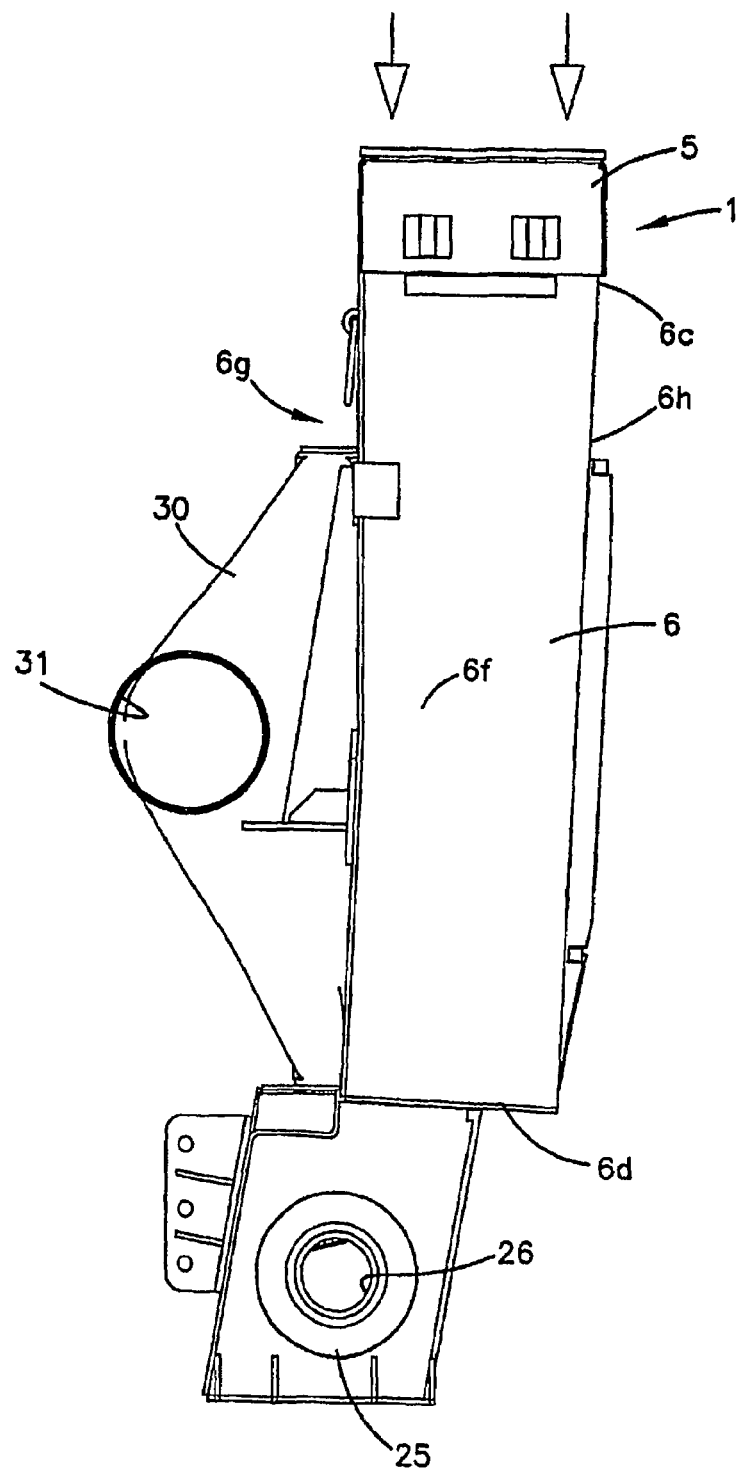
FIG. 2 is an end elevational view of the assembly depicted in FIG. 1.

Still referring to FIG. 1, air which is filtered by passage through filter cartridge 15 is generally directed into clean air plenum 30, Referring to FIG. 2, the clean air passes from plenum 30 outwardly from air cleaner 1, through outlet 31. From there, it can be directed to a turbo intake, engine intake, etc., as needed and appropriate for the system involved.

It is noted that the particular assembly 1 depicted in FIG. 1 is configured to receive and utilize a single v-pack filter cartridge 15. Principles according to the present disclosure could be applied in alternate arrangements, which include more than one v-filter filter cartridge.

B. The Pulse Jet and V-Pack Arrangements Generally, FIGS. 3-9.

Figure 3:
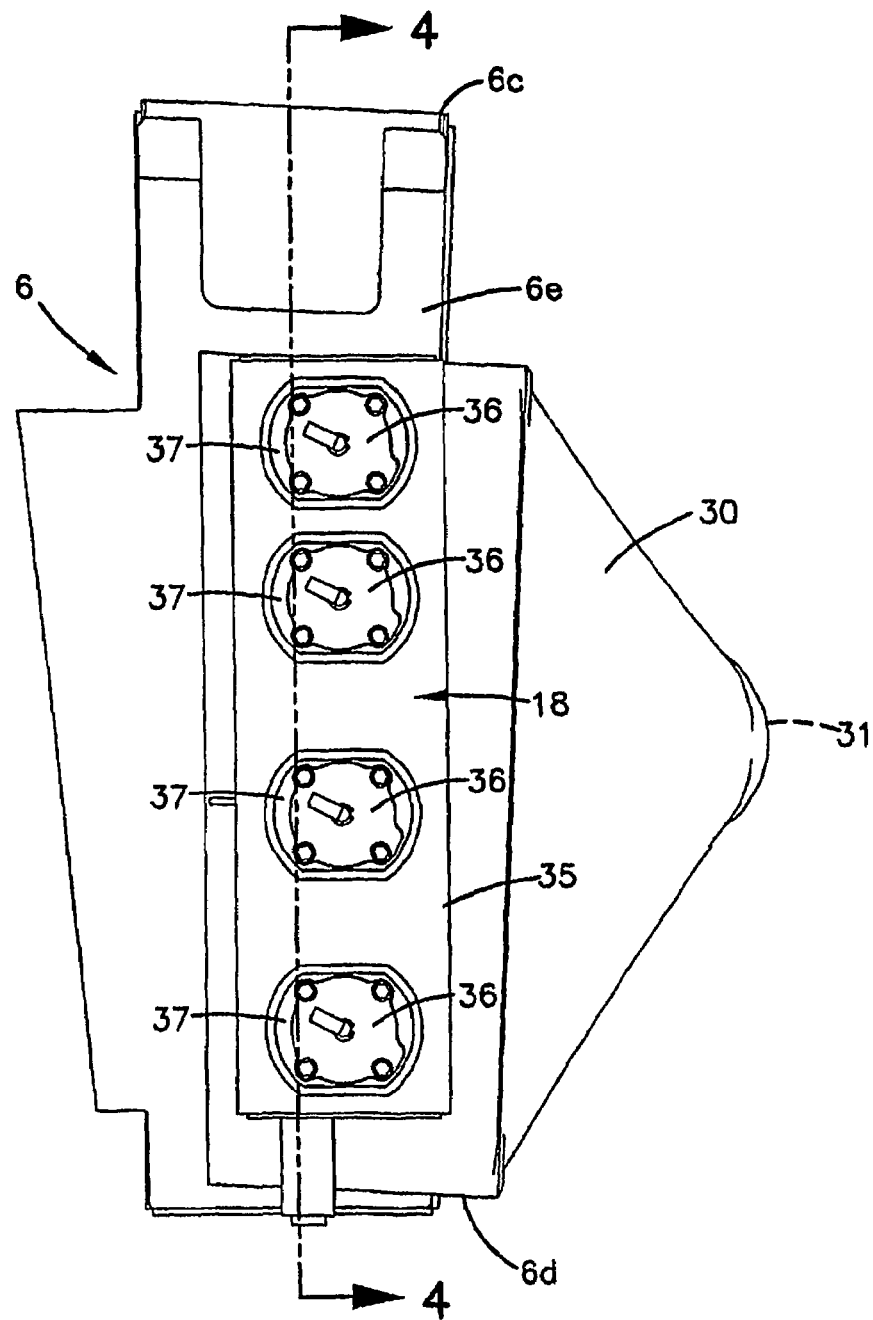
FIG. 3 is a second end elevational view of the assembly depicted in FIG. 1.

In FIG. 3, an opposite end view to the end view of FIG. 2 is depicted. Here the air cleaner assembly 1 is depicted with the precleaner stage 5 removed. Also, blower equipment 25, FIG. 1, below stage 6 is not shown.

The end view depicts the pulse jet arrangement 18 as comprising an accumulator 35 with a set of valve arrangements 36 thereon. The accumulator 35 comprises a compressor vessel for receiving compressed air from a compressor, for use in the pulse jet cleaning. The valve arrangements 36 provide for controlled pulse jets from the accumulator 35 through a nozzle and splitter arrangement described below, to clean the v-pack arrangement.

For the particular air cleaner assembly 1 depicted in FIGS. 1-3, the valve arrangement 36 comprises four valves 37, although alternate arrangements and an alternate number of valves could be used. For the particular air cleaner assembly 1 depicted, the four valves 37 are arranged in a vertical stack as shown.

Figure 4:
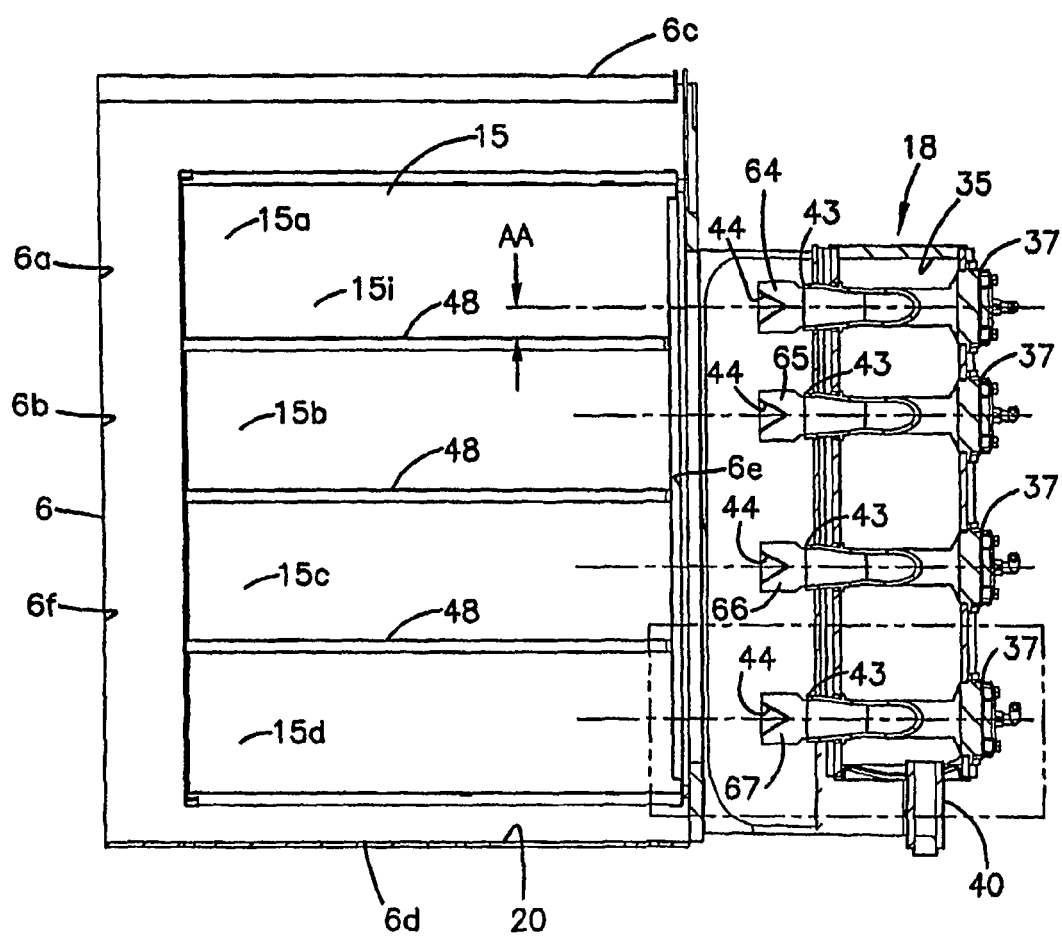
FIG. 4 is a cross-sectional view taken generally along line 4-4, FIG. 3.

Attention is now directed to FIG. 4, a cross-section taken along 4-4, FIG. 3. In FIG. 4, a compressed air flow inlet conduit 40 is depicted, for entering gas flow under pressure into accumulator 35. Also in FIG. 4, it can be seen that the valves 37 control direction of pulse jets of air from accumulator 35 through nozzles 43 and splitters 44. For the assembly shown there are four nozzles 43 and four splitters 44, one each associated with each valve 37.

Detail regarding the nozzles 43 and splitters 44 will be discussed below in connection with other figures.

In FIG. 4, barrier filter stage 6 is viewable with serviceable filter cartridge 15 positioned therein. The cross-section of FIG. 4, is taken through the center of the filter cartridge 15. It can be seen that the interior 15i of filter cartridge 15 is divided, in this instance vertically, into a stack of multiple sections or stages. The number of sections or stages is a matter of choice depending on the particular air cleaner, system and cartridge configuration involved. Typically there will be at least two sections or stages, often at least three and usually not more than five, although alternatives are possible. The particular cartridge 15 depicted comprises a stack of four sections stages 15a, 15b, 15c and 15d, each separated from the next adjacent one(s), by one of internal barriers 48. From FIG. 4, it can be seen that each splitter 44 is positioned to direct air into one each of the chambers 15a-15d.

It is noted that for the assembly 1 shown, the cartridge 15 is positioned so that the sections or stages 15a-15d are stacked vertically on one another. This will be typical for an assembly according to the present disclosure.

Typically, and referring to FIG. 4, cartridge 15 is inserted or removed from interior 6a, by passage through upper end or top 6c of barrier filter stage 6, when the precleaner assembly 5 is removed or opened.

In FIG. 4, dimension AA is depicted. Dimension AA may vary, from system to system. For the particular example shown, dimension AA is 1.2 inches (30.5 mm).

The serviceable cartridge 15 is depicted in detail, in FIGS. 5-9.

Figure 9:
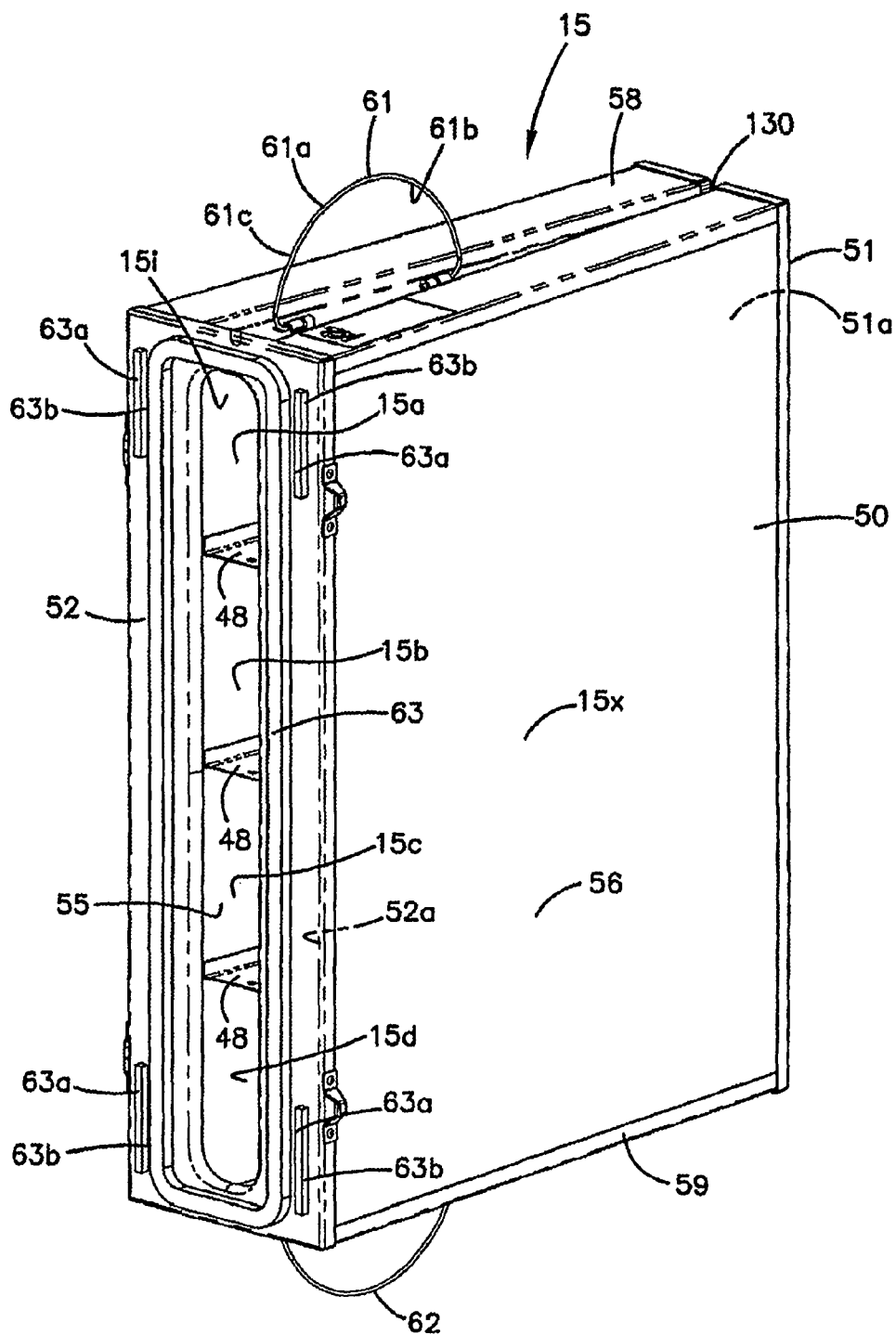
FIG. 9 is a top perspective view of the serviceable filter cartridge depicted in FIGS. 5-8.

In FIG. 9 a top perspective view of the serviceable cartridge 15 is provided. The cartridge 15 comprises v-pack panel arrangement 50, a closed narrow end piece or cover 51, and an open air outlet end piece 52. The closed end piece 51 is positioned at a narrow end 51a of the v-pack panel arrangement 50 and the open end piece 52 is positioned at a wide end 52a of the v-pack panel arrangement 50. The cartridge 15 also includes top and bottom covers or frame pieces 58, 59 discussed below. The covers or frame pieces 58, 59 extend between the closed end piece 51 and the open end piece 52.

Still referring to FIG. 9, v-pack panel arrangement 50 comprises first and second panels 55, 56. Each panel 55, 56 typically comprises a panel of barrier media, for example pleated media. Typically when the media is pleated, it is positioned within cartridge 15 such that a longitudinal extension of the pleats is directed between top and bottom frame pieces 58, 59.

Figure 5:
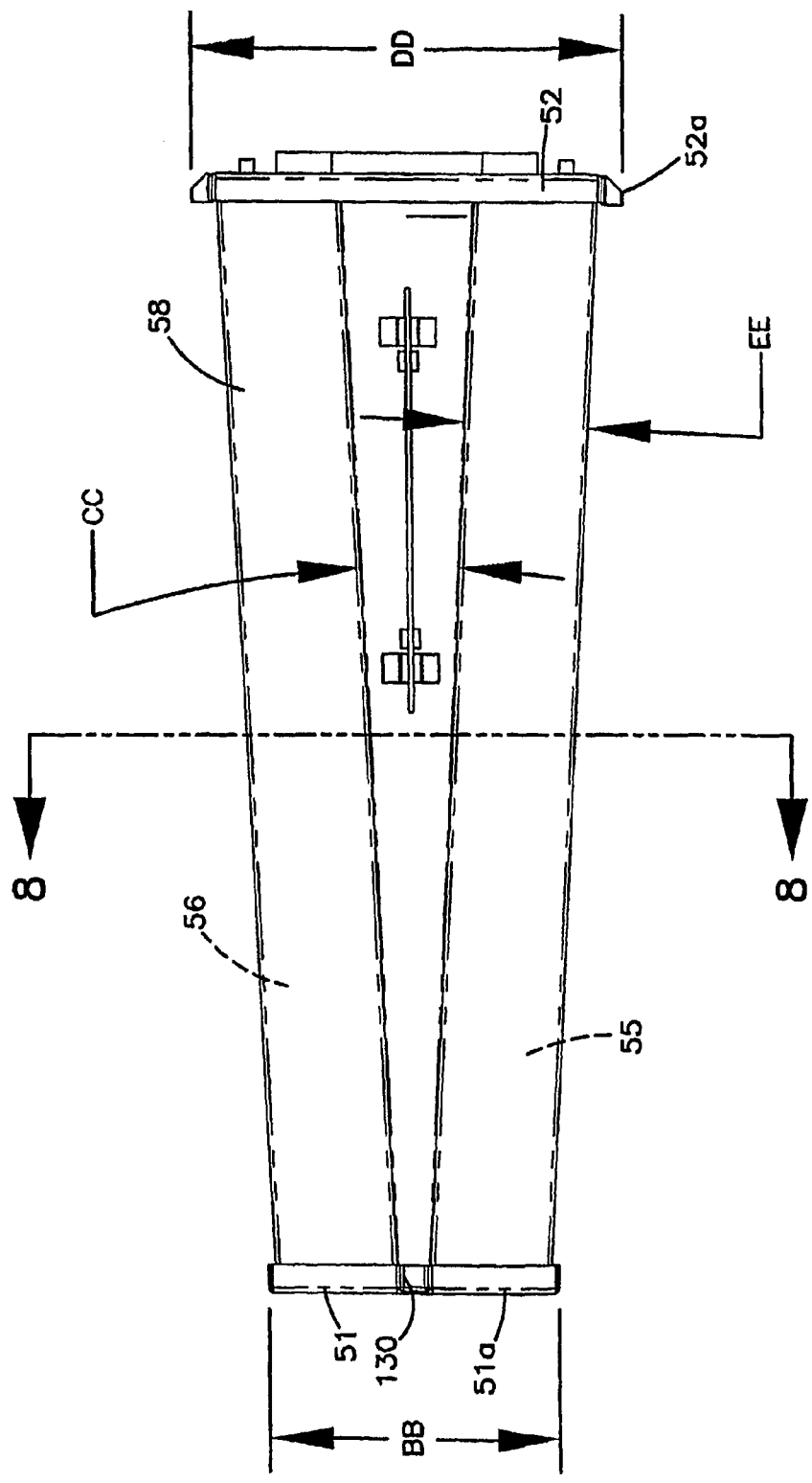
FIG. 5 is a schematic top plan view of a serviceable filter cartridge useable in the assembly of FIGS. 1-4.

Referring to FIG. 5, the panels 55, 56, are positioned within cartridge 15 to define an interior volume (corresponding to volume 15i); and to extend at an interior angle CC relative to one another. Angle CC is typically at least 4° and not greater than 10°, usually 5-7°, inclusive, typically 5.2-5.9°, inclusive. (Herein, the term "inclusive" when used with respect to a range, is meant to indicate that the recited end points are included.)

The top frame piece 58 and the bottom frame piece 59 are positioned with the panels 55, 56 therebetween.

Figure 7:
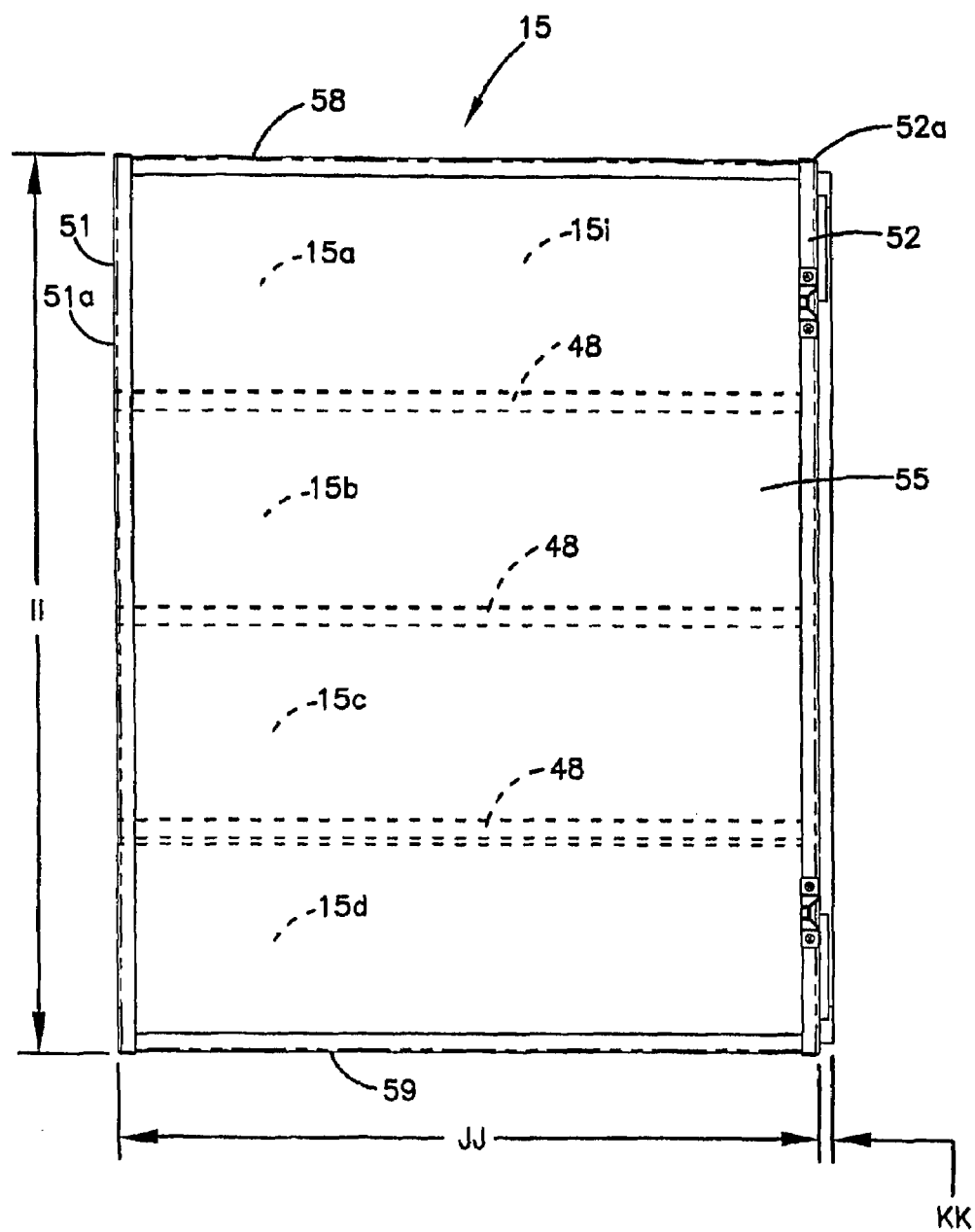
FIG. 7 is a side elevational view of the cartridge depicted in FIG. 5, with phantom lines indicating selected internal detail.

In FIG. 7, cartridge 15 is depicted in side elevational view. In phantom lines, dividers 48, positioned in interior 15i discussed above in connection with FIG. 4 are shown. The dividers 48 would not typically be viewable in a side elevational view, since panel 55 would block the view. Typical arrangements will have at least one divider, often at least two dividers, usually not more than four. The example shown has three.

As discussed above, it is again noted with respect to FIG. 7, that cartridge 15 is fit with a top frame piece 58 and bottom piece 59 in extension between end pieces 51, 52 to enclose the cartridges 55, 56. Typically, air filter media in panels 55, 56 would be provided in a pleated form, in a frame. Two framed sections of pleated media would be used to form the side panels 55, 56. These two framed pieces would be fitted in a frame defined by top frame piece 58, bottom frame piece 59, closed end 51 and open end piece 52, to form cartridge 15.

In some instances, the media could be potted directly to portions of the frame, for example, frame pieces 58 and 59.

Figure 6:
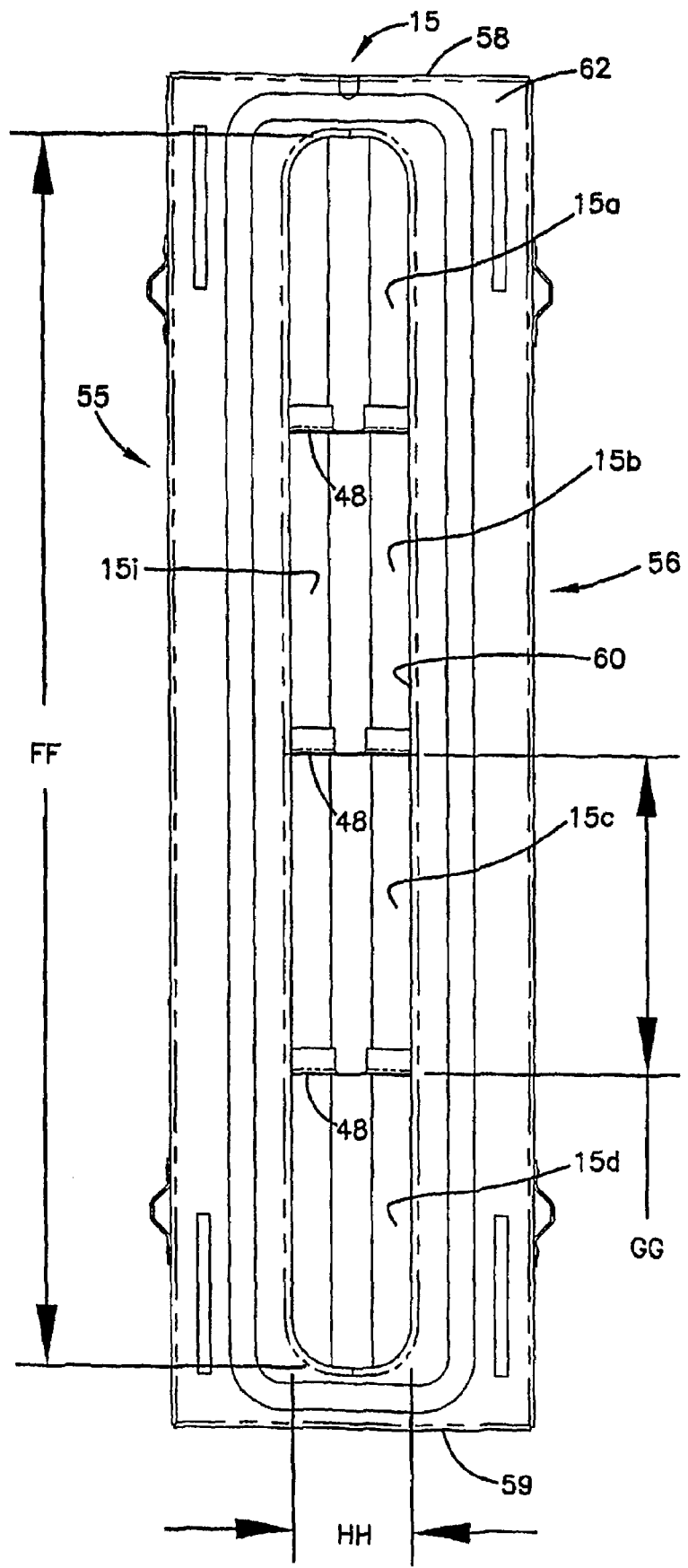
FIG. 6 is an end elevational view of the filter cartridge depicted in FIG. 5; the view of FIG. 6 being toward an open end of the serviceable filter cartridge.

Attention is now directed to FIG. 6, which is an end view of cartridge 15, the view being generally taken toward open end piece 52. In FIG. 6, one can view through opening or air flow aperture 60 in end piece 52 providing air flow communication with interior 15i of cartridge 15. Dividers 48 are now viewable.

Aperture 60 is a tall, narrow, opening. Typically the aspect ratio (width HH to height FF) of the opening is at least 0.06, typically at least 0.07 and usually within the range of 0.07 to 0.14 and typically not more than 0.17. It is noted that the divider(s) 48 are evenly spaced GG along the height dimension, although alternatives are possible.

Figure 8:
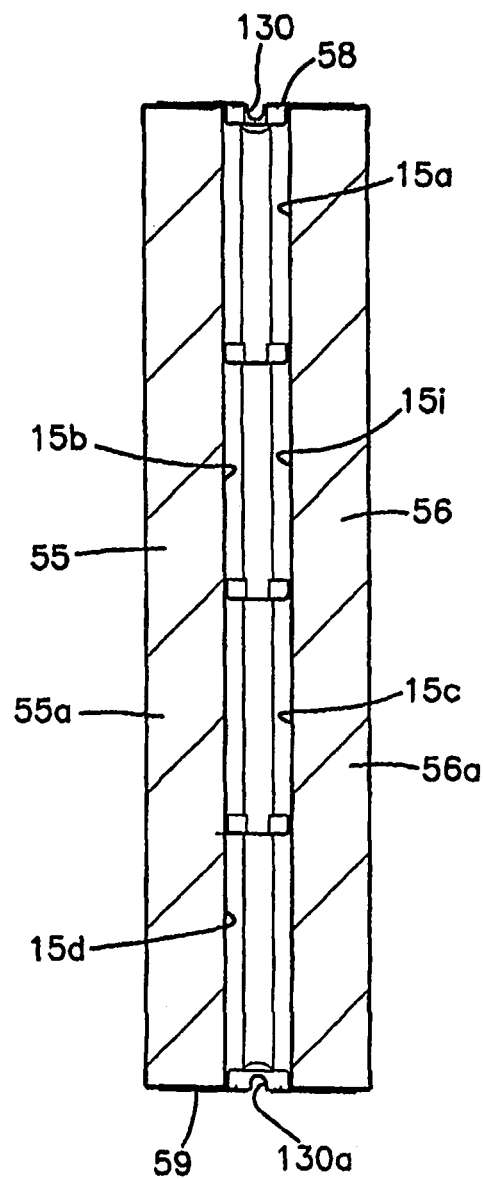
FIG. 8 is a schematic cross-sectional view taken along line 8-8, FIG. 5.

FIG. 8 is a cross-sectional view taken along line 8-8, FIG. 5. The top frame piece 58, bottom frame piece 59, panels 55, 56 and dividers 48 are readily viewable. Also viewable is pleated media 55a, 56a in each of the panels 55, 56.

As indicated above, in FIG. 9 a top perspective view of cartridge 15 is presented. Attention is directed to handle arrangement 61. Handle arrangement 61 is provided on top piece 58, to facilitate lifting of the cartridge 15 into and out of the assembly 1. The handle arrangement 61 can have a variety of constructions, and is typically made collapsible, so it can be lowered when not in use. The particular handle arrangement 61 depicted, comprises an extension of wire 61a, mounted on the cartridge 15. The wire handle 61a can be collapsed, when not in use.

A handle arrangement 61 which forms an open loop 61b, through which a handler's fingers or portion of a hand can extend, to lift and manipulate the cartridge 15, is generally referred to herein as a "loop handle member" or "loop handle arrangement." Handle arrangement 61 does comprise a loop handle arrangement. An alternate "loop handle arrangement" is described below, in connection with other figures. The particular loop handle arrangement 61b depicted in FIG. 9 is a flexible wire loop handle arrangement 61c.

Typically, the open loop 61b will be configured so that even a person wearing heavy arctic gloves can project fingers through the loop, to manipulate the cartridge 15. In typical instances, when a wire loop is used for the handle, the wire be a vinyl or plastic coated multi-strand cable, to be easier and more convenient for manipulation.

Still referring to FIG. 9, it is noted that bottom frame piece 59 includes a similar wire handle 62. This is an indication that the cartridge 15, can, if desired, be manufactured with appropriate symmetry so it can be installed with either piece 58 or piece 59 positioned above the remainder of the cartridge 15, during assembly. Alternate approaches are possible. For example, the cartridge 15 could be specifically manufactured without such symmetry, so that it can only be properly inserted into the filter stage or housing 6, in one vertical orientation. When this is done, typically a handle would not be provided in the bottom cover piece 59.

Attention is now directed to open end piece 52, FIG. 9. End piece 52 includes a housing seal or gasket 63 thereon, surrounding aperture 60. The gasket 63 would be compressed against a housing component in this instance end wall 6e, FIG. 1, in use, to provide sealing around aperture or opening 60. End piece 52 further includes compression or stop arrangement 63a thereon. The compression stop arrangement 63a controls the amount of compression possible for gasket 63 during installation. For the particular assembly depicted, the compression stop arrangement 63a comprises four spaced projections 63b. The compression stop arrangement 63a would typically be configured to project outwardly from a remainder of wall or end piece 52, a distance comprising a value selected between 10% and 90% inclusive of a thickness of the (uncompressed) gasket or seal 63. The particular amount of projection would depend on the particular system, and material chosen for the gasket or seal member 63. It is noted that alternate compression stop arrangements comprising different number of projections, including a single continuous projection, are possible.

Referring to FIGS. 5-9, example dimensions for an example useable cartridge 15 are provided. The dimensions are as follows: BB=5.25 inch (133.4 cm); CC=5.5°; DD=7.75 inch (197 cm); EE=2.19 inch (55.6 cm); FF=23.22 inch (590 mm); GG=5.78 inch (147 mm); HH=2.30 inch (58.4 mm); II=25.5 inch (648 mm); JJ=20 inch (508 mm); and KK=0.38 inch gasket thickness (9.65 mm).

Alternate dimensions are possible, using techniques according to the present disclosure. The dimensions identified, however, provide a guide to indicate how the principles of the present disclosure can be applied. In general terms, assemblies configured specifically as described in the figures herein, will be appropriate for the filter cartridge 15 with a length (corresponding to v-pack depth), between the open end piece 52 and the closed end piece 51, within the range of 18-25 inches; and, with a height (distance between the top and bottom frame pieces 58, 59) within the range of 24-27 inches, although alternatives are possible with certain of the principles described.

The techniques described are also particularly useful when the aperture 60 in the open end wall 52 of the filter cartridge 15, has a height (longer dimension, FF) within the range of 21 to 25 inches, inclusive (533 mm-635 mm), and a width (shorter dimension, HH) within the range of 2 to 3.5 inches, inclusive (51-89 mm).

In a typical operation, FIG. 4, a pulse jet sequencing is from top to bottom. Thus chamber 15a is initially pulsed by pulse jet 64, then chamber 15b by pulse jet 65, then chamber 15c by pulse jet 66 and then chamber 15d by pulse jet 67. This top to bottom pulse jet sequencing facilitates pushing contamination within chamber 6 down to bottom 20, for scavenge. Sequencing and control systems that can be adapted for the pulse jet arrangements of the present disclosure are described, for example, in U.S. Pat. No. 6,676,721, incorporated herein by reference.

C. An Example Accumulator/Valve/Nozzle Arrangement, FIGS. 10 and 11.

Figure 11:
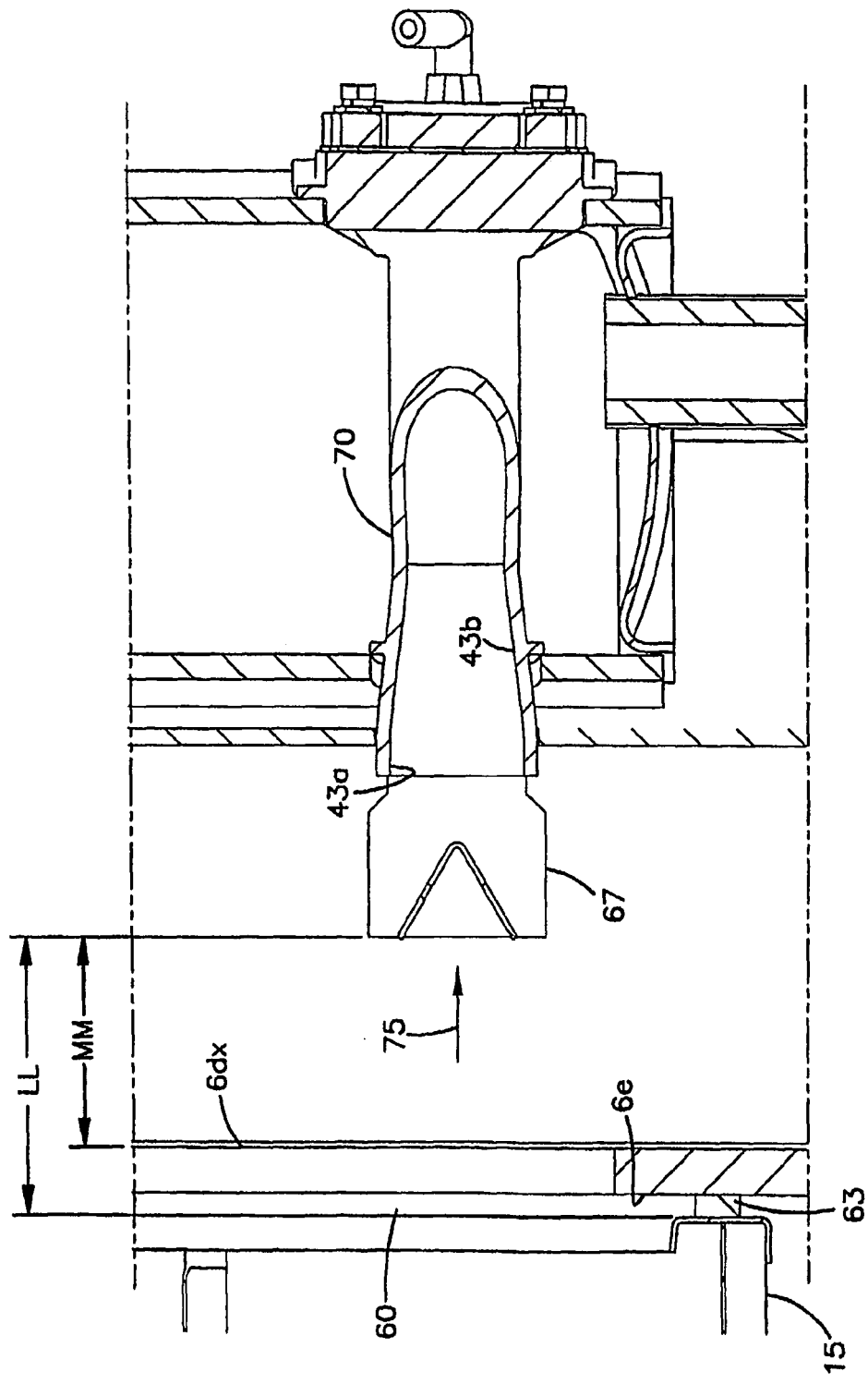
FIG. 11 is a schematic side cross-sectional view of a portion of the assembly depicted in FIG. 3.

FIG. 11 is an enlarged fragmentary portion of FIG. 4, particularly a portion related to the lowest member 67 of the pulse jet assembly, shown in FIG. 4.

Figure 10:
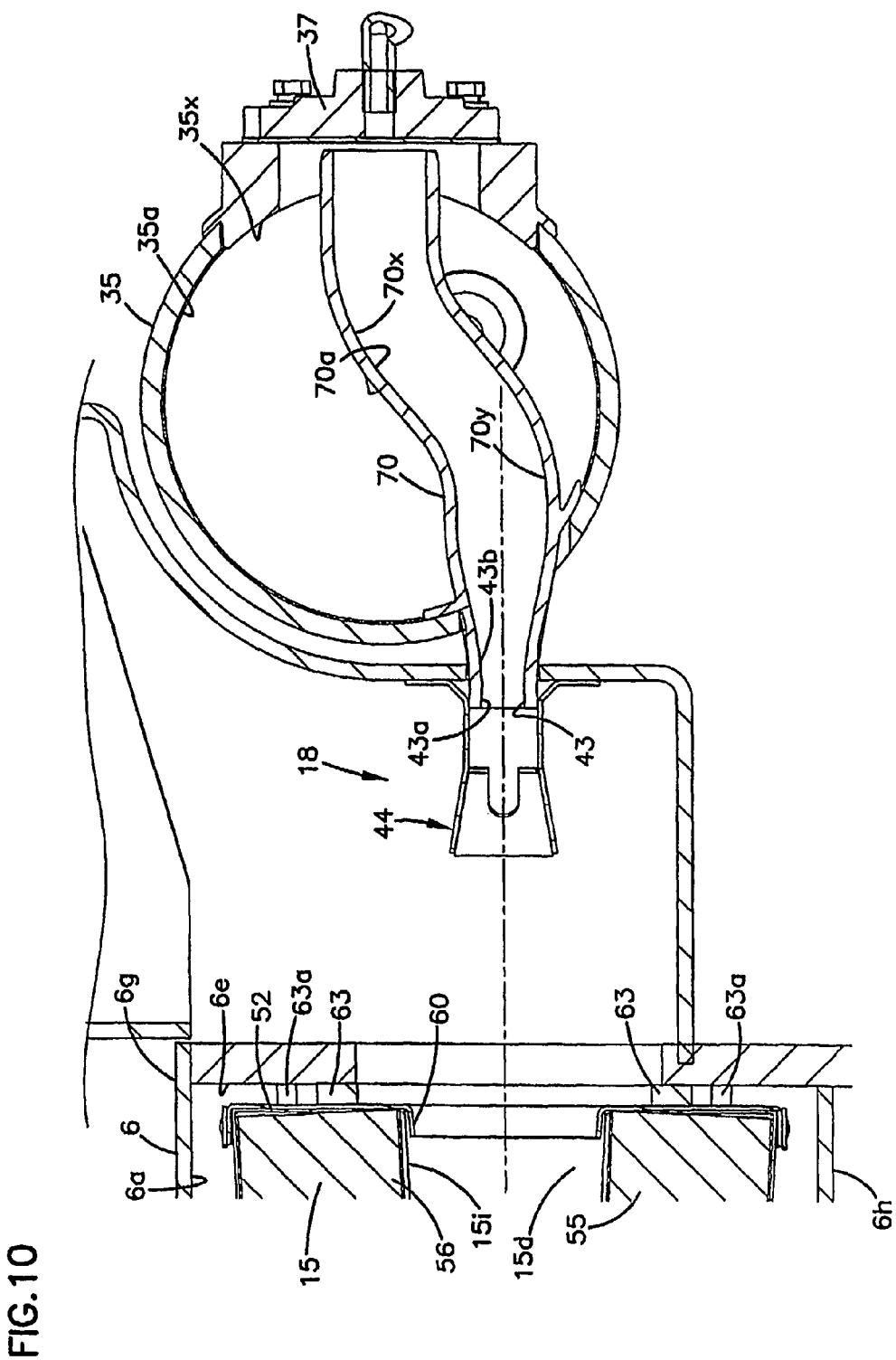
FIG. 10 is a fragmentary schematic cross-sectional view of a pulse jet assembly portion of the assembly depicted in FIG. 1.

FIG. 10 is an enlarged fragmentary cross-sectional view of the assembly 1, the cross-sectional view being taken perpendicularly to the height dimension of the cartridge 15, FIG. 11.

In FIG. 10 one can view the cartridge 15 within barrier filter stage 6, sealed against wall 6e. In particular portions of cartridge sections 55 and 56 are viewable, along with open end piece 52. In FIG. 10, one can view portions of gasket arrangement 63 compressed against end wall 6e, with compression stop arrangement 63a limiting compression toward wall 6e.

In FIG. 10, air flow aperture 60 in open end piece 52 is viewable. Aperture 60 provides for: (a) filtered air exit from cartridge 15 during normal filtering operation; and, (b) pulse jet entry into cartridge 15, from pulse jet arrangement 18, during a pulse jet cleaning operation.

Still referring to FIG. 10, accumulator 35 is viewable in cross-section, and thus interior 35a can be seen. In general, compressed air would be collected within accumulator interior 35a, to be directed through pulse jet arrangement 18 into cartridge 15, selectively, during operation. The pulse jet operation is controlled by valve arrangement 37, as mentioned above.

In FIG. 10, it can be seen the accumulator 35 comprises a tubular construction. For the particular assembly shown, an interior 35a of the tubular accumulator 35 has a generally circular cross-section, although alternatives are possible. Valve 37 is generally positioned at an opposite side 35x of accumulator 35 from cartridge 15. Gas exit tube 70 is shown extending through interior 35a, from valve 37 to gas exit nozzle 43. Valve 37 is configured to selectively allow a pulse of compressed air to be fed from interior 35a into interior 70a of tube 70, during operation. It is noted that tube 70 is shown with a curved shape, rather than a straight tubular shape. In particular, a somewhat "z" or "S" curved shape is formed with two, opposite, curved sections 70x, 70y, with tube 70 terminating in a nozzle 43 aligned with exit aperture 60. Thus, the example shows a tube 70 having more than one curve or bend 70x, y therein, forming a air flow conduit for flow of compressed air to nozzle 43. In some instances, of course, a straight tube could be used, as the flow conduit. In still others, a single curve in tube 70, could be used, as described in connection with other figures shown below. In still further arrangements, more than two curves could be used.

Nozzle 43 is an end of tube 70, from which a gas pulse exits tube interior 70a and is directed to splitter 44. Splitter 44 is configured to selectively and desirably direct the pulse jet through aperture 60 and down internal region 15a of cartridge 15. The pulse jet would be directed into one of the cartridge sections 15a-15d, FIG. 4, selectively. The particular example shown in FIGS. 10 and 11, would direct the pulse into chamber 15d.

A splitter 44 provides for an appropriate dispersion of the pulse jet pressure, along the internal surfaces of the panels 55, 56, within an interior 15 of an associated cartridge chamber 15a-15d. It is important that the pulse jet be distributed appropriately along the length and height of each cartridge section 15a-15d, to achieve desirable pulse jet cleaning affects. These are controlled by: the force of the jet pulse, the time (duration) of the jet pulse, and, the size, configuration and position of: nozzle arrangement 43 and splitter 44.

In FIG. 11, a cross-sectional view orthogonal to the view of FIG. 10 is shown. In FIG. 11 dimension LL indicates the distance of splitter 44 from inlet aperture 60; and dimension MM indicates the distance of splitter 44 from exterior 6dx of wall section 6e.

For the example shown, dimensions LL and MM are: LL=3.12 inches (79.2 mm) and MM=2.37 inches (60.2 mm). Typically the splitter 44 (with vane 80) is spaced from the cartridge aperture 60 a distance LL within the range of 3-6 inches, inclusive (76.2-152.4 mm). The distance can be optimized for a given splitter and air filter cartridge.

For a typical system, the operating pressure within chamber 35a, would be about 100 psi; and, the time of each pulse would be about 100 milliseconds (0.1 sec).

D. Typical Splitter and Nozzle Configurations; FIGS. 12-15

Figure 12:
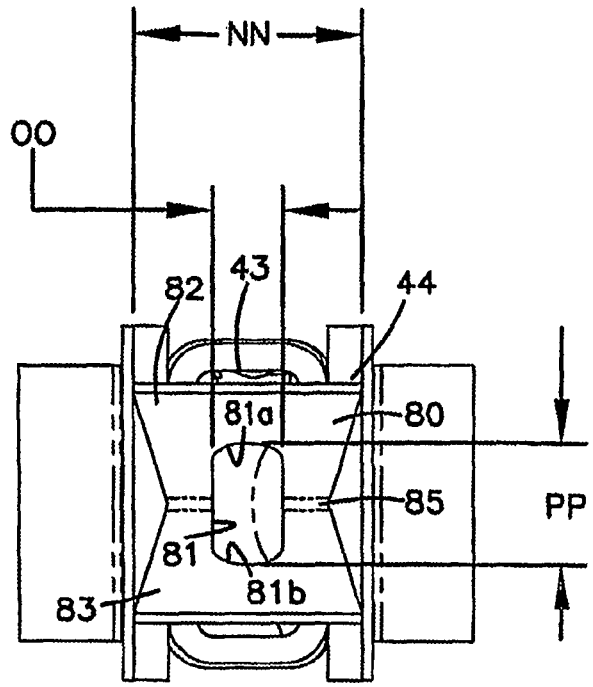
FIG. 12 is an exit end view of a splitter component of the pulse jet assembly depicted in FIGS. 10 and 11.

Attention is first directed to FIG. 12. In FIG. 12 the view is toward nozzle 43 and splitter 44, from the position of the cartridge 15. Alternately stated, the view would be in direction of arrow 75, FIG. 11.

Referring to FIG. 12, the splitter 44 includes a central splitter vane 80. The central splitter vane 80 includes a central aperture 81 and two sides 82, 83. The sides 82, 83 are joined at apex or vertex 85 which is directed toward the pulse jet. Herein, interior acute angle UU, FIG. 14, between the sides 82, 83 will generally be defined as the splitter angle. The splitter angle UU, for typical assemblies according to the present disclosure, is typically within the range of 50°-80°, inclusive. Preferably angle UU is 55°-65°, inclusive; for example 60°.

The central aperture 81 is generally an oblong aperture in a central portion of vane 80, with a portion 81a, FIG. 12, of the aperture 81 along or through side 82 and another portion 81b along or through side 83, the aperture thus extending across apex or vertex 85. Alternate shaped apertures may be used.

Dimensions defining the aperture 81 are shown in FIG. 12. Examples would be OO=0.38 inch (9.65 mm); PP=0.69 inch (17.5 mm). It is noted that dimension PP is not the length of the aperture 81, but rather the projected length in the view of FIG. 12. The length of the aperture 81, can be determined from FIG. 13 as 2×dimension QQ. For the example shown, dimension W, FIG. 14, is 2.0 inch (50.8 mm).

Figure 13:
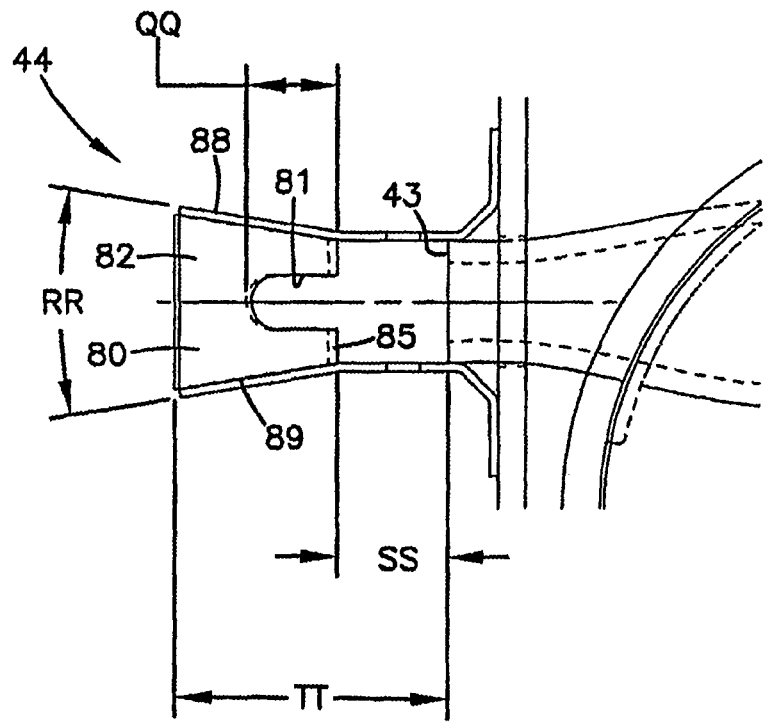
FIG. 13 is a top view of the splitter component depicted in FIG. 12.
Figure 14:
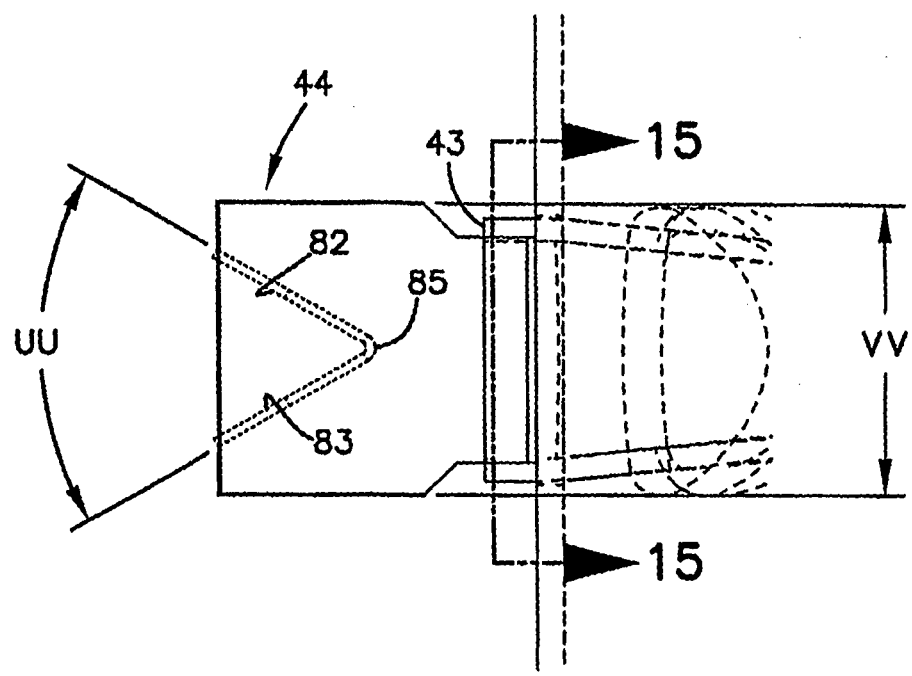
FIG. 14 is a side elevational view of the splitter component depicted in FIG. 12, with selected internal componentry depicted in phantom lines.

In more general terms, the typical distance QQ, FIG. 13, of extension of the air flow aperture 81 along each side 82, 83, from the apex or vertex 85, is within the range of 0.55-0.80 inches (14-20.3 mm), inclusive; and, the maximum width dimension, where the air flow aperture 81 engages the vertex 85, is typically within the range of 0.33-0.43 inches (8.4-10.9 mm). Typically the air flow aperture 81 is at its widest, when it crosses the vertex 85. For the example shown, the aperture 81 is generally rectangular shaped aperture 81 through a piece defining splitter vane 80, before bent to provide angle UU. For the example shown, the aperture 81 has rounded ends, and is oval in shape with parallel sides between the rounded ends.

Referring to FIG. 13, as a jet pulse is received outwardly from nozzle 43 it is directed into splitter 44. A portion of the jet pulse will be split at apex 85, to extend above vane 82 and below vane 83. This will help distribute the pulse jet within an interior region 15i (or subchamber) of filter cartridge 15, FIG. 10 into which a jet pulse is directed. Another portion of the jet pulse will pass through aperture 81, as a narrow pulse, directed down the length of the associated chamber within cartridge 15. The particular splitter 44 definition provided in FIGS. 12-15, provides for a good distribution of air as part of the jet pulse through a tall narrow aperture into cartridge 15, FIG. 10, and also through a relatively long cartridge 15.

Figure 15:
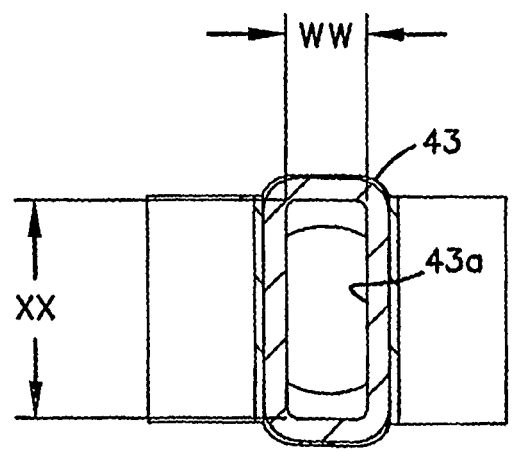
FIG. 15 is a cross-sectional view of a nozzle component depicted in the pulse jet assembly of FIGS. 12-14, FIG. 15 being taken along 15-15 of FIG. 14.

Attention is now directed to FIG. 15. In FIG. 15 nozzle 43 is depicted. The nozzle 43 has a generally rectangular outlet 43a. This facilitates a jet pulse entering the splitter 44, FIG. 12 in a preferred manner. The rectangular aperture 43a is preferably oriented with a longer dimension of the opening oriented perpendicular to the extension. This can be seen in FIG. 12.

In FIG. 15, example dimensions are provided. Example dimensions are WW=0.58 inches (14.7 mm); and, XX=1.5 inches (38.1 mm). Referring to FIGS. 10 and 11, tube 70 can be configured to gradually conform, in cross-section, from a circular cross-section to the rectangular outlet 43a, over a transition zone 43b.

Referring to FIG. 13, it is noted that the splitter 44 includes side walls 88, 89 which enclose the vane 80 on opposite sides and which diverge from one another, typically at an angle RR of at least 15° and not greater than 35°, for example 15° to 35°, inclusive. For the example shown, angle RR=19°. Referring to FIG. 13, other example dimensions provided are: SS=0.75 inch (19 mm); and TT=1.85 inch (47 mm).

The diverging side walls 88, 89 help shape the pulse jet into a form that is expanding in width as it enters the cartridge 15, to force air through the panels 55, 56.

Definition of the splitter arrangement 44 and the nozzle 43 can be important, with respect to obtaining desirable operation for any given shaped and dimensioned cartridge. It can be optimized, empirically, for a system through experimental evaluation. For example appropriate transducers to detect the air pulse can be positioned at various places along a test cartridge, to evaluate pulse jet nozzles and splitters with different shapes.

E. The Scavenge Arrangement or System, FIGS. 1 and 16-18.

As indicated above with respect to FIG. 1, in general the assembly or system 1 includes a scavenger system or arrangement 11, for scavenging dust removed in the precleaner 5 and the barrier filter stage 6. Removal of dust or particulates from the precleaner 5 is shown provided by upper scavenge arrangement 11a, and removal of dust or other particulates from the barrier stage 6, is shown by lower scavenge section 22. The scavenge system 11 is generally operated by blower 25.

The lower scavenge 22 is configured for convenient and efficient dust or other particulate removal. This will be understood by reference to FIGS. 16-18.

Figure 16:
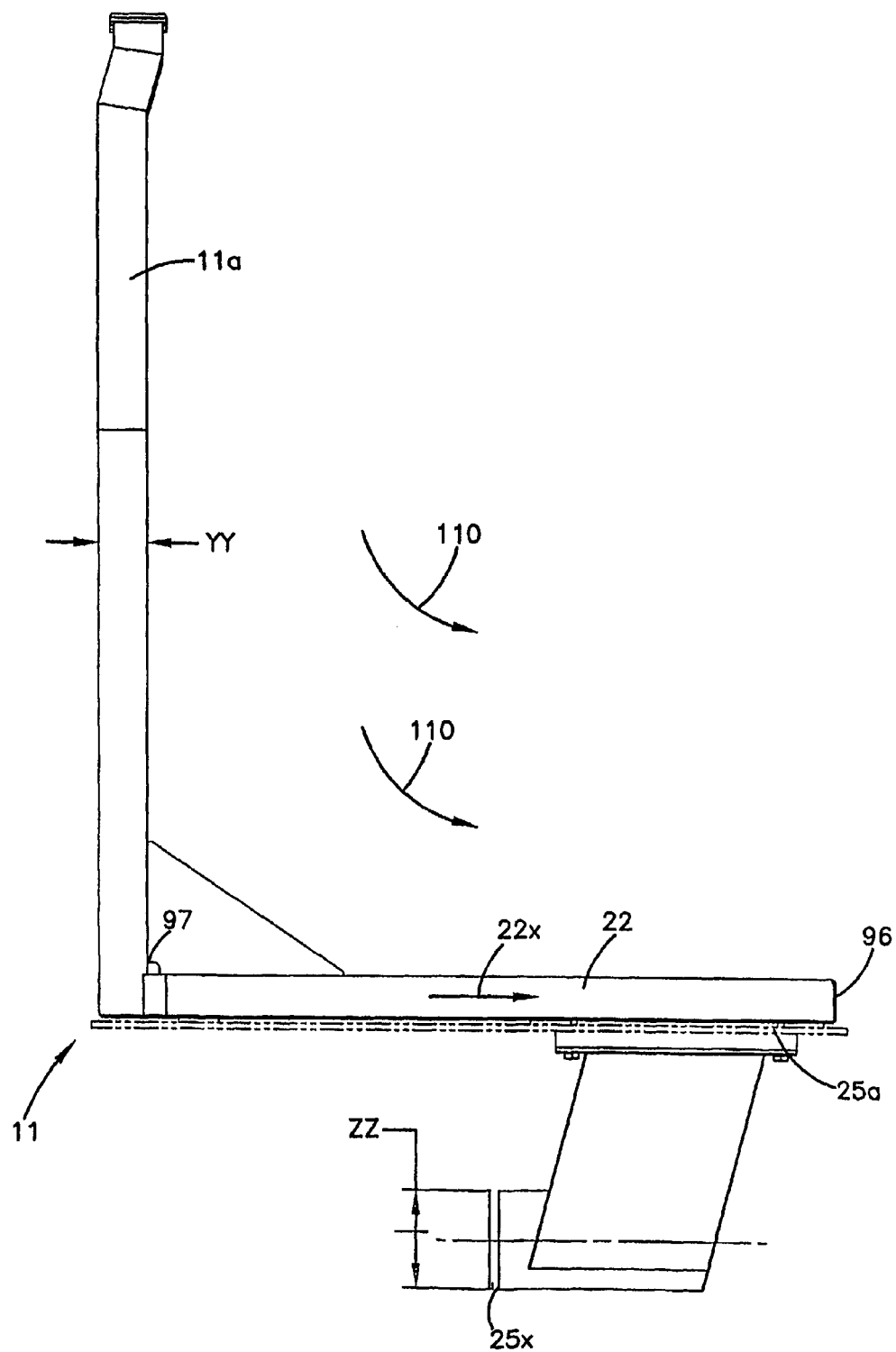
FIG. 16 is a schematic side elevational view of a scavenge duct assembly for the air cleaner assembly of FIG. 1.

Referring to FIG. 16, the scavenger arrangement 11 is depicted schematically and is shown separated from a remainder of assembly 1. In FIG. 16, upper scavenge section or portion 11a is viewable, as well as lower scavenge or scavenge portion 22. For the example shown in FIG. 16, the region 11a is square in cross-section, with dimension YY=1.5 inch (38.1 mm); and dimension ZZ, the size of the outlet 25x to the blower, being 3 inches (76.2 mm).

Figure 18:
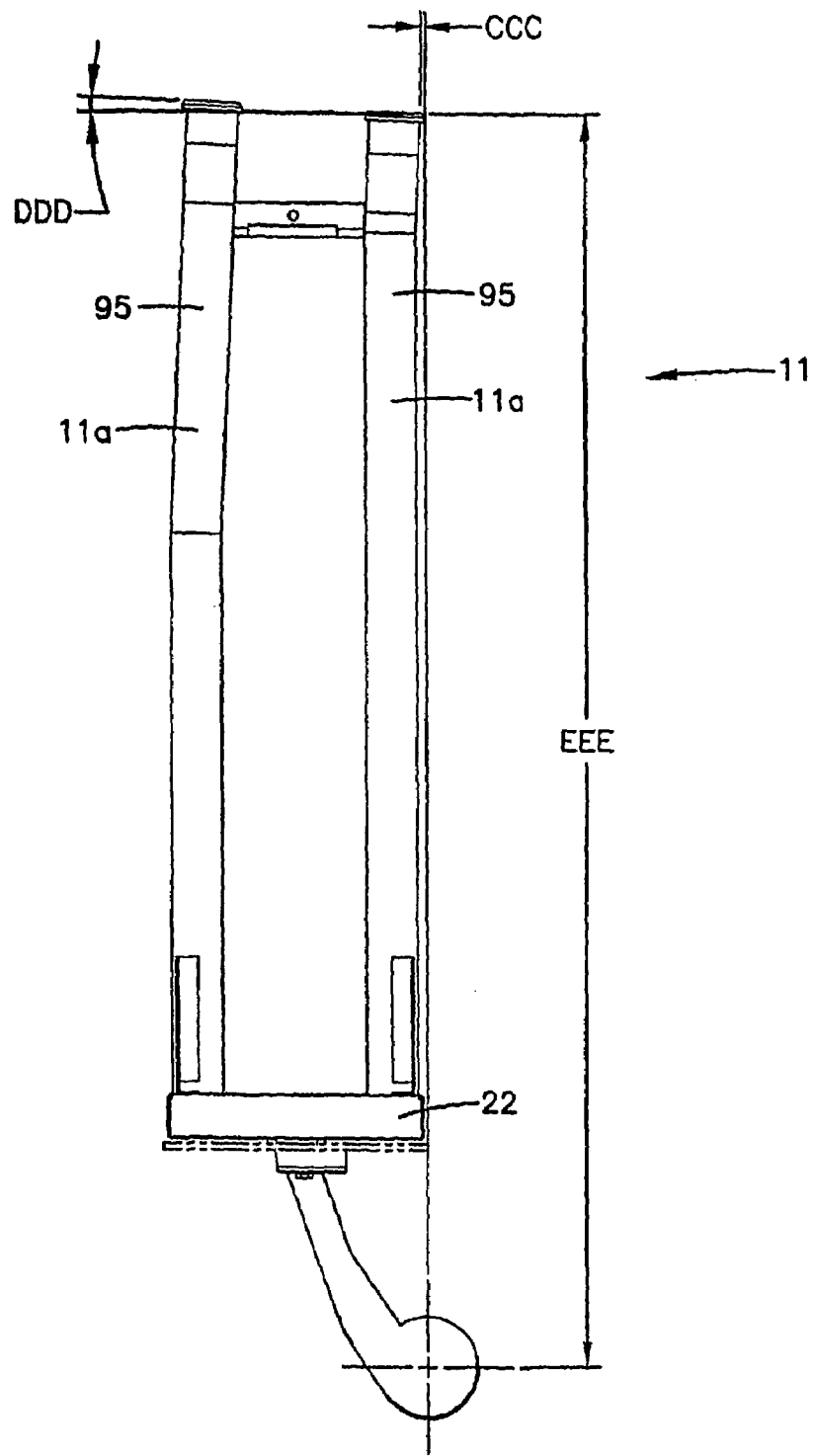
FIG. 18 is an end elevational view of the scavenge duct assembly of FIG. 16.

Although alternatives are possible, referring to FIG. 18, it can be seen that the upper scavenge portion 11a comprises two, spaced, upwardly projecting tubes 95 which extend from lower scavenge portion 22 upwardly through barrier filter section 6 into precleaner 5, FIG. 1. For the example shown in FIG. 18, dimension CCC=0.11 inch (2.8 mm); angle DDD=2° 30'; and dimension EEE=37.13 inch (86.7 cm).

Figure 17:
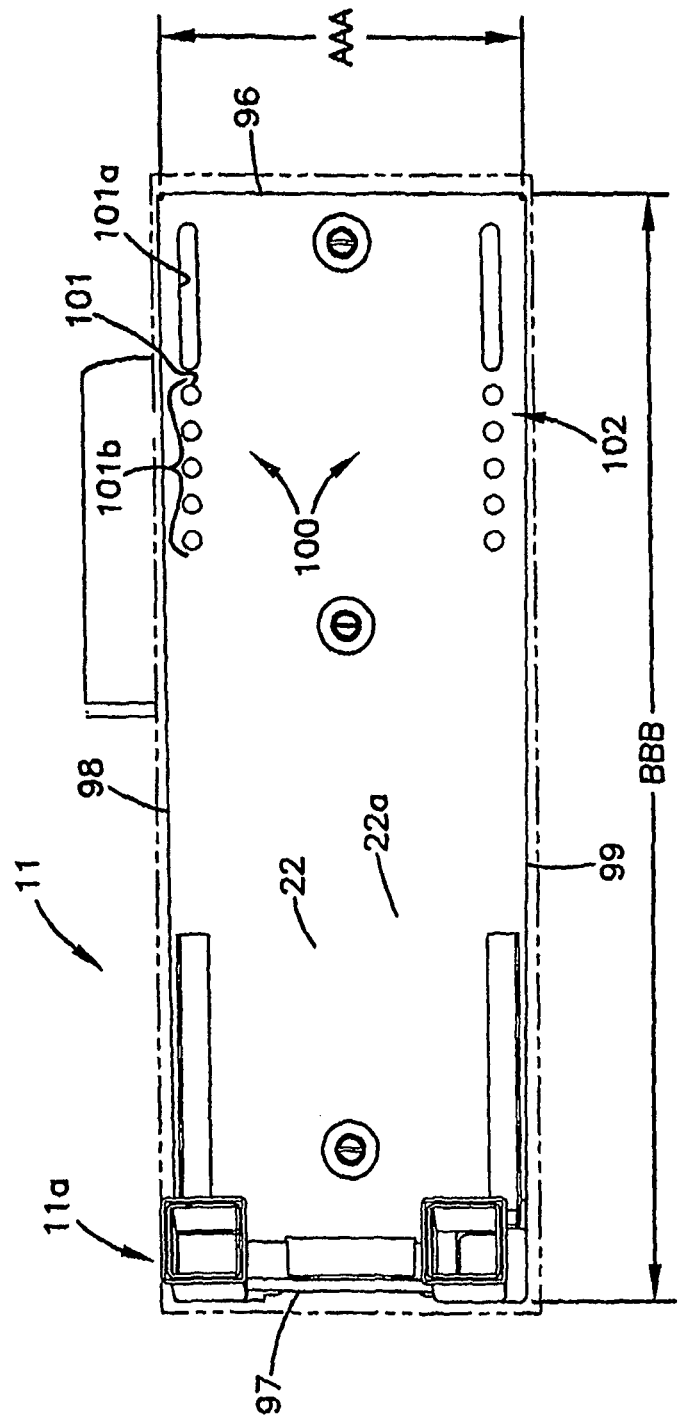
FIG. 17 is a top plan view of the scavenge duct assembly of FIG. 16.

In FIG. 17, a top plan view of the scavenge arrangement 11 is depicted, providing a view of upper surface 22a of lower scavenge portion 22. (An alternate to the arrangement of FIG. 17 being shown in FIG. 17A.)

Referring to FIG. 17, it can be seen that for the arrangement shown, lower scavenge 22 provides a bottom floor to barrier filter section 6, FIG. 1. Scavenge portion 22, then, includes: opposite ends 96, 97; and, opposite side 98, 99. End 96 is generally adjacent wall 6e, FIG. 1, to which media pack 15 is sealed, during use. Thus, for the orientation shown in FIG. 17, the pulse jet assembly 18, would be operated to provide pulse jet of air into a cartridge 15, FIG. 1, at a location above end wall 96, FIG. 17.

Still referring to FIG. 17, lower scavenge duct portion 22, includes a scavenge aperture arrangement 100 therein. The scavenge aperture arrangement 100 comprises an aperture arrangement or pattern through an upper surface 22a of lower scavenge duct 22. This scavenge aperture arrangement 100 allows for passage of air and particulate, drawn from barrier filter region 6, FIG. 1, into the scavenge system 11. For the arrangement shown, FIG. 17, aperture arrangement 100 comprises a first aperture arrangement 101 and a second aperture arrangement 102 oriented adjacent, and spaced from, opposite sides 98, 99, respectively and positioned such that a cartridge 15, FIG. 1, operably positioned on surface 22, FIG. 17, would generally be positioned between the aperture arrangements 101, 102 and would not be positioned to cover or overlap aperture arrangements 101, 102.

Herein, the distance between the first and second ends 96, 97 of the housing bottom 22a, will sometimes be referenced as distance BBB. The total open area of aperture arrangement 100, will generally be referred to as open area X, with a total open area of the first aperture arrangement 101 being total open area $X_1$ and the total open area of the second aperture arrangement 102 being total open area $X_2$. For the example shown, $X_1=X_2$, although alternatives are possible. The distance between sides 98, 99 is referenced as AAA.

For the example shown, dimension BBB is 22.8 inches (57.9 cm); and, dimension AAA is 7.52 inches (19.1 cm). Alternatives are possible.

In typical arrangements, the first scavenger aperture arrangement 101 will have a total open area $X_1$ to be configured such that at least 90% of the total open area $X_1$ is located within a distance of 60%, typically within a distance of 50%, of the distance (BBB) across the housing bottom 22 from the housing bottom first end 96 toward the second end 97. That is, at least 90% of the total area of aperture that comprises $X_1$, is located, typically, within the half of surface 22 toward end 96 (with a more broad statement within 60% of the surface of bottom 22 toward end 96).

Also, the second scavenger aperture arrangement 102 will have a second total open area $X_2$ and be configured such that at least 90% of the open area $X_2$ is also located within a distance of 60%, typically within 50% of the distance (BBB) across the housing bottom 22 from the housing bottom first end 96.

Usually the aperture arrangements will be configured such that the first scavenger aperture arrangement 101 is such that 100% of the open area $X_1$ is located within a distance of 60%, typically within 50%, of the distance (BBB) across the housing bottom from the housing bottom first end 96; and, the second scavenge aperture arrangement will be configured to have a total open area $X_2$ and to be positioned such that 100% of the open area $X_2$ is located within a distance of 60%, typically within 50%, of the distance (BBB) across the housing bottom from the housing bottom first end 96.

Although alternatives are possible, referring to FIG. 17, the first aperture arrangement 101 depicted comprises two types of apertures: a first, elongate aperture 101a and a plurality of spaced, smaller apertures 101b. For the example shown in FIG. 17, the apertures of aperture arrangement 101 are positioned on a line extending from end 96 toward end 97 and parallel to sides 98, 99. For the particular aperture arrangement 101 depicted, there is first elongate aperture 101a and typically three to twelve; in this instance five, spaced (in the example shown circular), apertures 102b, although alternatives are possible. The first elongate aperture 101a typically has an aspect ratio (length to width) of at least 5 and usually within the range of 5-10, inclusive, in some instances 7-10, inclusive, although alternatives are possible. The aperture 101a typically also has a total open cross-sectional area corresponding to at least 30% of $X_1$, usually at least 35% of $X_1$, and for the example shown at least 50% of $X_1$, although again, alternatives are possible.

Also, typically, the elongate aperture 101a is positioned closer to wall 96 than are the remaining apertures 101b. Usually the elongate aperture 101a is positioned at a location spaced from wall 96 within a distance of 25% of the distance from wall 96 to wall 97 (i.e., 25% of dimension BBB).

It is noted that aperture pattern 102, with respect to the features discussed in the previous paragraph, is similar to aperture pattern 101, in typical arrangements. Of course, alternatives are possible.

The aperture pattern shown for aperture arrangement 101, provides that the highest volume of draw through surface 22a, will be in region relatively close to end 96. Referring to FIG. 1 this means that the maximum draw into scavenge 22 will generally be adjacent outlet end 52, of cartridge 15. This configuration provides several advantages. First, air flow through barrier region 6 will be generally down and toward end wall 6e, as shown by arrows 110, FIG. 1. Thus, dust will tend to accumulate around cartridge 15 near wall 6e. The largest amount of draw into lower scavenger arrangement 22 occurs near the location where most dust build up will occur.

Referring to FIG. 16, it is noted that the dust take-off 25a of blower 25, FIG. 1, occurs in a region of lower scavenger arrangement 22 adjacent end 96; i.e., closer to end 96 than end 97. This too is advantageous, at least since it ensures highest vacuum draw for the scavenge arrangement 11, occurs in the region of lower scavenger arrangement 22 where aperture arrangement 100 is located, and most dust build up, again, occurs.

Finally, referring to FIG. 16, having the dust take off 25a located near end 96 ensures that the air flow within duct 22, indicated at arrow 22x, is in the same general direction, i.e., toward end 96, or toward the open end of the v-pack, as the general air flow 110 above surface 22. This provides for an advantageous flow, and efficiency of blower operation.

Figure 17A:
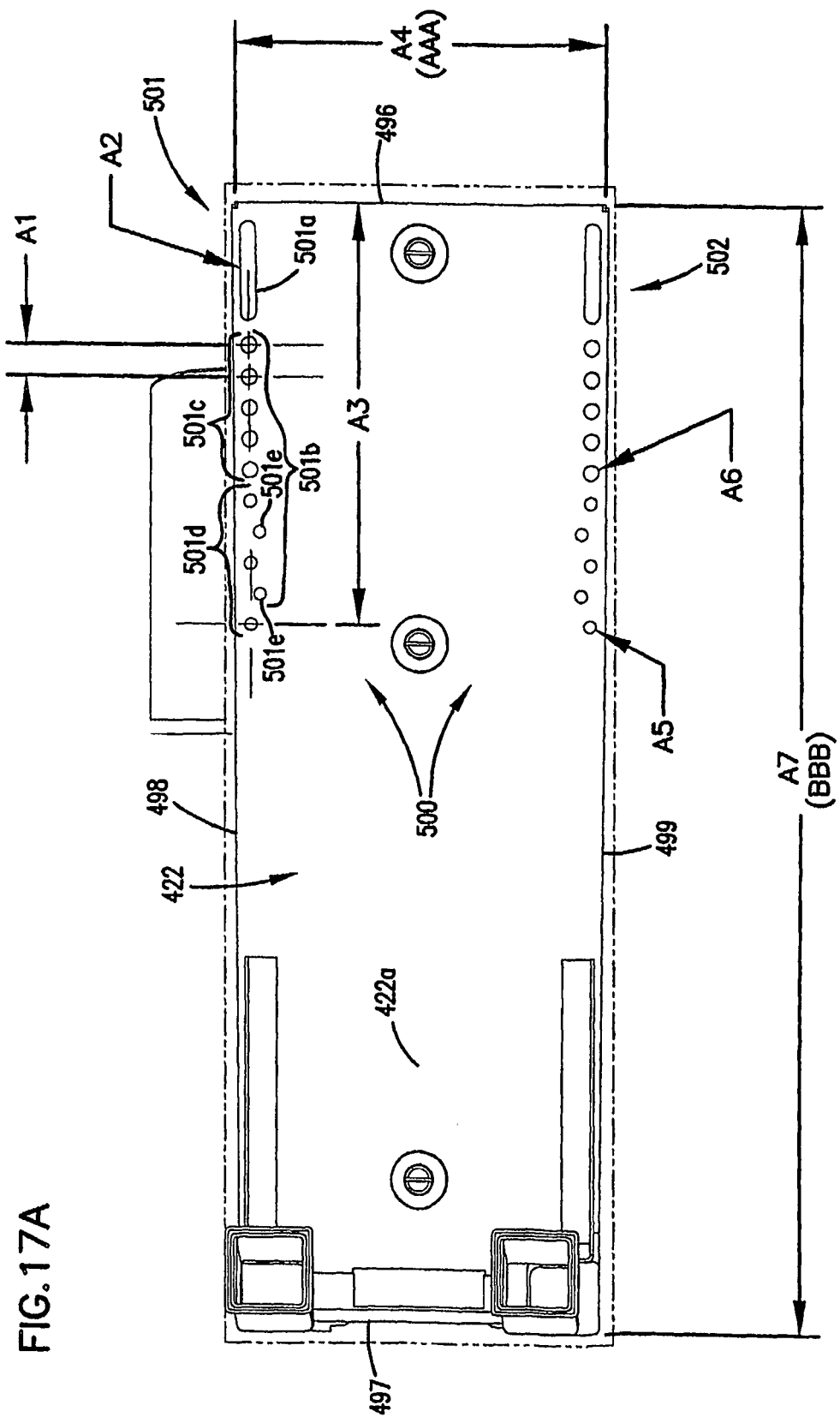
FIG. 17A is a top plan view of the scavenge duct assembly of FIG. 16, showing an alternate scavenge aperture arrangement to FIG. 17.

Attention is now directed to FIG. 17A. FIG. 17A is a view analogous to FIG. 17, but showing an alternate scavenger aperture arrangement.

Referring to FIG. 17A, reference numeral 422 indicates a lower scavenge portion corresponding generally to scavenge portion 22, FIG. 17, discussed above. Lower scavenge portion 422 comprises: opposite ends 496, 497 and opposite sides 498, 499. End 496 is generally adjacent wall 6e, FIG. 1, to which media pack 15 is sealed, during use. Thus, from the orientation shown in FIG. 17A, pulse jet assembly 18 would be operated to provide a pulse jet of air into a cartridge 15, FIG. 1, at a location above end wall 496, FIG. 17A.

Still referring to FIG. 17A, lower scavenger duct portion 422 includes scavenge aperture arrangement 500 thereon. The scavenge aperture arrangement 500 comprises an aperture arrangement or pattern through an upper surface 422a of lower scavenge duct 422. The scavenge aperture arrangement 500 allows for passage of air in particulate, drawn from barrier filter region 6, FIG. 1, into the scavenge system 11. For the arrangement shown, FIG. 17A, aperture arrangement 500 comprises a first aperture arrangement 501 and a second aperture arrangement 502 oriented adjacent and spaced from opposite sides 498, 499 respectively, and positioned such that cartridge 15, FIG. 1, positioned on surface 422, FIG. 17A, would be positioned between the aperture arrangements 501, 502 and would not be positioned to cover overlap aperture arrangements 501, 502.

As indicated above with respect to discussion of FIG. 17, the distance between the first and second ends 496, 497 of the housing bottom 422a, is sometimes referenced as distance BBB (or A7 as shown in FIG. 17A). The total open area of aperture arrangement 500, will generally be referred to as open X, with a total open area of the first aperture arrangement 501 being a total open area $X_1$ and a total open area of the second aperture arrangement 502 being a total area $X_2$. For the example shown in FIG. 17A, as with the arrangement of FIG. 17, $X_1=X_2$, although alternatives are possible. The distance between the opposite sides 498, 499 is referenced herein as AAA (or A4 as shown in FIG. 17A).

As with scavenger aperture arrangement 101, typical arrangements first scavenger aperture arrangement 501 will have a total open area $X_1$ to be configured such that at least 90% of the total open area $X_1$ is located within distance of 60%, typically 50%, of the distance (A7 or BBB) across the housing bottom 422 from the housing bottom first end 496 toward the second end 497. That is, at least 90% of the total area of aperture that comprises $X_1$, is located, typically, within the half of surface 422 toward end 496 (with a more broad statement being within 60% of the surface of bottom 422 toward end 496).

Also, as with the second scavenger arrangement 102, second scavenger arrangement 502 has a second open area $X_2$ and is configured such that at least 90% of the open area $X_2$ is located within a distance of 60%, typically within 50%, of the distance (A7 or BBB) across the housing bottom 422 from the housing bottom first end 496.

As indicated previously, the scavenge aperture arrangement of FIG. 17A is a modification of the arrangement shown in FIG. 17, and as with the arrangements previously discussed, usually aperture arrangements will be configured such that the first scavenge aperture arrangement 501 is such that 100% of the open area $X_1$ is located within a distance of 60%, typically within 50%, of the distance (A7 or BBB) across the housing bottom from the housing bottom first end 496; and, second scavenger aperture arrangement is configured to have a total open area $X_2$ and to be positioned that such 100% of the open area $X_2$ is within a distance of 60%, typically within 50%, of the distance (A7 or BBB) across a housing bottom from the housing bottom first end 496.

As with the arrangement of FIG. 17, although alternatives are possible, referring to FIG. 17A, the first aperture arrangement 501 is shown having two types of apertures: a first elongate aperture 501a and a plurality of spaced, smaller apertures 501b. Unlike the arrangement of FIG. 17, the apertures of the aperture arrangement 501 are not positioned with all apertures on a single line extending from end 496 toward end 497 in parallel to sides 498, 499. For the particular aperture arrangement 501 depicted, there is a first elongated aperture 501a and a plurality of spaced, circular apertures 502b, although alternatives are possible. The first elongate aperture 501a, similar to aperture arrangement 101a discussed above, typically has an aspect ratio (length to width) of at least 5, and typically within the range of 5-10 inclusive, although alternatives are possible.

The aperture 501a typically has a total open cross-sectional area corresponding to at least 35% of $X_1$, typically up to 45%-60%, inclusive of $X_1$, although alternatives are possible.

It is noted that the smaller aperture arrangement 501b comprises two types of apertures: a first set 501c of larger apertures oriented adjacent and spaced from elongate aperture 501a, with the apertures of said 501c being on a same line as elongate aperture 501a. And, a second set 501d of smaller apertures which includes some apertures on the line and some off set from the line defined by elongate aperture 501a and aperture set 501c. Referring to set 501c, off set apertures are indicated individually at 501e. The apertures 501e are off set from the previously defined line, toward a center of surface 422a, in particular they would be positioned toward a filter cartridge 15, FIG. 1, when positioned on surface 422a. The spacing of individual apertures 501e toward the cartridge, helps accommodate for better scavenge, as the cartridge begins to taper downwardly in width in extension from region adjacent end 496, in a direction toward end 497. In the arrangement depicted, set 501c of larger apertures is positioned closer to elongate aperture 501a, than is the off-set aperture set 501e.

As with the arrangement of FIG. 17, the elongate aperture 501a is typically positioned closer to wall 496 than are the remaining apertures 501b. Usually the elongate aperture 501a is positioned at a location spaced from the wall 496 within a distance of 25% of the distance from wall 496 to wall 497 (i.e., 25% of dimension A7 or BBB).

It is noted that aperture pattern 502, with respect to the features discussed in the previous paragraph, is similar to aperture pattern 501, in typical arrangements. Of course alternatives are possible.

It is again noted that for the assembly 1, FIG. 1, flow through housing 6, FIG. 1, is in the general direction shown at arrows 110. Thus, as previously noted, the flow has both a downward component and a component toward wall 6e. The downward component provides that while the dust tends to move toward end 6e, some become settled on surface 422a in the region of apertures of the aperture set 501d. The scavenge pattern of FIG. 17A, by comparison to the pattern of FIG. 17, can better accommodate scavenge.

Referring to FIG. 17A, dimensions noted for the example are as follows: A1=0.62 inch (15.7 mm); A2=a slot 0.31 inch×2.0 inch (7.9 mm×50.8 mm); A3=8.5 inch (215.9 mm); A4=7.52 inch (191 mm); A5=apertures 0.25 inch diameter (6.4 mm diameter); A6=apertures 0.31 inch diameter (7.9 mm diameter); A7=22.8 inch (579.0 mm).

F. A Cartridge Retention and Lock Arrangement, FIGS. 19-22.

Typically, the assembly 1 will include a serviceable filter cartridge retention and lock arrangement, for positioning the filter cartridge 15, FIG. 1, properly within the barrier filter section 6, during use. The system will ensure that the cartridge 15 is maintained in appropriate position, and maintained under seal, during operation of assembly 1.

In FIG. 1, to facilitate viewing of internal componentry in assembly 1, the assembly 1 is depicted schematically, and features depicting a retention and lock arrangement for the cartridge 15, are not shown. Such features are shown, however, in FIGS. 19-22. It will be understood that the retention and lock assembly of FIGS. 19-22, would typically be used inside of the barrier filter region 6, FIG. 1, as described.

Figure 19:
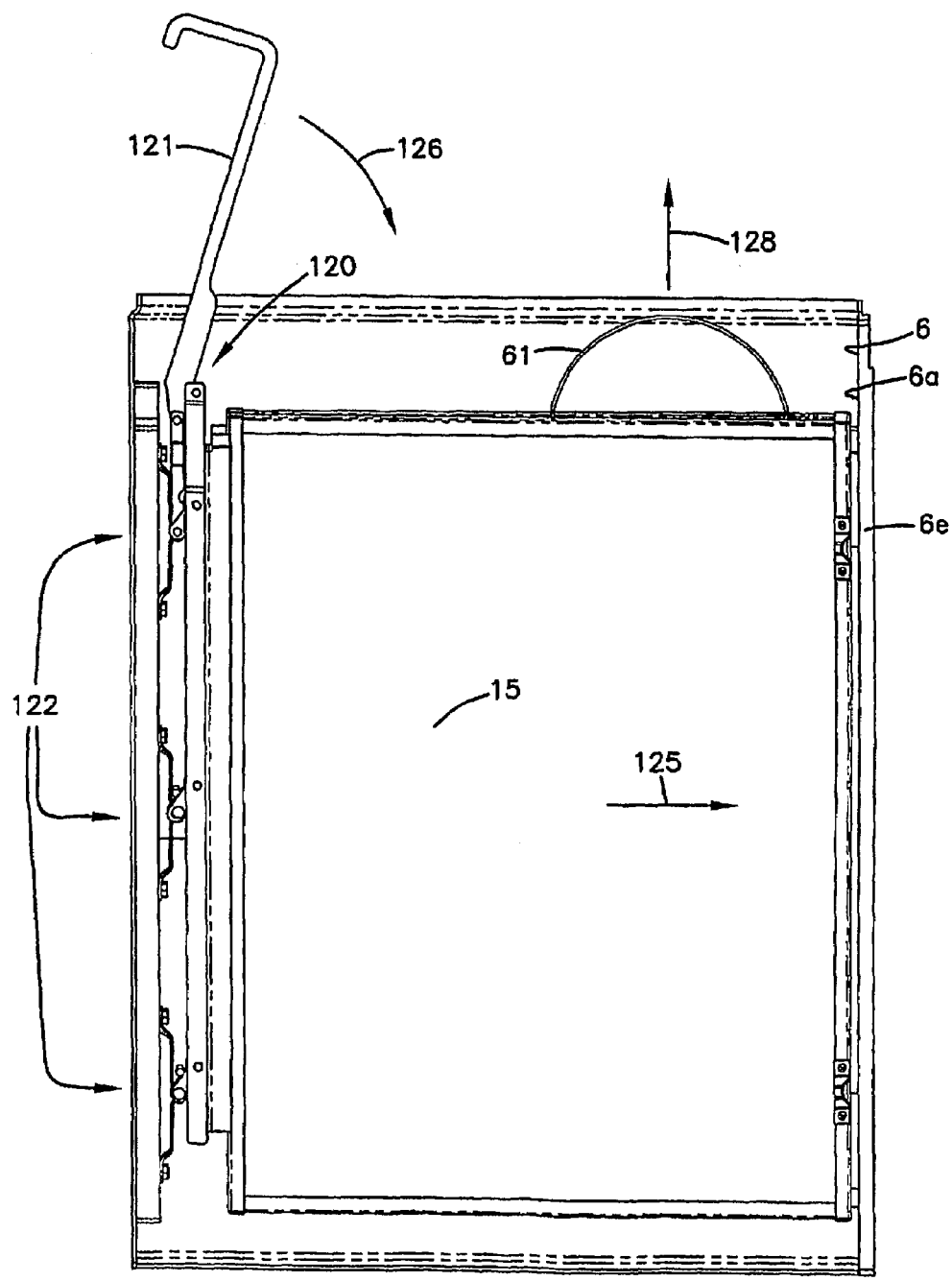
FIG. 19 is a schematic side view of a biasing and lock mechanism positionable with the assembly of FIG. 1 and useable to secure a serviceable filter cartridge in position, in the assembly of FIG. 1.

Referring to FIG. 19, barrier filter section 6 is shown in side elevational view, with a side wall facing the viewer removed, for viewing of internal detail. Cartridge 15 is depicted within interior 6a of barrier section 6. The cartridge 15 is positioned to be sealed against wall 6e. The cartridge 15 is generally as shown in FIGS. 5-9.

Still referring to FIG. 19, the filter cartridge biasing and lock arrangement is indicated generally at 120 and includes actuator handle 121 and biasing arrangement 122. The filter cartridge biasing and lock arrangement 120 is generally configured to bias the cartridge 15 under pressure in the direction of arrow 125, to facilitate sealing against wall 6e. The biasing in the direction of wall 125 is generally actuated by moving actuator 121 in a general direction of arrow 126, through a downward arc. Thus, in FIG. 19, the biasing lock arrangement 120 is shown in a generally unlocked orientation. As a result the cartridge 15 can be lifted out of barrier section 6, in the direction of arrow 128, by handle 61.

It is noted that handle 61 would typically be made to collapse, during installation, and to be extended as shown in FIG. 19, during manipulation.

Figure 20:
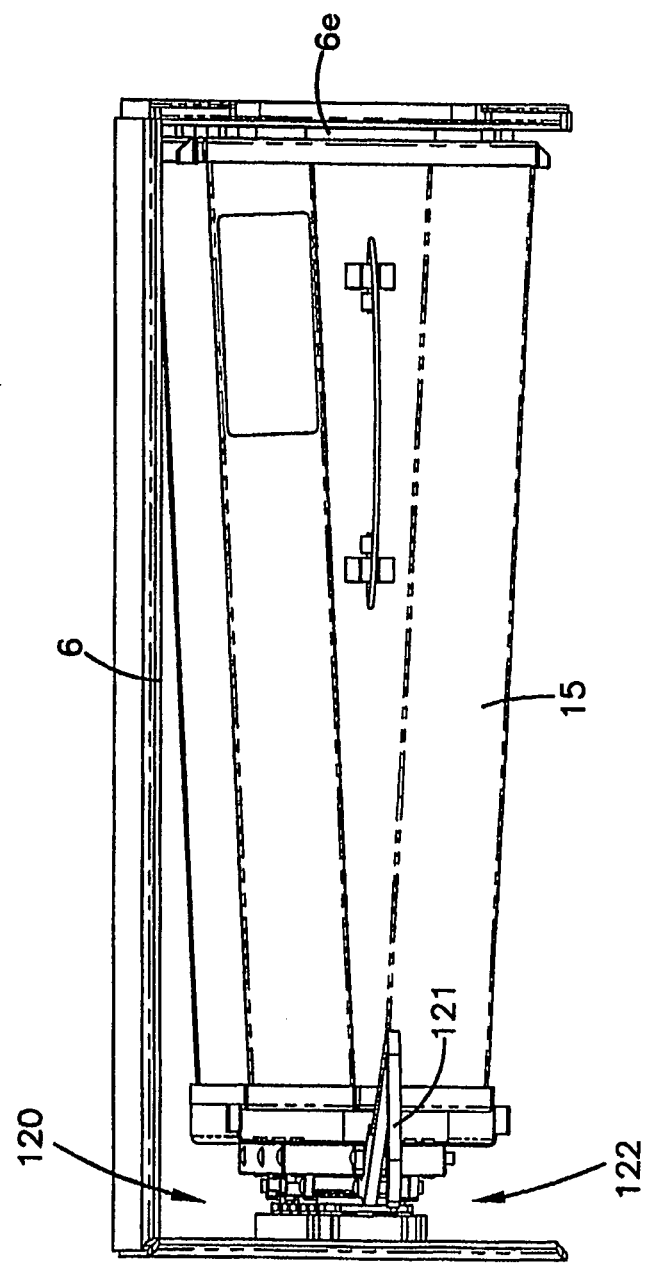
FIG. 20 is a top plan view of the assembly shown in FIG. 19.

In FIG. 20, a top plan of the assembly portions of FIG. 19.

In FIG. 19, the assembly is shown with the precleaner 5 removed, to allow access to interior 6a of section 6, thus to provide for servicing of cartridge 15.

Figure 21:
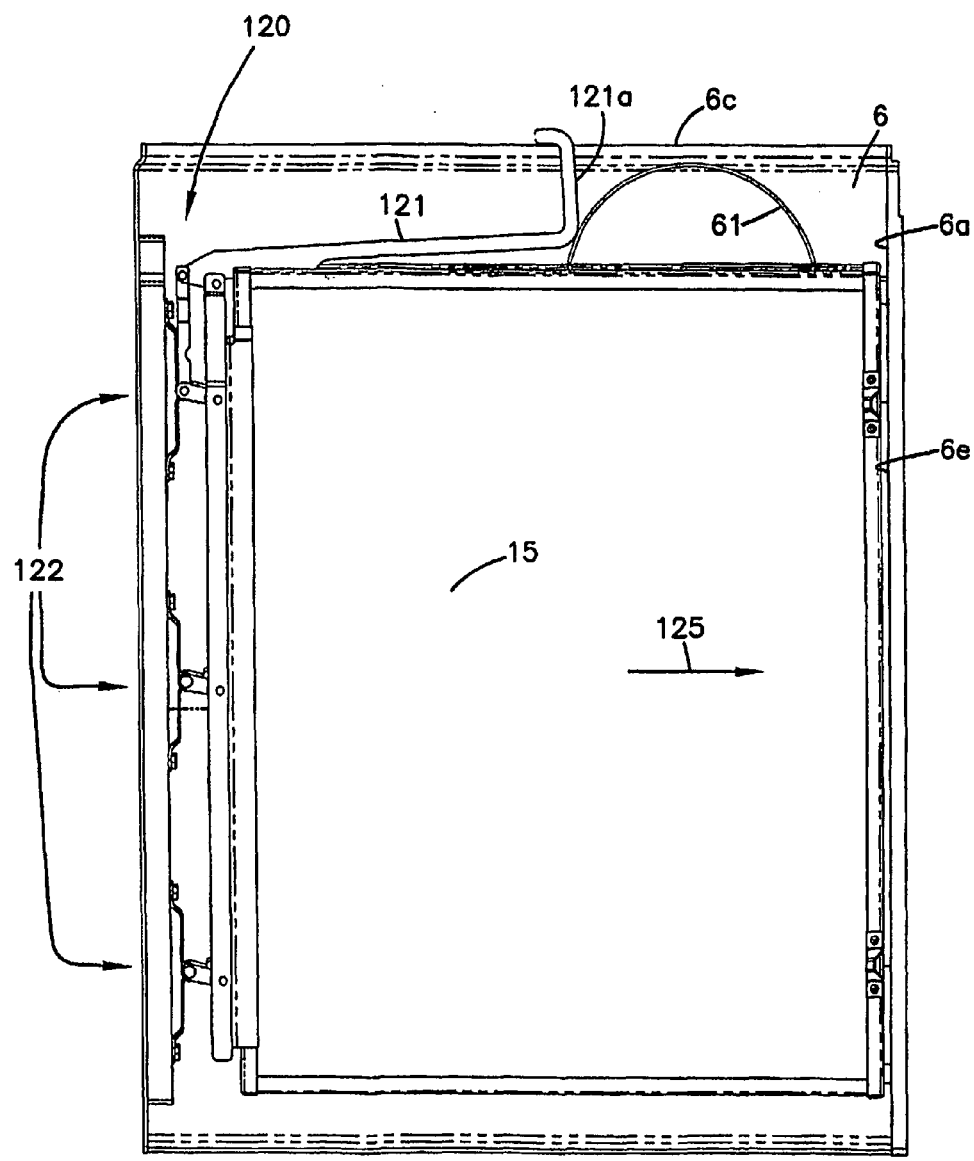
FIG. 21 is a view analogous to FIG. 19, but showing the biasing and lock mechanism in a closed and locked orientation.
Figure 22:
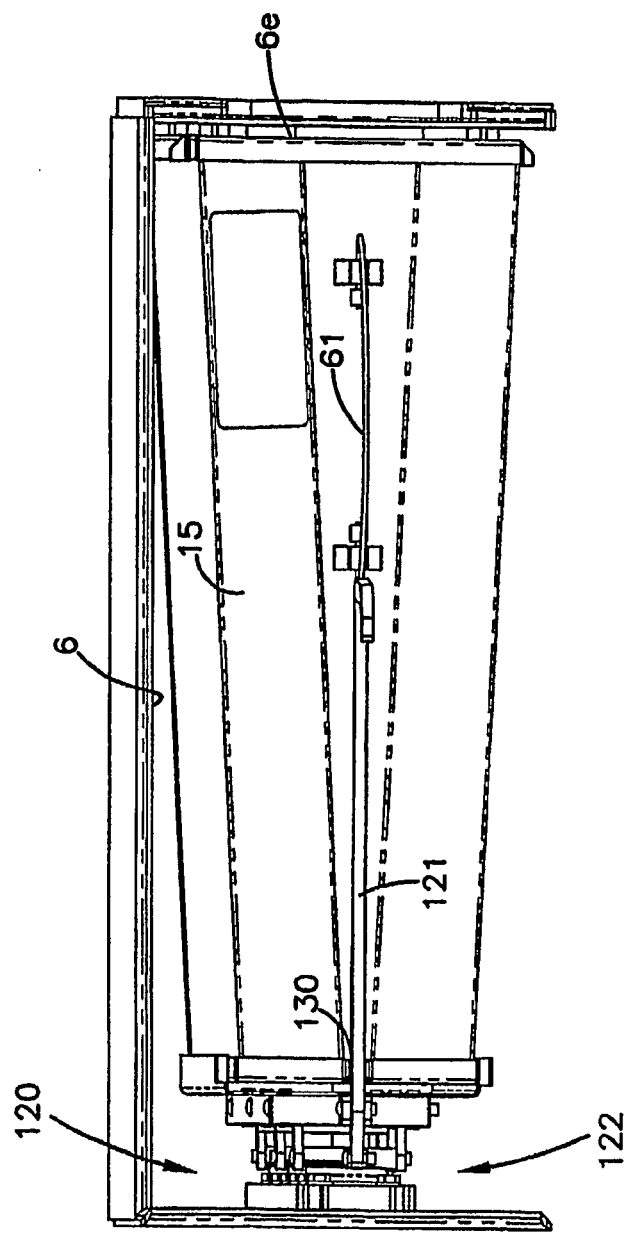
FIG. 22 is a top plan view of the assembly shown in FIG. 21.

In FIGS. 21 and 22, portions of the assembly 1 depicted in FIGS. 19 and 20 are shown with the filter cartridge biasing and lock arrangement 120 in a locked orientation, i.e., handle 121 has been lowered. It is noted that the filter cartridge 15 is now biased securely into an operational sealed orientation, by being biased in the direction of arrow 125, FIG. 21, against wall 6e. Handle 61 is still shown in an open or extended position, but in many instances it would easily have been collapsed prior to lowering of handle 121. It will be understood that when a precleaner 5, FIG. 1, is positioned over top 6c, handle 121 will be secured in a locked position shown in FIG. 21. In particular, and referring to FIG. 21, handle 121 includes end projection 121a thereon, which projects upwardly from cartridge 15 when the handle 121 is lowered. The projection 121a is sized to fit between the cartridge 15 and the precleaner 5 (when in position) to inhibit cartridge 15 from unintended vertical movement when installed for operation.

In general, the biasing lock arrangement 120 will be configured so that biasing and locking of the cartridge 15 with sealing pressure in the direction of arrow 125 will be maintained, as long as the handle 121 is in the lowered position, FIG. 21. Pressure of biasing would be relieved, when the handle 121 is lifted.

For the particular arrangement shown, inter-engagement between the handle 121 and the cartridge 15 is provided. Referring to FIGS. 5, 8 and 9, end piece 51 is shown with a central recess or notch 130 therein, to receive a portion of the handle 121, FIG. 21, as it is lowered. The notch 130 permits the handle 121 to be completely lowered, and also provides for engagement to ensure proper alignment, during assembly.

Referring to FIG. 9, when the cartridge 15 is intended to be vertically symmetric to allow assertion with either plate 58 or plate 59 above, a second, opposite, notch 130a could be provided as shown in bottom 59.

FIG. 22, of course, is a top plan view of the arrangement of FIG. 21.

II. A Second Example Assembly, FIGS. 23-39

A. General Filter Operation, FIGS. 23, 24, 24A.

Figure 23:
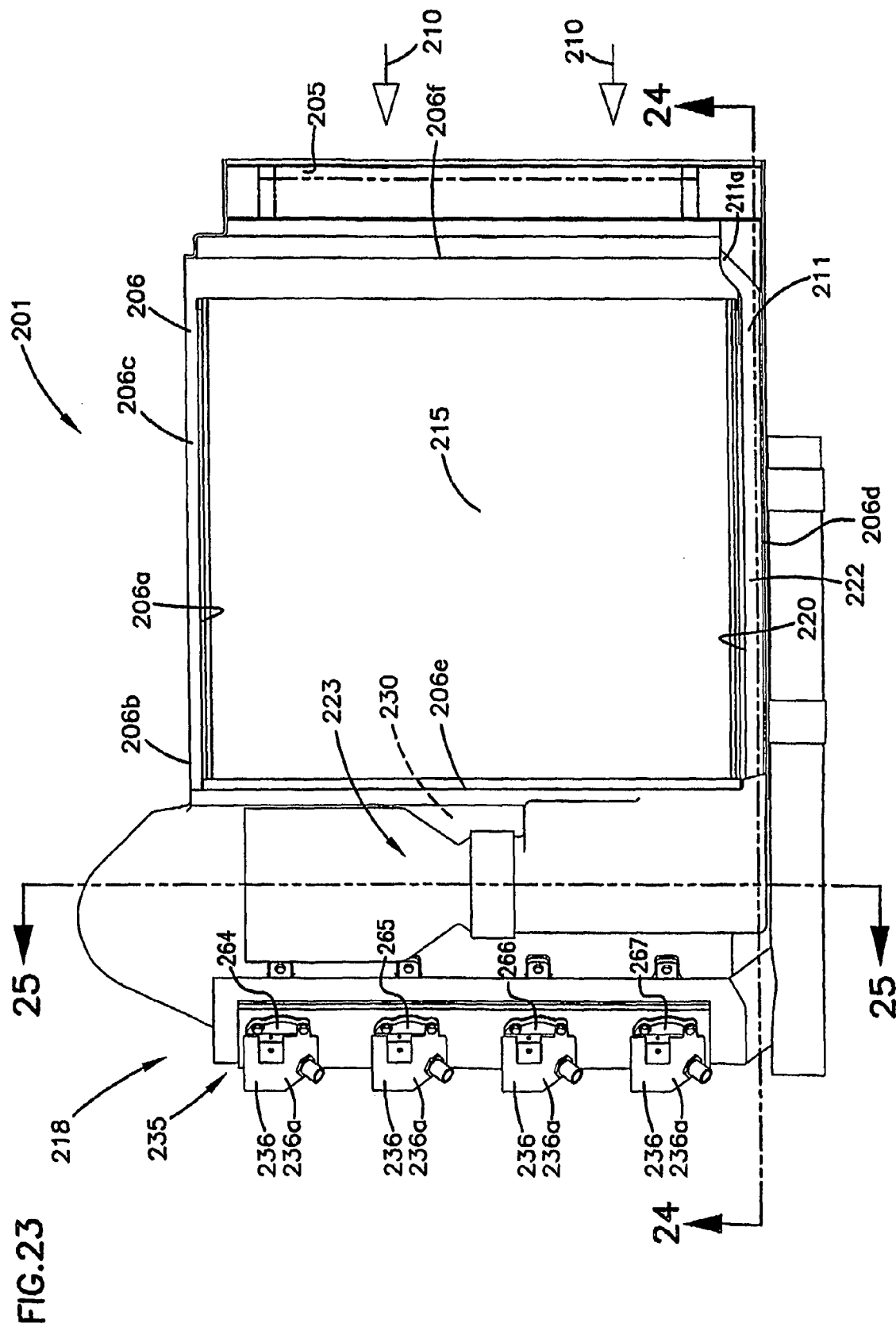
FIG. 23 is a schematic side elevational view of a second air cleaner assembly according to a second embodiment of the present disclosure; the assembly of FIG. 23 being shown with a side panel removed to provide a viewing of internal detail.

The reference numeral 201, FIG. 23, generally indicates a second air cleaner assembly including selected features according to the present disclosure. The air cleaner assembly 201 comprises a precleaner stage 205 and a barrier filter stage 206. In FIG. 23, assembly 201 is shown with a side panel facing the viewer removed, so that selected internal structure can be viewed. FIG. 23 is schematic. For the particular assembly 201 depicted, the precleaner stage 205 is positioned adjacent, i.e., on an end of the barrier filter stage 206, although alternatives are possible in alternate assemblies using the selected principles according to the present disclosure. (For example, in the assembly of FIG. 1, the precleaner stage 5 was positioned above the barrier filter stage 6.)

In operation, air enters precleaner stage 205 in the direction indicated by arrows 210. The precleaner stage 205 would typically comprise a frame or housing including a plurality of cyclonic separators, similarly to precleaner stage 5, FIG. 1. Separated particulates (dust) would be removed from precleaner 205 by precleaner scavenger portion 211a of scavenger system 211. Air from the precleaner stage 205 is then directed into interior 206a of barrier filter stage 206.

Service access to interior 206a of barrier filter stage 206 can be provided in several manners. For example, barrier filter stage 206 would be provided with a removable cover at top 206c to provide access to interior 206a. Alternatively, precleaner 205 could be removable, to provide service access into interior 206a.

The barrier filter stage 206 can be viewed as comprising a housing 206b having a top 206c, bottom 206d, an air flow outlet end 206e and opposite second end 206f. There is also provided a side panel 206g, FIG. 24 and an opposite side panel, removed for viewing in FIG. 23 but shown generally in FIG. 24 at 206h. As a result, barrier filter stage 206 can be viewed as a sub housing or a barrier filter housing.

Serviceable filter cartridge 215 is operably positioned within interior 206a of barrier filter stage 206. The typical filter cartridge 215 has a v-pack shape, similarly to filter cartridge 15, FIGS. 1 and 5-9. The particular filter cartridge 215 depicted for the example shown also has unique specific v-pack filter dimensions and configurations discussed in greater detail below. Filter cartridge 215 is also configured for "out-to-in" flow, during filtering.

The assembly 201, FIG. 23, also includes a pulse jet assembly or arrangement 218. The pulse jet assembly or arrangement 218 is also configured to direct selected jet pulses of air through the filter cartridge 215, in a direction generally opposite to normal filtering flow, i.e., directed in-to-out with respect to direction of flow through the media. Such jet pulses can be directed to knock affected dust or other particulates off of the exterior of the filter cartridge 215, and into bottom region 220 of barrier filter stage 206. From there the dust or other particulates is removed by a barrier filter stage scavenge or scavenger 222 of scavenger system 211. A blower arrangement, 223, FIG. 23, would be used for operation of the precleaner scavenge portion 211a and first stage scavenge portion 222.

Still referring to FIG. 23, air which is filtered by passage through filter cartridge 215 is generally directed into clean air plenum 230. From there, it can be directed to a turbo intake, engine intake, etc., as needed and appropriate for the system involved.

Figure 24:
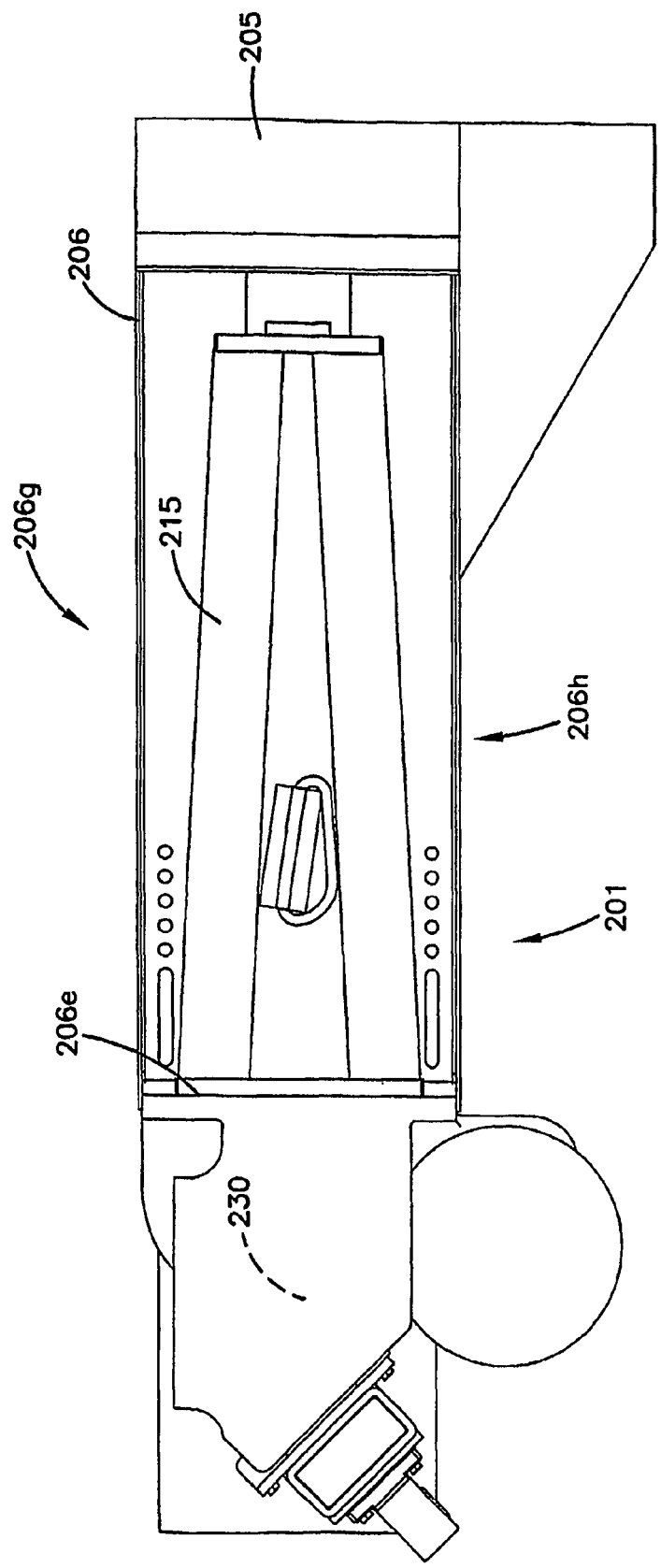
FIG. 24 is a top view of the assembly of FIG. 23, with a cover removed to show internal detail.

Referring to FIG. 24, it is noted that the particular assembly 201 depicted, is configured to receive and utilize a single V pack filter cartridge 215. Principles according to the present disclosure could be applied in alternate arrangements, which include more than one serviceable filter cartridge.

Figure 24A:
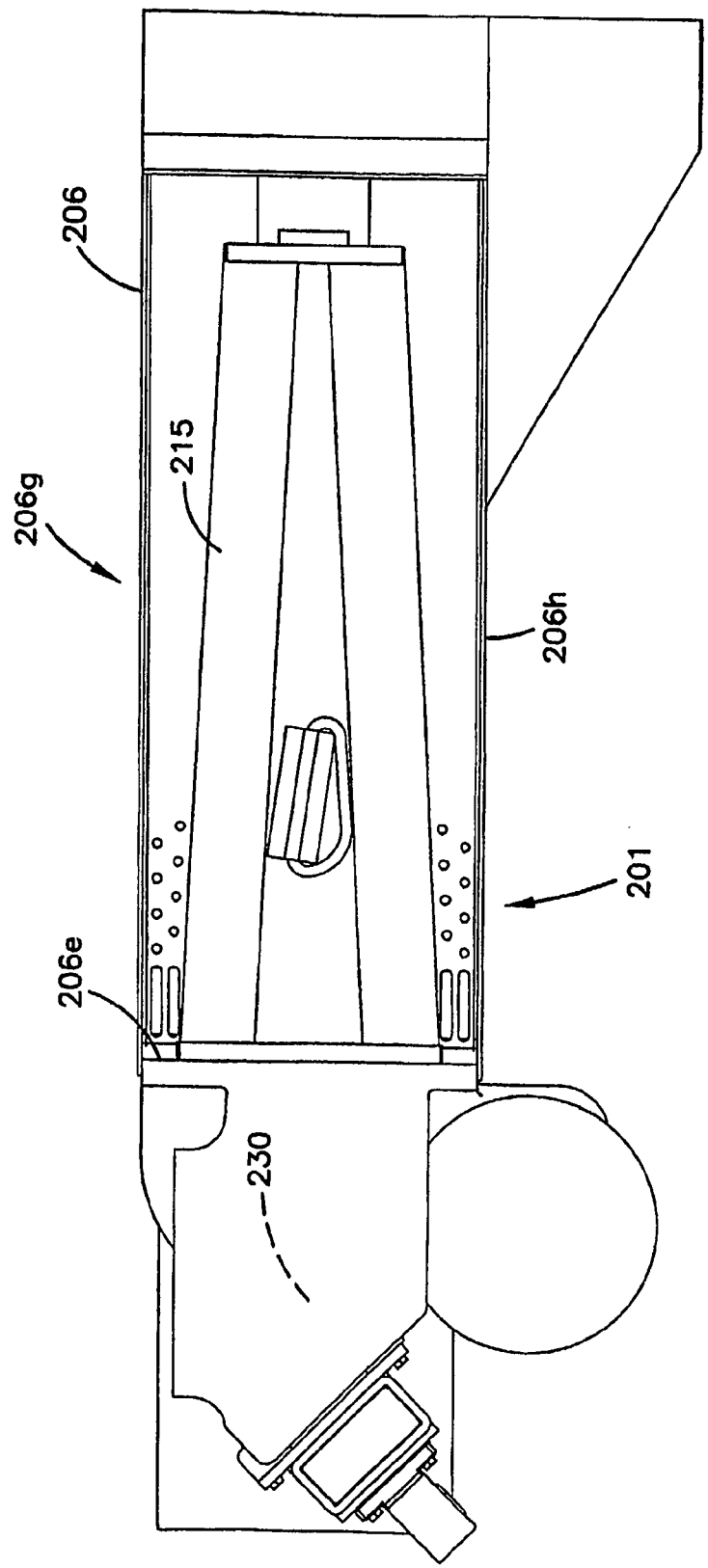
FIG. 24A is a top view analogous to FIG. 24, but showing an alternate scavenge aperture arrangement.

FIG. 24A is a view analogous to FIG. 24, but depicts an alternate pattern for scavenge apertures. The alternate pattern is discussed further below, in connection with description of FIG. 38A.

B. The Pulse Jet and V-Pack Arrangements Generally, FIGS. 25-30.

Figure 25:
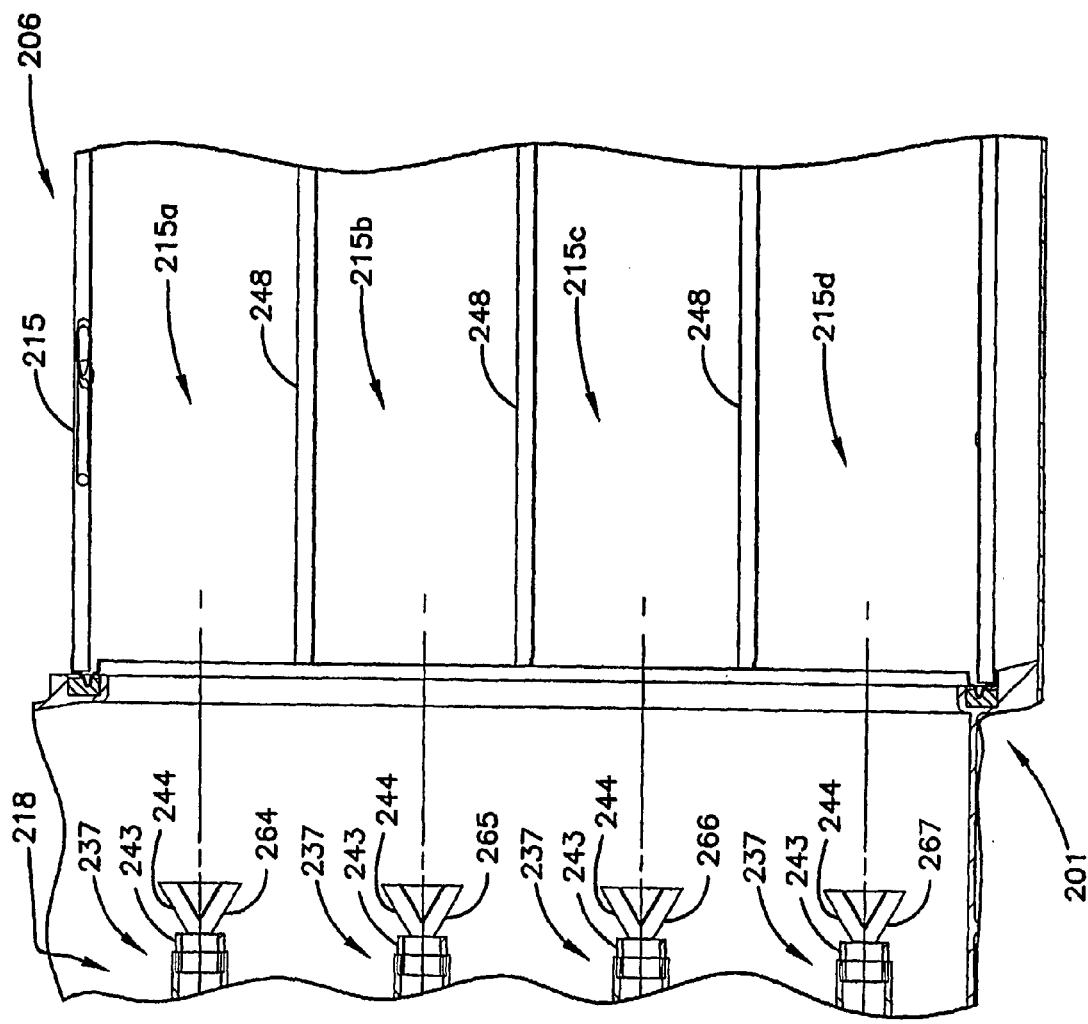
FIG. 25 is an enlarged fragmentary view depicted in cross-section showing a pulse jet portion of the assembly depicted in FIG. 23.

In FIG. 25, an enlarged schematic, side cross-sectional view of a portion of the assembly in FIG. 23 is shown. Here a portion of interior structure in the air cleaner assembly 201 is depicted. The view depicts the pulse jet arrangement 218 as comprising nozzle and splitter arrangements 237 described below, to clean the v-pack arrangement.

Referring to FIG. 23, the pulse jet arrangement 218 would generally comprise valve arrangements 236 and accumulator 235.

As for the air cleaner assembly 201 depicted in FIG. 23, the valve arrangement 236 comprises four valves 236a, although alternate arrangements and an alternate number of valves could be used. For the particular air cleaner assembly 201 depicted, the four valves 236a are arranged in a vertical stack as shown.

From a comparison of FIGS. 23 and 25, it can be seen that the valves 236a control direction of pulse jets of air from accumulator 235 through nozzles 243 and splitters 244. For the assembly shown there are four nozzles 243 and four splitters 244, one each associated with each valve 236a.

In FIG. 25, a portion of barrier filter stage 206 is viewable with serviceable filter cartridge 215 positioned therein. The cross-section of FIG. 25, is taken through the center of the filter cartridge 215. It can be seen that the filter cartridge 215 is divided, in this instance vertically, into multiple sections or stages. The number of sections or stages, is a matter of choice depending on the particular air cleaner, system and cartridge configuration involved. Typically there will be at least two, usually at least three sections or stages, typically not more than five, although alternatives are possible. The particular cartridge 215 depicted comprises four sections or stages 215a, 215b, 215c and 215d, each separated from the next adjacent one(s), by internal barriers 248. From FIG. 25, it can be seen that each splitter 244 is positioned to direct air into one each of the chambers 215a-215d.

It is noted that for the assembly 201 shown, the cartridge 215 is positioned so that the sections or stages 215a-215d are stacked vertically on one another. This will be typical.

The serviceable cartridge 215 is depicted in detail, in FIGS. 26-30.

Figure 29:
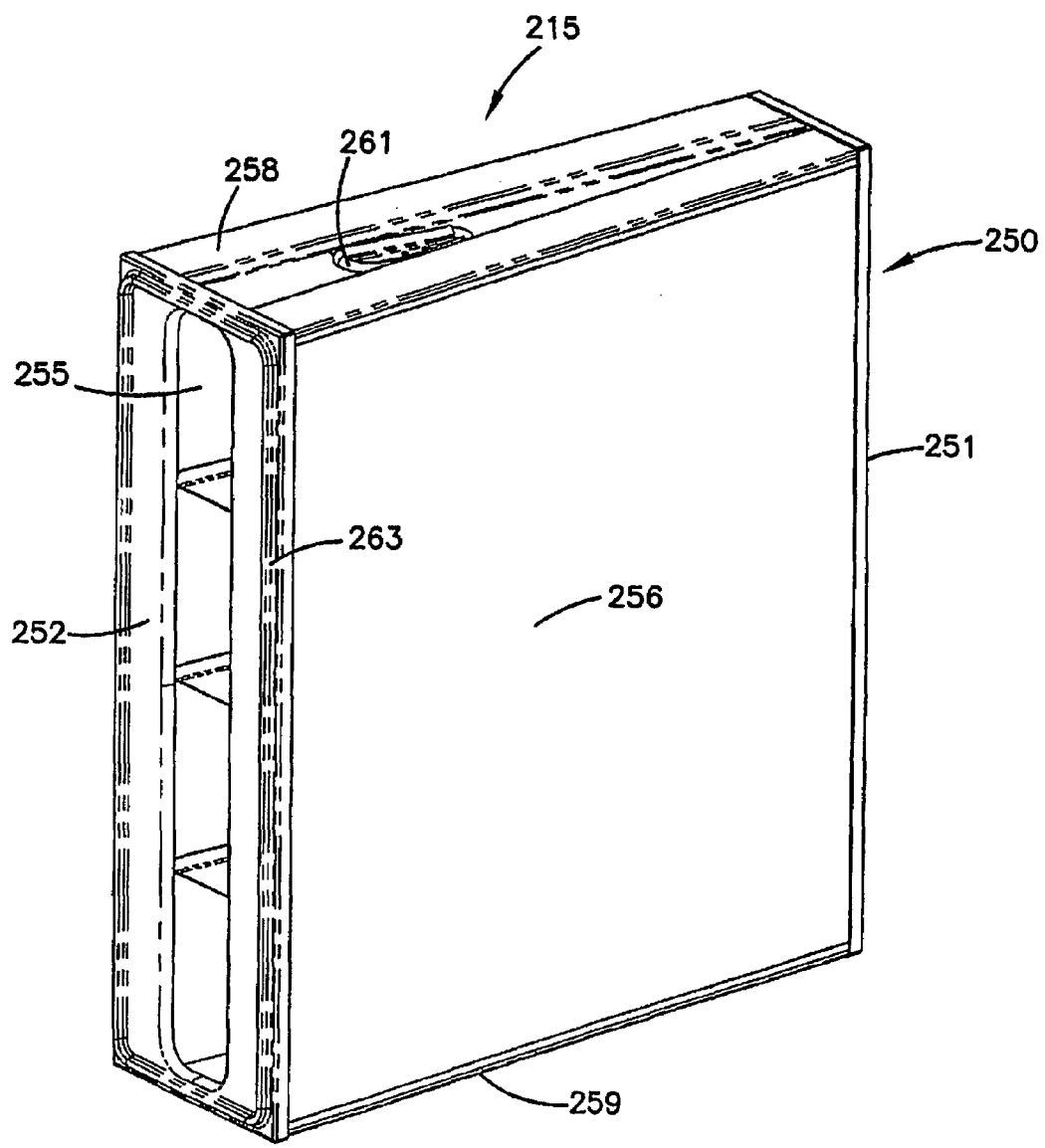
FIG. 29 is a perspective view of the filter cartridge of FIGS. 26-28.

In FIG. 29 a top perspective view of the serviceable cartridge 215 is provided. The cartridge 215 comprises: v-pack panel arrangement 250; a closed narrow end cover 251; and, an open air outlet end piece 252. The closed cover 251 is positioned at a narrow end of the v-pack panel arrangement 250 and the open end piece 252 is positioned at a wide end of the v-pack panel arrangement 250. The cartridge 215 also includes top and bottom covers 258, 259.

Still referring to FIG. 29, v-pack panel arrangement 250 comprises first and second panels 255, 256. Each panel 255, 256 typically comprises a panel of barrier media, for example pleated media. Typically when the media is pleated, it is positioned within cartridge 215 such that a longitudinal extension of the pleats is directed between top and bottom pieces 258, 259.

Figure 26:
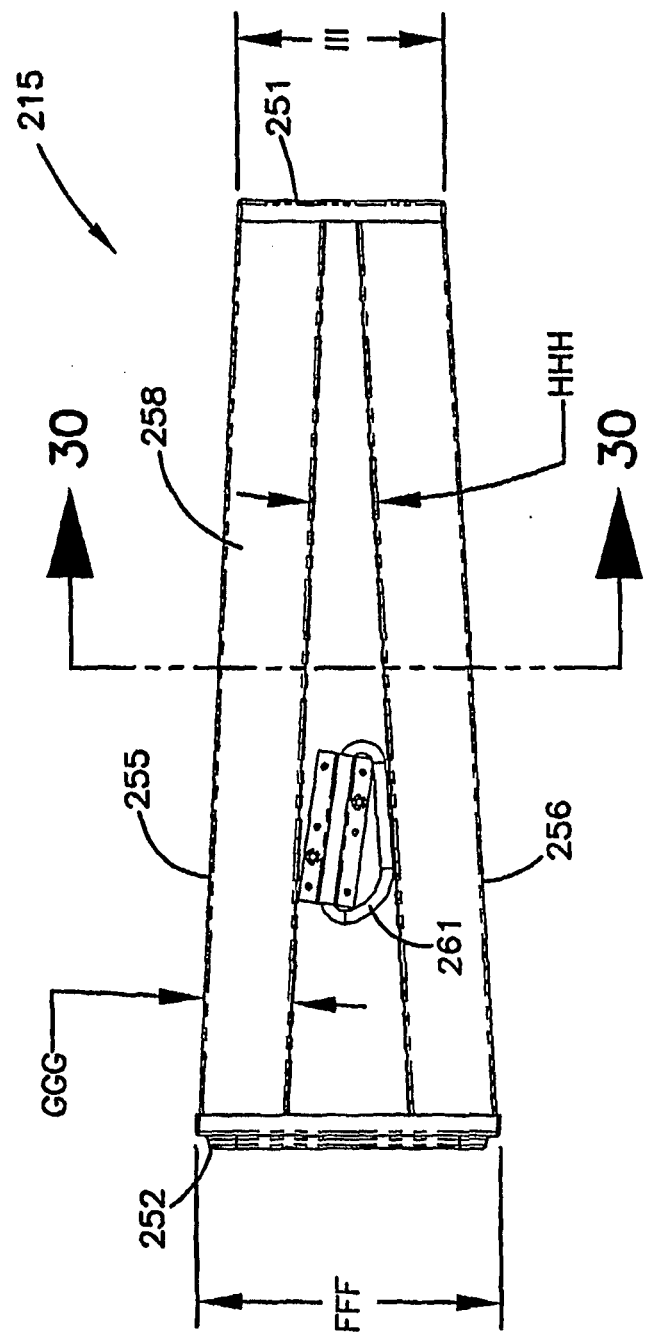
FIG. 26 is a top plan view of a serviceable filter cartridge used in the assembly of FIGS. 23 and 24.

Referring to FIG. 26, the panels 255, 256, are positioned within cartridge 215 to extend at Angle HHH relative to one another. Angle HHH is typically at least 4° and not greater than 10°, usually 5-7°, inclusive. For the example shown it is 5.76°.

Figure 28:
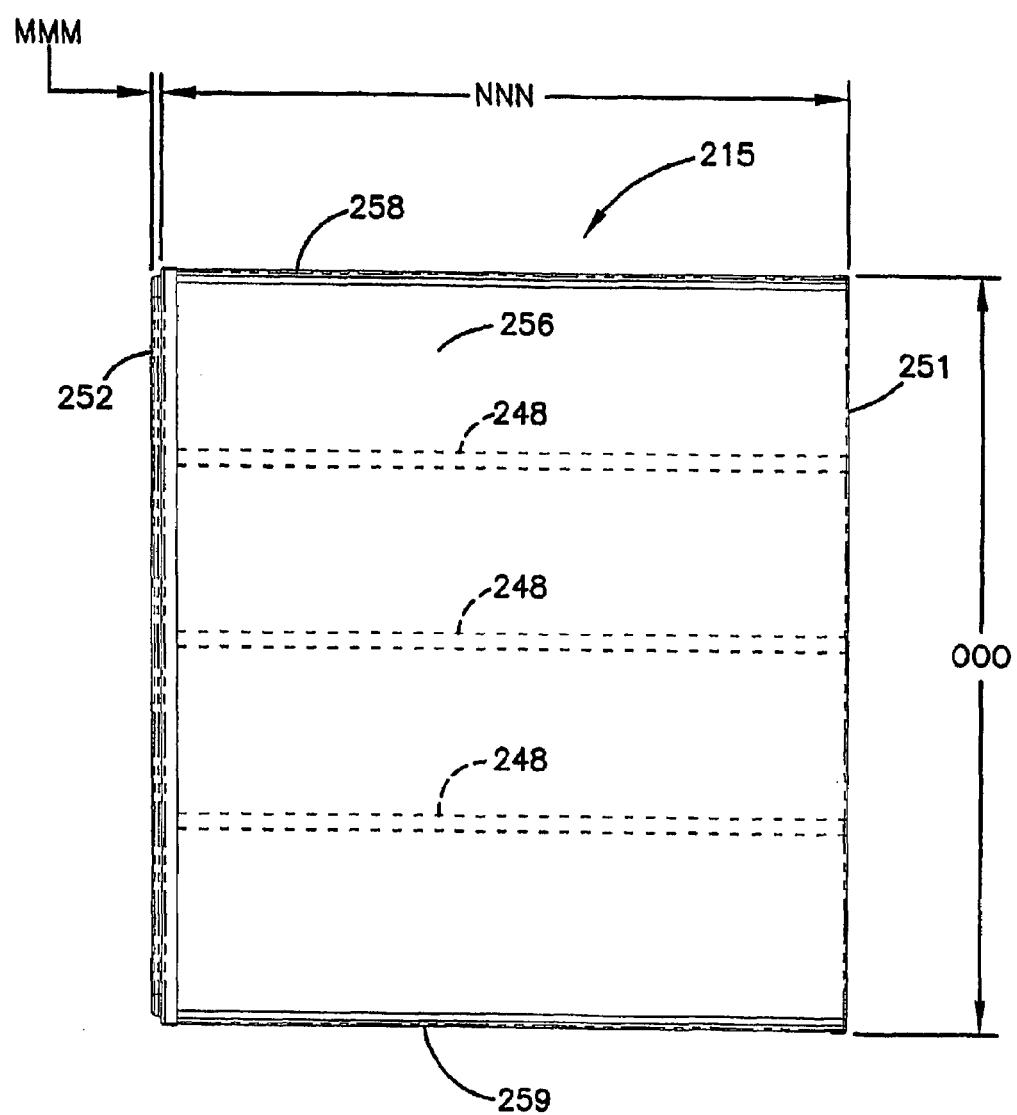
FIG. 28 is a side elevational view of the cartridge of FIG. 26, with phantom lines indicating internal divider structure.

In FIG. 28, cartridge 215 is depicted in side elevational view. In phantom lines, dividers 248, discussed above in connection with FIG. 25 are shown. The dividers 248 would not typically be viewable in a side elevational view, since panel 256 would block the view.

It is noted with respect to FIG. 28, that cartridge 215 is fit with a top cover 258 and a bottom cover 259, which enclose the cartridges 255, 256. Typically, the media would be provided in a pleated form, in a frame. Two framed sections of pleated media would be used to form the side panels 255, 256. These two framed pieces would be fitted with top cover 258, bottom cover 259, closed end piece 251 and open end piece 252, to form cartridge 215.

Figure 27:
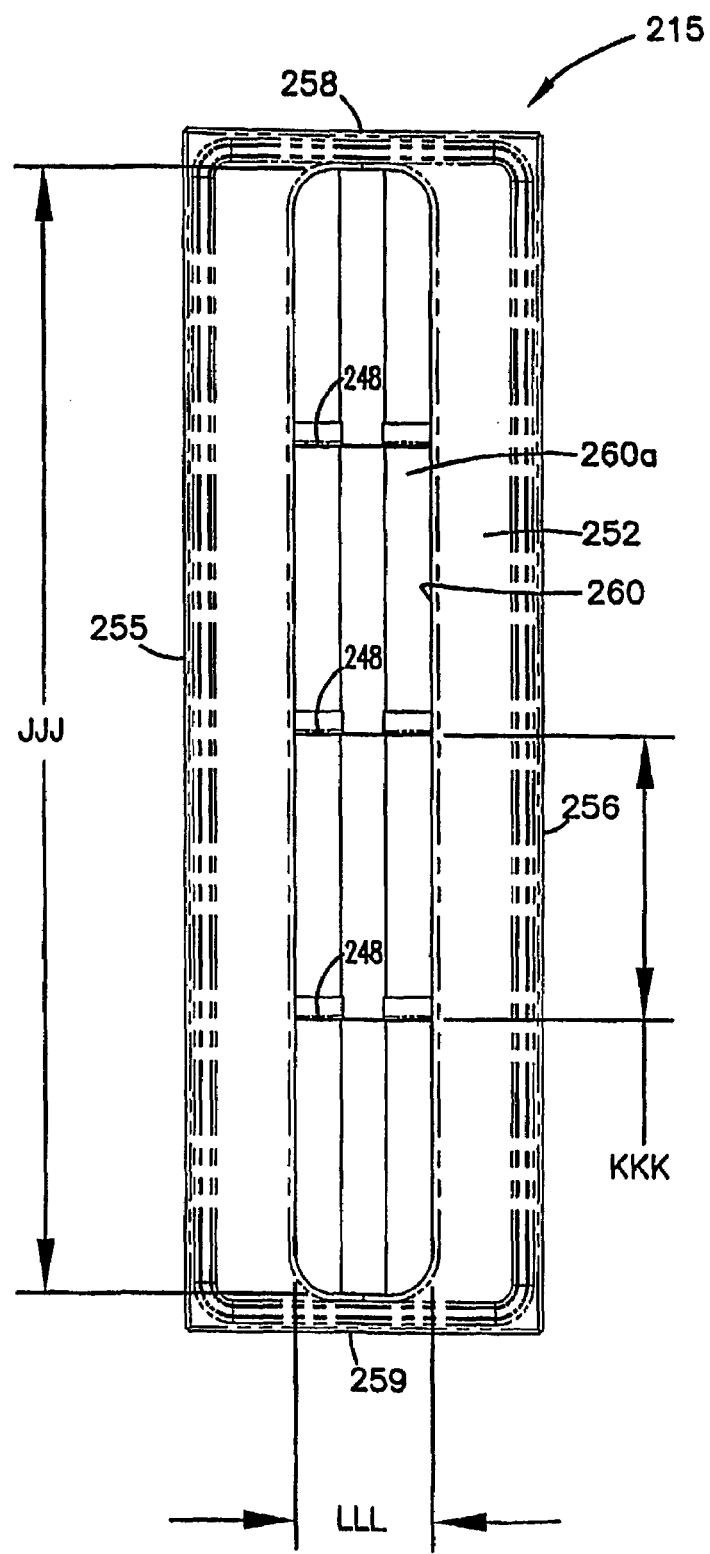
FIG. 27 is an end elevational view of the cartridge of FIG. 26; the view of FIG. 27 being toward an outlet end of the cartridge.

Attention is now directed to FIG. 27. FIG. 27 is an end view of cartridge 215, the view being generally taken toward open end piece 252. In FIG. 27, one can view through opening 260 into interior 260a of cartridge 215. Dividers 248 are now viewable.

Aperture 260 is a tall, narrow, opening. Typically the aspect ratio (height to width) of the opening is at least 0.06, within the range of 0.07-0.14, and not more than 0.17. For the example shown, dimension JJJ=23.9 inches (607 mm) and dimension LLL=2.93 inch (74.4 mm). It is noted that the dividers 248 are evenly spaced along the height dimension, although alternatives are possible. In the example shown, the spacing between the divider 48 is indicated at dimension KKK as 5.95 inch (151 mm).

Figure 30:
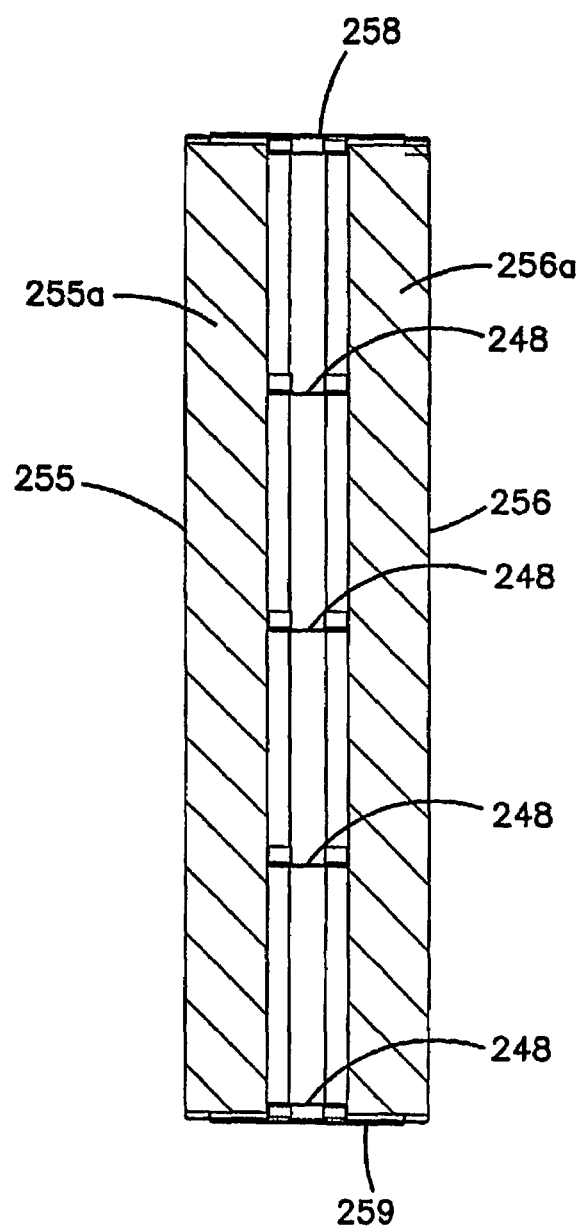
FIG. 30 is a schematic cross-sectional view taken along line 30-30, FIG. 26.

FIG. 30 is a cross-sectional view taken along line 30-30, FIG. 26. The top piece 258, bottom piece 259, panels 255, 256 and dividers 248 are readily viewable. Also viewable is pleated media 255a, 256a in each of the panels 255, 256.

As indicated above, in FIG. 29 a top perspective view of cartridge 215 is presented. Attention is directed to handle arrangement 261. Handle arrangement 261 is provided on top piece 258, to facilitate lifting of the cartridge 215. The handle arrangement 261 can have a variety of constructions, and is typically made collapsible, so it can be lowered when not in use. The particular handle arrangement 261 depicted, comprises a loop handle that can fold over, as shown, when not in use. The loop would typically be sized for extension therethrough of a human hand, in some instances a gloved hand, for example in some instances it may be large enough to be grasped by a person's hand wearing an arctic glove. This will in part be a matter of choice for the application involved.

Still referring to FIG. 29, it is noted that bottom piece 259 can be configured to include a similar handle. This is an indication that the cartridge 215, can, if desired, be manufactured with appropriate symmetry to be installed with either piece 258 or piece 259 positioned above the remainder of the cartridge 215, during assembly. Alternate approaches are possible. For example, the cartridge 215 could be specifically manufactured without symmetry, so that it can only be properly inserted into (and be operably installed in) the filter stage or housing 206, in one vertical orientation. When this is done, typically a handle would not be provided in the bottom cover piece 259.

Attention is now directed to open end piece 252, FIG. 29. End piece 252 can be provided with a gasket arrangement, to provide a seal, as is cartridge 15, FIG. 9. Indeed it could be provided with a gasket and compression stop arrangement, as is cartridge 15, FIG. 9. However, for the particular assembly depicted, end piece 252 is provided with a raised rib 263 thereon. The rib 263 is sized to press into a gasket positioned in housing wall 206e, during assembly, to form a seal.

Referring to FIGS. 26-30, example dimensions for an example useable cartridge 215 are provided. The dimensions are as follows: dimension FFF=7.63 inches (193.8 mm); dimension GGG=2.16 inches (54.9 mm); angle HHH (again) =5.76°; and dimension III=5.21 inch (132.3 mm); dimension MMM=0.312 inch (7.9 mm), dimension MMM=the amount of projection of bead 263. Dimension NNN=23.1 inch (586.7 mm); and dimension OOO=25.5 inch (647.7 mm). Of course alternate dimensions are possible, using techniques according to the present disclosure. The dimensions identified, however, provide a guide to indicate how the principles of the present disclosure can be applied.

As with assembly 201, for a typical operation, a pulse jet sequencing is from top to bottom. Thus chamber 215a is initially pulsed by pulse jet 264, then chamber 215b by pulse jet 265, then chamber 215c by pulse jet 266 and then chamber 215d by pulse jet 267. This top to bottom pulse jet sequencing facilitates pushing contamination within chamber 206 down to bottom 220, for scavenge.

C. An Example Valve/Nozzle Arrangement, FIGS. 31, 32.

Figure 31:
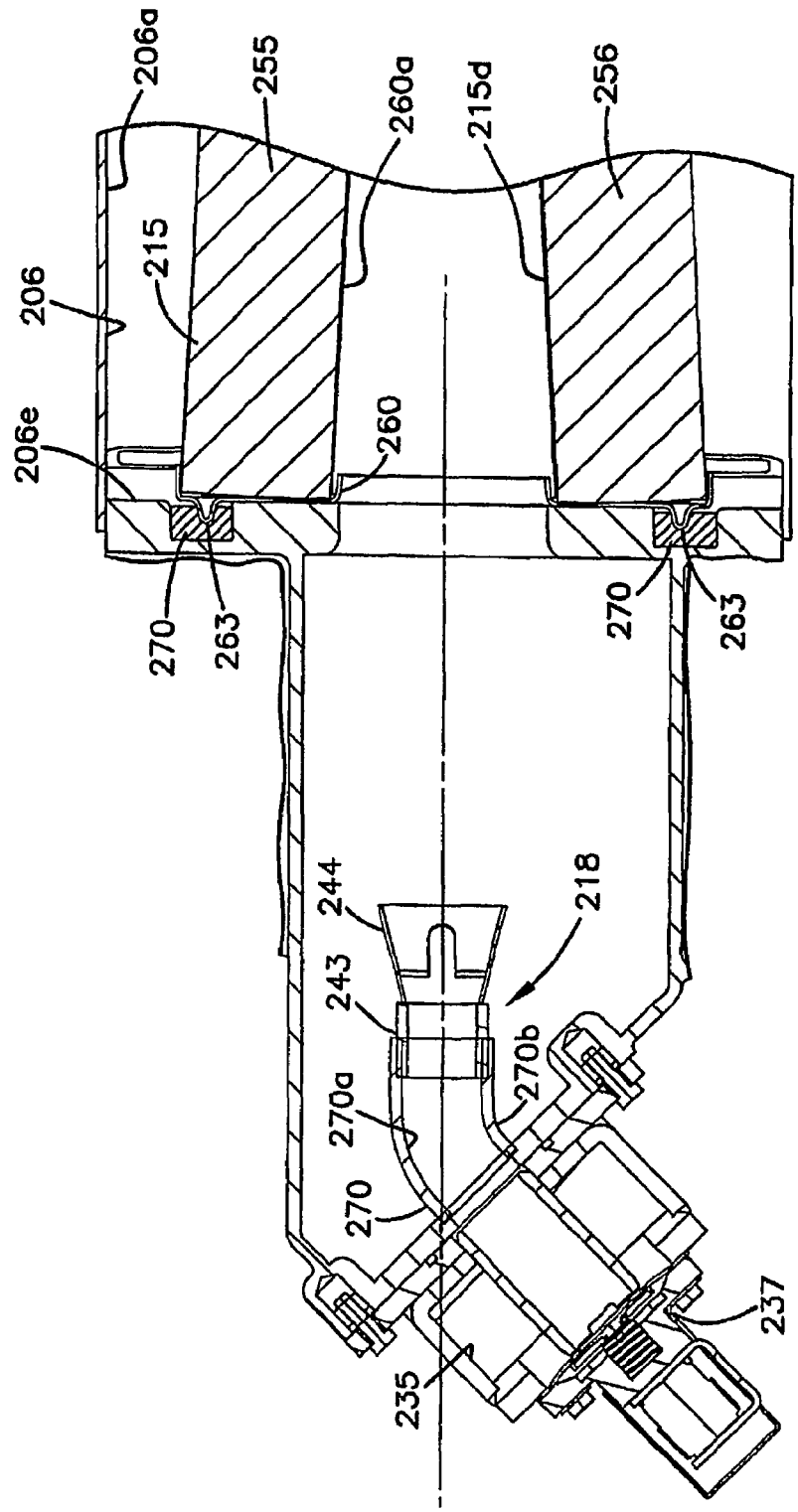
FIG. 31 is an enlarged schematic cross-sectional view of selected componentry depicted in the assembly of FIG. 25.
Figure 32:
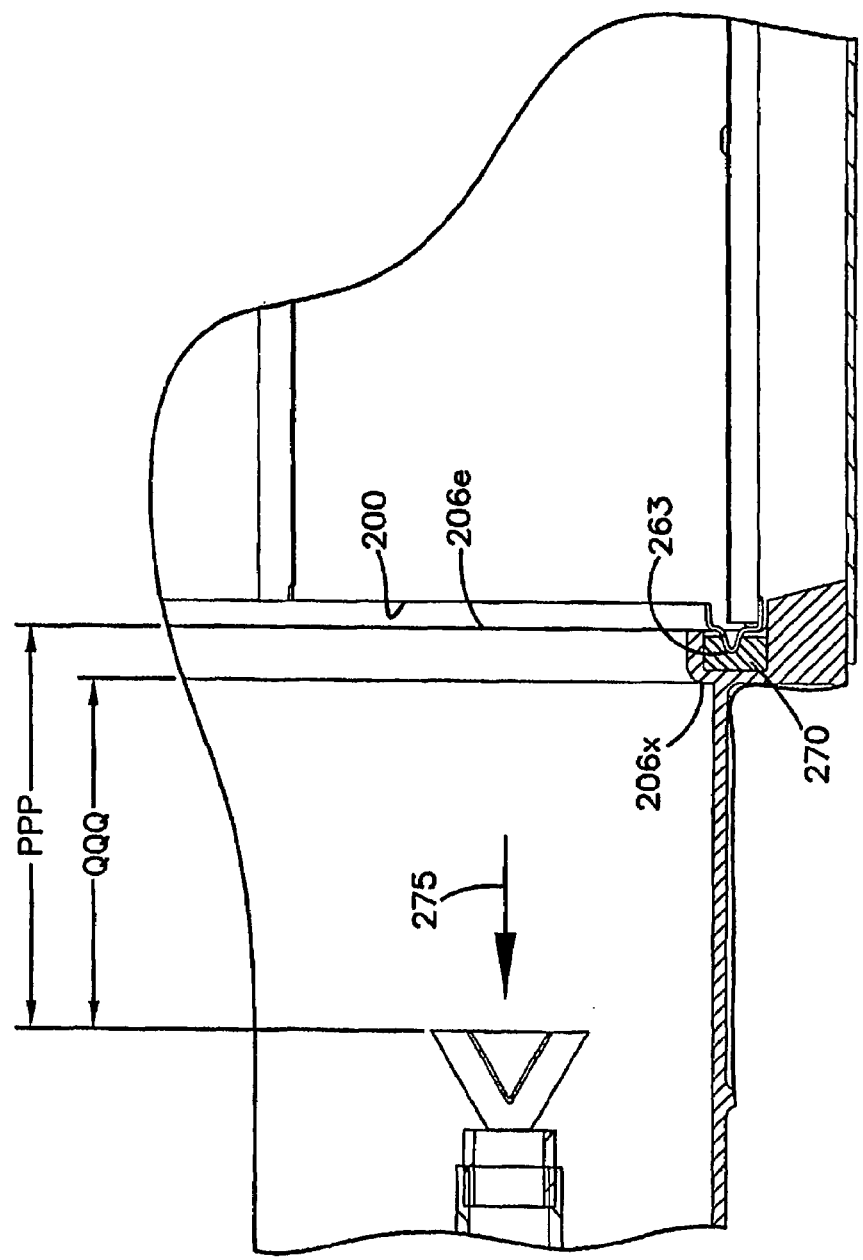
FIG. 32 is a side view of the componentry depicted in FIG. 31.

FIG. 31 is a fragmentary view of the assembly 201, the cross-sectional view being taken perpendicularly to the height dimension of the cartridge 215, FIG. 32.

FIG. 32 is an enlarged fragmentary cross-sectional view of a portion of FIG. 25, particularly a portion related to the lowest member of the pulse jet assembly, shown in FIG. 25.

In FIG. 31 one can view the cartridge 215 within barrier filter stage 206, sealed against wall 206e. In particular, one can see a portion of projection 263 pressed into gasket 270, received in a portion of wall 206e. This detail is also viewable in FIG. 32.

Aperture 260 in open end piece 252 is viewable in FIG. 31. Aperture 260 provides for: (a) filtered air exit from cartridge 215 during normal filtering operation; and, (b) pulse jet entry into cartridge 215, from pulse jet arrangement 218, during a pulse jet cleaning operation.

In FIG. 31, gas exit tube 270 is shown extending from valve 237 to nozzle 243. Valve 237 is configured to selectively allow a pulse of compressed air to be fed into interior 270a of tube 270, during operation. It is noted that tube 270 is shown with a bent shape, rather than a straight tubular shape. In particular a single bend 270b is provided to form an open "L" shape is shown.

Nozzle 243 is at an end of tube 270, from which a gas pulse exits tube interior 270a and is directed to splitter 244. Splitter 244 is configured to selectively and desirably direct the pulse jet through aperture 260 and down internal region 260a of cartridge 215. The pulse jet would be directed into one of the cartridge sections 215a-215d, FIG. 25, selectively. The particular example shown in FIGS. 31 and 32, would direct the pulse into chamber 215d.

Of course the splitter 244 provides similar operation to splitter 44, FIGS. 12-14.

In FIG. 32 dimension PPP indicates the distance of splitter 244 from inlet aperture 260; and dimension QQQ indicates the distance of splitter 244 from exterior 206x of wall section 206e.

For the example shown, dimensions PPP and QQQ would be: PPP=5.75 inches (146 mm) and QQQ=5.0 inches (127 mm).

For a typical system the operating pressure and pulse would be as described previously.

D. Typical Splitter and Nozzle Configurations; FIGS. 33-36.

Figure 33:
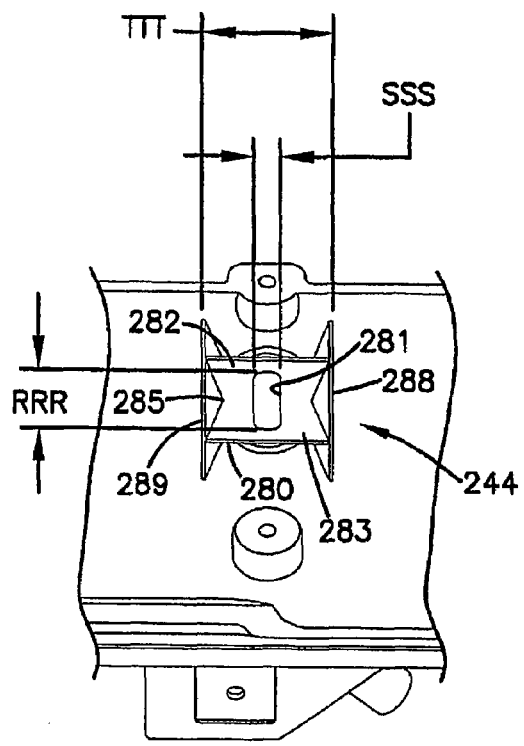
FIG. 33 is an end view of a splitter assembly useable in the componentry depicted in FIG. 31.

Attention is first directed to FIG. 33. In FIG. 33 the view is toward nozzle 244, from the position of the cartridge 215. Alternately stated, the view would be in direction of arrow 275, FIG. 32.

Referring to FIG. 33, similarly to splitter 44, FIG. 12, the splitter 244 includes a central splitter vane 280. The central splitter vane 280 includes a central aperture 281 and two sides 282, 283. The sides 282, 283 are joined at vertex 285 which is directed toward the pulse jet. Herein, interior acute angle UUU, FIG. 34, between the sides 282, 283 will generally be defined as the splitter angle. The splitter angle UUU, for typical assemblies according to the present disclosure was described earlier, as within the range of 50°-80° inclusive. Usually angle UUU is 60°, as shown for the assembly shown in FIGS. 33-36.

The central aperture 281 is generally an oblong aperture in a central portion of vane 280, with a portion of the aperture being along side 282 and another portion along side 283, the aperture thus extending across vertex 285. Alternate shaped apertures may be used.

Figure 35:
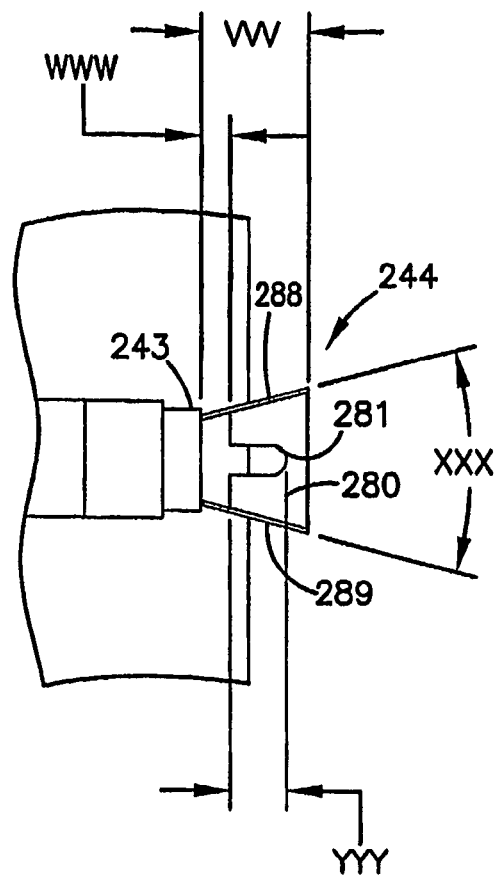
FIG. 35 is a top view of the componentry depicted in FIGS. 33 and 34.

Dimensions defining the aperture 281 are shown at SSS (FIG. 33) and YYY (FIG. 35). Examples would be: SSS=0.38 inch (9.6 mm) and YYY=0.73 inch (18.5 mm).

Figure 34:
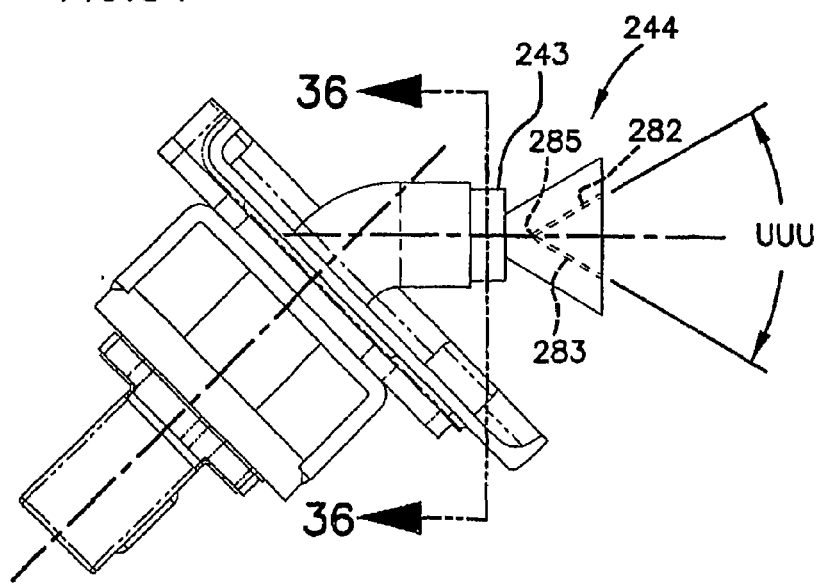
FIG. 34 is a side view of the componentry depicted in FIG. 33.

Referring to FIG. 34, as a jet pulse is received outwardly from nozzle 243 it is directed into splitter 244. A portion of the jet pulse will be split at vertex 285, to extend above vane 282 and below vane 283. This will help distribute the pulse jet within an interior region or subchamber or filter cartridge 215 into which a pulse jet is directed. Another portion of the jet pulse will pass through aperture 281, FIG. 33, as a narrow pulse, directed down the length of the associated chamber within cartridge 215. The particular splitter 244 definition provided in FIGS. 33-35, provides for a good distribution of air as part of the jet pulse through a tall narrow aperture into cartridge 215, and also through a relatively long cartridge 215.

Figure 36:
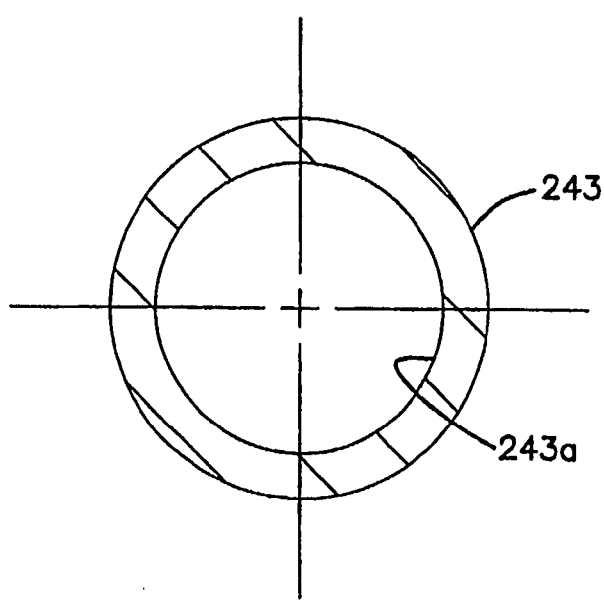
FIG. 36 is a cross-sectional view of a nozzle component of the componentry depicted in FIGS. 33-35, FIG. 36 being taken along line 36-36, FIG. 34.

Attention is now directed to FIG. 36. In FIG. 36 nozzle 243 is depicted. The nozzle 243 has a generally circular outlet 243a. This is not necessarily an optimized shape. It is possible that performance could be improved by changing the nozzle shape 243a, to a shape similar to nozzle 43, FIG. 15. For the example nozzle 243 shown, the I.D. (inside diameter) is 1.00 inch (25.4 mm) and the nozzle O.D. (outside diameter) is 1.32 inch (33.5 mm).

Referring to FIG. 33, it is noted that the splitter 244 includes side walls 288, 289 which enclose the vane 280 on opposite sides and which diverge from one another, typically at an angle XXX, FIG. 35, within the range described above for the previously described embodiment. For the example shown, XXX=29°.

The diverging side walls 288, 289 help shape the pulse jet into a form that is expanding in width as it enters the cartridge 215, to force air through the panels 255, 256.

E. The Scavenge Arrangement or System, FIGS. 23, 24, 24A and 37-39.

As indicated above with respect to FIG. 23, in general the assembly or system 201 includes a scavenger system or arrangement 211, for scavenging dust removed in the precleaner 205 and the barrier filter stage 206. Removal of dust or particulates from the precleaner 205 is shown provided by precleaner scavenge arrangement 211a, and removal of dust or other particulates from the barrier stage 206, is shown by barrier filter scavenge section 222. The scavenge system 211 is generally operated by a blower, not shown.

The scavenge 222 is configured for convenient and efficient dust or other particulate removal. This was shown in FIGS. 23 and 23A and will be further understood by reference to FIGS. 37-39.

Figure 37:
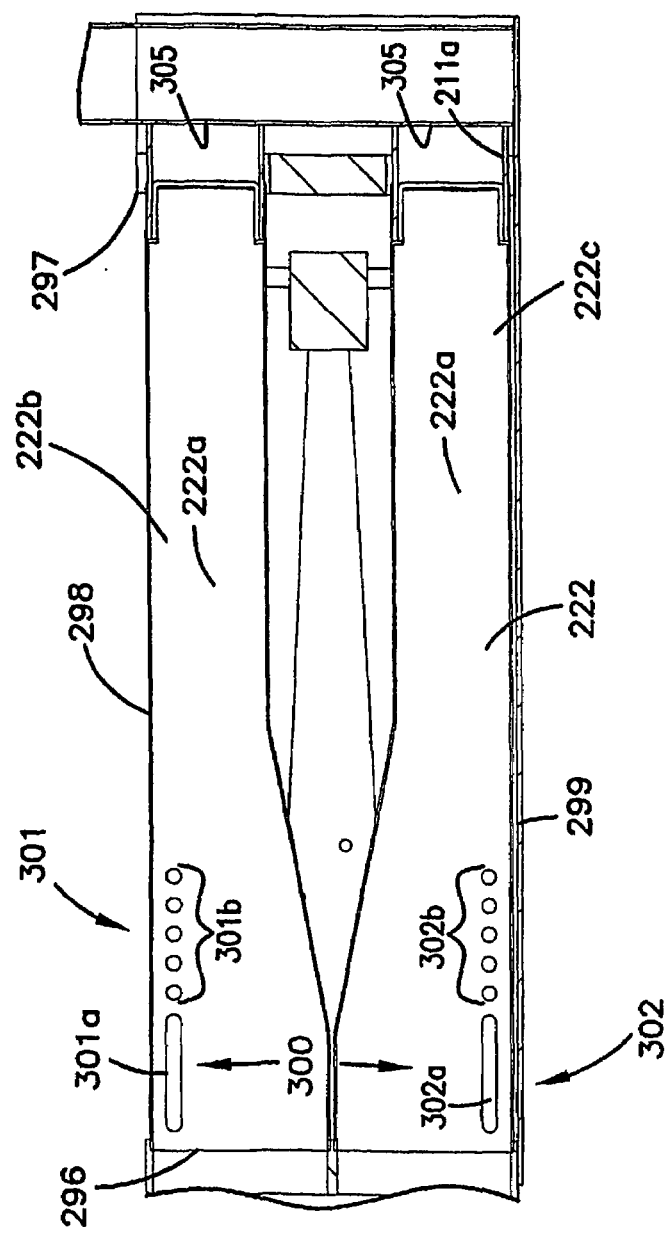
FIG. 37 is a top plan view of a scavenger arrangement for the assembly of FIG. 23.

In FIG. 37, a top plan view of the scavenge arrangement 211 is depicted, providing a view of upper surface 222a of scavenge portion 222.

Referring to FIG. 37, it can be seen that for the arrangement shown, scavenge 222 provides a bottom portion to barrier filter section 206, FIG. 23. Referring to FIG. 37, scavenge portion 222, then, includes: opposite ends 296, 297; and, opposite sides 298, 299. End 296 is generally adjacent wall 206e, to which media pack 215 is sealed, during use. Thus, for the orientation shown in FIG. 37, the pulse jet assembly 218, would be operated to provide pulse jet of air into a cartridge 215, FIG. 23, at a location above end wall 296, FIG. 37.

For the particular assembly 201 depicted, FIG. 37, it is noted that the scavenge 222 includes separate tubular sections 222b, 222c, as opposed to a single bottom surface. Of course alternatives are possible.

Still referring to FIG. 37, scavenge duct portion 222, includes a scavenge aperture arrangement 300 therein. The scavenge aperture arrangement 300 comprises an aperture arrangement or pattern through an upper surface 222a of scavenge duct portion 222. This scavenge aperture arrangement 300 allows for passage of air and particulate, drawn from lower barrier filter region 206, FIG. 23, into the scavenge system 211. For the arrangement shown, FIG. 37, aperture arrangement 300 comprises a first set of apertures 301 in duct 222b and a second set of apertures 302 in duct 222c, oriented adjacent, and spaced from, opposite sides 298, 299, respectively and positioned such that a cartridge 215, FIG. 23, positioned on surface 222, FIG. 37, would generally be positioned between the aperture arrangements 301, 302 and would not be positioned to cover or overlap the apertures of aperture arrangements 301, 302.

Aperture arrangement 301 may be generally analogous to aperture arrangement 101, FIG. 17, and aperture arrangement 302 may be generally analogous to aperture arrangement 102, FIG. 17.

Also, typically, an elongate aperture 301a is provided in aperture arrangement 301 positioned closer to wall 296 than are the remaining apertures 301b. The same is true for an elongate aperture 302a, of arrangement 302, relative to remaining apertures 302b.

The aperture pattern shown for the aperture arrangements 301, 302 is analogous to the aperture pattern shown and discussed above with respect to FIG. 17.

Figure 39:
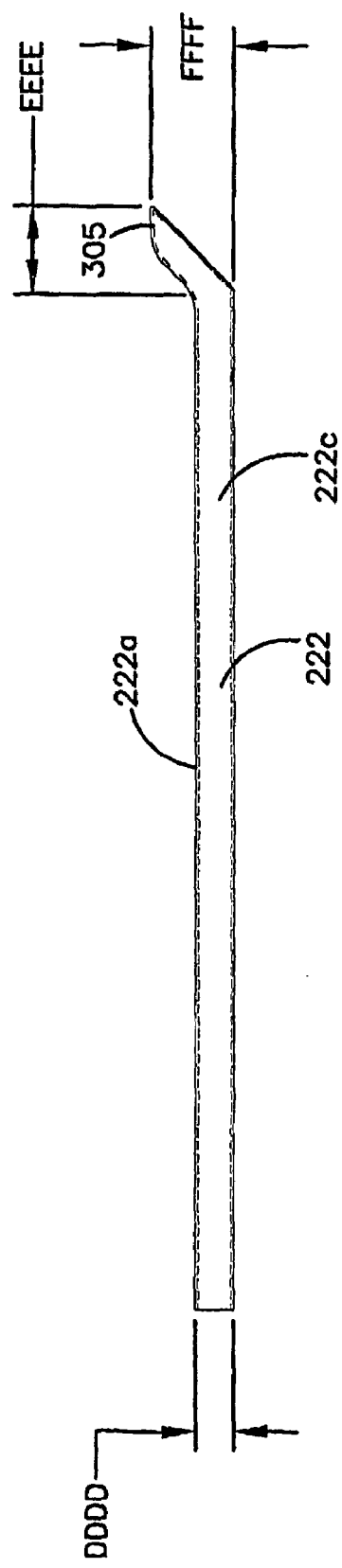
FIG. 39 is a side elevational view of a portion of FIG. 37.

Take off from the precleaner, is indicated at ends 305 of the sections 222b, 222c. Further detail regarding the ducts 222b, 222c is shown at FIGS. 38 and 39. Dimensions provided in these figures are as follows: AAAA=21.97 inches (55.8 cm); BBBB=3.09 inch (78.5 mm); CCCC=13.97 inch (354.8 mm); ZZZ=4.65 inch (118 mm); DDDD=0.87 inch (22.1 mm); EEEE=1.97 inch (50 mm); and FFFF=1.87 inch (47.5 mm).

FIG. 38A depicts a scavenger arrangement in accord with FIG. 24A and as an alternate to that depicted in FIGS. 37 and 38. Referring to FIG. 38A, scavenge 622 is depicted. Scavenge 622 would generally be used analogously to scavenge 222, discussed above. Referring to FIG. 38A, scavenge portion 622 includes: opposite ends 696, 697. End 696 is generally adjacent wall 206e, FIG. 23, to which media pack 215 is sealed, during use. Thus, when scavenge arrangement 622 is used in place of scavenge arrangement 222, the pulse jet assembly 218, FIG. 23, would be operated to provide a pulse jet of air into the cartridge 215, FIG. 23, at a location above end wall 696, FIG. 37.

For the particular scavenge 622 depicted in FIG. 38A, it is noted that scavenge 622 includes tubular sections 622b, 622c, as opposed to a single bottom surface. Of course alternatives are possible.

Referring to FIG. 38A, scavenge duct portion 622 includes a scavenge aperture arrangement 700 therein. The scavenge aperture arrangement 700 comprises an aperture arrangement or pattern through an upper surface 622a of scavenge duct portion 622. The scavenge aperture arrangement 700 allows for passage of air in particular, drawn from the lower barrier filter region 206, FIG. 23, into the scavenge system 211. For the arrangement shown, FIG. 38A, aperture arrangement 700 comprises a first set of apertures 701 in duct 622b and a second set of apertures 702 in duct 622c, oriented adjacent, and spaced from, opposite sides 698, 699, respectively, and positioned such that a cartridge 215, FIG. 23, positioned on surface 622, FIG. 37, would generally be positioned between the aperture arrangements 701, 702 and would not be positioned to cover and overlap the apertures of aperture arrangement 701, 702.

As indicated above, FIG. 38A depicts a different scavenge aperture arrangement than FIGS. 37 and 38. Referring to FIG. 38A, scavenge aperture arrangement 701 generally comprises two sets of apertures 701a and 701b. Each set of apertures includes two elongate apertures and a plurality of spaced circular apertures. For example aperture arrangement 701a comprises elongate aperture 701c and a plurality of spaced circular apertures 701d. Although alternatives are possible, elongate aperture 701c would typically have an aspect ratio (length to width) of at least 5, typically within the range of 5-10, and would often comprise at least 30% typically at least 35% and often at least 50% of the total area of apertures in aperture set 701a.

Aperture set 701b is positioned next to and spaced from aperture arrangement 701a. Aperture 701f, in set 701b, is also an elongate aperture typically having an aspect ratio of at least 5, usually within the range of 5 to 10. Aperture arrangement 701b further includes a plurality of spaced, in this instance circular, apertures 701g.

Elongate apertures 701f typically and preferably comprises at least 30% usually at least 35% and in some instances at least 50% of the total aperture area of aperture arrangement 701b.

At least 90%, typically at least 100%, of the total open aperture area for each of aperture sets 701a and 701b is preferably positioned within a distance of extension between ends 696 and end 697, of no greater than 60% and typically no greater than 50% and usually no greater than 30%, from end 696 toward end 697.

Still referring to FIG. 38A, a second aperture arrangement 702 is depicted in duct 622c. Aperture arrangement 702 may be analogous to aperture arrangement 701, and comprise a first set 702a and a second set 702b, of apertures.

Still referring to FIG. 38A, it is noted that for aperture pattern 701a, the individual apertures of set 701d are positioned on a line that extends through aperture 701c and generally parallel to side 698 in extension from end 696 toward end 697. Aperture set 710g, on the other hand, generally comprises individual apertures in a line that is angled relative to side 698, in extension from 696 toward end 697. In particular the line on which apertures of set 710g are positioned, is angled away from side 698 toward side 699, at an angle within the range of about 2 to 10°, in such extension.

It is noted that in FIG. 38A, dimensions are indicated. Example dimensions would be as follows:

A8=21.97 inch (558.0 mm); A9=3.09 inch (78.5 mm); A10=4.65 inch (118.0 mm); A11=13.97 inch (354.8 mm);

A12=0.5 inch (12.7 mm); A13=0.28 inch (7.1 mm); A14=0.31 inch×2.0 inch slot (7.9×50.8 mm); A15=0.25 inch diameter (6.4 mm diameter); A16=6.25 inch (159.0 mm); and A17=0.5 inch (12.7 mm). It is noted that the aperture pattern of FIG. 38A, relative to FIG. 38, provides for greater scavenger, in an arrangement in which there is: (a) a substantial distance between the side of the filter cartridge and the side wall of the housing, when the filter cartridge is installed; and, (b) in which the filter cartridge narrows in width, in extension from a position adjacent wall 696 toward wall 697, FIG. 38A.

Still referring to FIG. 38A, elongate aperture 701*d* and 701*f* can be characterized as positioned "side-by-side," meaning that longer dimension of each is positioned adjacent the longer dimension of the other. The same can be said for the elongate apertures of aperture arrangement 702.

In the arrangements of FIG. 38A, each elongate aperture 701*d*, 701*f* of aperture arrangement 701 comprises at least 10% of the total aperture area of aperture arrangement 701, typically each comprising at least 15% and usually at least 20% of that area. The same would be said of the elongate apertures of aperture arrangement 702 with respect to the total aperture area of arrangement 702.

Also, each of the apertures 701*d* can be characterized as smaller than any of the elongate apertures (apertures 701*c*, 701*f*) of aperture arrangement 701. For the example shown, a similar statement can be made for the smaller apertures of aperture arrangement 702.

F. Further Comments (FIGS. 23-29).

In FIGS. 23-29, the assembly 201 and its components are depicted schematically. No specific cartridge retention and lock arrangement is shown. One could be provided in an analogous manner as for the assembly of FIGS. 19-22.

III. Certain General Observations

It is noted that it is not necessary for an assembly to include all of the features described herein, to include advantages according to the present disclosure.

However, herein are schematically depicted two pulse jet air filter assemblies, with an overall set of advantageous features for operation in various types of equipment.

In general terms, a common feature of the two assemblies depicted, is that for each a v-pack filter cartridge is provided comprising first and second panel sections arranged as the size of a v-configuration with a narrow end and a wide end. In each, the first and second panel sections define an interior angle within the range of 5°-7°, inclusive. This means that the v-pack has a relatively narrow inside angle defining a narrow interior volume.

The closed end piece is positioned over the narrow end of the v-configuration, and an open end piece is positioned over the wide end of the v-configuration. By open in this context, it is meant that the open end piece includes an air flow aperture therethrough.

The air flow aperture in the two arrangements depicted, has a relatively narrow high aperture. The width to height ratio for each, is typically within the range of 0.07-0.14, inclusive.

Each filter cartridge is relatively long, typically having a length, between the open end piece and the closed end piece, within the range of 18-25 inches, inclusive (457-635 mm).

The cartridges depicted each include top and bottom frame piece extending between the closed end piece and the open end piece, and positioning the first and second panel sections therebetween. Advantageously, at least one of the top and bottom frame pieces has a loop handle member thereon.

The filter cartridges include at least one, typically at least two, and for the example shown, three, spaced dividers or divider plates positioned inside a v-pack, between the first and second panel sections. This divides the interior volume into at least two (and when three divider plates are used four) stacked regions positioned between the top and bottom frame pieces.

For the examples shown, the interior angle of the v-pack filter cartridge is within the range of 4°-10°, inclusive; more specifically 5°-7°, inclusive; and specifically within the range of 5.2°-5.9°, inclusive, and the width to height ratio for the air flow aperture is within the range of 0.08-0.13 inclusive. Further, the v-pack filter cartridge is relatively high, typically having a dimension, corresponding to a distance between the top and bottom frame pieces, within the range of 24-27 inches, inclusive (609-686 mm).

For convenience, in the example shown, the loop handle arrangements are collapsible loop handle arrangements. Further, an option is described in which each of the top and bottom plates includes a loop handle arrangement.

Another component described herein within respect to the two assemblies depicted, is a splitter arrangement configured for directing a pulse jet into a v-pack filter cartridge. The splitter arrangement is characterized as comprising a splitter vane having two sides joined at a vertex. The splitter vanes shown provide an interior angle within the range of 50°-80°, inclusive and include an air flow aperture therethrough, the air flow aperture extending across the vertex and having a portion standing through each of the two sides.

In the examples shown, the splitter vanes have an interior angle within the range of 55°-65°, inclusive, with the specific examples shown being 60°.

Further, the splitter arrangements described include first and second side wall pieces positioned with the splitter vane positioned therebetween and with a vertex extending between the side wall pieces. The first and second side wall pieces are configured to diverge outwardly from one another, in extension outwardly along the splitter vane, from the vertex; in the examples shown; the angle of divergence being within the range of 15°-35°, inclusive.

For the examples shown, the air flow aperture in the splitter vane extends, from the vertex, a distance along each vane side within the range of 0.55-0.80 inches, inclusive (14-20.3 mm) and the air flow aperture has a maximum width dimension, where it intersects the vertex, within the range of 0.33-0.43 inches, inclusive (8.4-10.9 mm). The typical aperture is somewhat oval in shape, with curved ends and straight sides, although alternatives are possible.

Also provided in the figures, with respect to the two examples shown, is an assembly including a v-pack filter cartridge operably positioned with respect to a pulse jet splitter arrangement. The v-pack filter cartridge is generally as described above, and the pulse jet splitter arrangement is generally as described above, although some variations are possible. For the two examples shown, each splitter arrangement is positioned with an end of the splitter vane remote from the vertex spaced a distance within the range of 3-6 inches, inclusive, (76-152 mm) from the air flow aperture in the v-pack filter cartridge and each splitter arrangement is positioned with a splitter vane oriented to split a portion of a pulse jet flow operably directed therethrough into a first flow portion directed toward the top frame piece of the v-pack filter cartridge, a second flow portion directed toward a bottom frame piece of the v-pack filter cartridge and a third flow portion directed through the air flow aperture in the splitter vane. This provides for a good pulse jet affect, in cleaning the associated v-pack chamber into which the pulse jet flow is directed.

Further, each of the assemblies involves a combination comprising a pulse jet splitter arrangement and nozzle for feeding a pulse jet flow into the pulse jet splitter arrangement. For each, the combination comprises a splitter arrangement generally as described above. Each includes a nozzle having a nozzle exit aperture positioned for air flow into the vertex of a splitter vane. For the first assembly described with respect to the drawings, the nozzle exit aperture depicted is non-circular and has a long dimension and a narrow dimension. Further, the nozzle exit aperture is positioned with a splitter vane vertex extending in a direction across the nozzle exit aperture in a direction of the narrow dimension and generally perpendicular to a direction of the long dimension. The second assembly described, has a circular nozzle.

For the first assembly depicted, the nozzle exit aperture has a wide dimension within the range of 0.5-0.65 inch (12.7-16.5 mm), inclusive and a longer or length dimension within the range of 1.4-1.6 inch, inclusive (35.6-40.6 mm).

Each of the assemblies described includes a barrier filter stage comprising a combination of a v-pack filter cartridge positioned in a barrier filter housing including a scavenge arrangement therein. In general the v-pack filter cartridge includes features as described herein above for a typical v-pack filter cartridge, although it is not required that all features be present in all applications. With each assembly depicted, there is provided a scavenge arrangement positioned in a bottom of the housing with a v-pack filter cartridge positioned thereon. In each instance the housing bottom can be characterized as having a first end and a second end separated by a distance Y, with the distance Y varying between the two assemblies depicted.

In general the v-pack filter cartridge is positioned with the open end piece adjacent the housing bottom first end.

In general, if the assembly is depicted, the scavenge arrangement comprises first and second scavenge aperture arrangements. The v-pack filter cartridge is positioned in the housing bottom at a location between the first and second scavenge aperture arrangements.

For each of the assemblies, the first scavenge aperture arrangement can be described as having a first total open area $X_1$ and being configured such that at least 90% of the open area of the $X_1$ is located within a distance of 50% Y across the housing bottom from the housing bottom first end toward the housing bottom second end. Preferably 100% of the open area $X_1$ is located within 50% Y across the housing bottom from the housing bottom first end toward the housing bottom second end.

For the two assemblies depicted, a second scavenger aperture is similarly configured and positioned to the first scavenge aperture arrangement.

Each of the scavenge aperture arrangements, for the examples shown, includes at least one elongate aperture having an aspect ratio (length to width ratio) of at least 5 and within the range of 5-10, inclusive. Also, in each instance the elongate aperture(s) is typically positioned within a distance of 25% Y across the housing bottom from the housing bottom first end toward the housing bottom second end. Some preferred arrangements are shown and described.

In the examples shown, each scavenge aperture arrangement comprises at least one elongate aperture and a plurality of smaller apertures. Several arrangements of smaller apertures are provided.

To advantage, each of the assemblies depicted, includes, in association with the scavenge arrangement, a blower takeoff that is positioned generally adjacent the housing bottom first end, to help ensure that scavenge air flow through the scavenge arrangement, is generally in a direction from the housing bottom second end toward the housing bottom first end, a direction generally aligned with air flow during filtering through the housing. Alternately stated, in such arrangements the scavenge air flow through the scavenge arrangement is along a path toward a location adjacent the wide, open, end of the v-pack from a location adjacent the narrow, closed, end of the v-pack.

With respect to the first assembly depicted and described in the drawings, a unique pulse jet assembly is provided which includes a compressed air accumulator having a tubular side wall, a pulse jet valve arrangement mounted on the tubular side wall; and a pulse jet flow conduit extending from the pulse jet valve arrangement through the compressed air accumulator and through the tubular side wall. For the example shown, the tubular side wall has a circular interior cross-sectional shape, and the pulse jet flow conduit has two curved sections therein, forming an "s" or "z" shape.

For the first example shown, the flow conduit has a transition portion from a region of generally circular cross-section to a flow outlet which is non-circular, and for the example shown generally rectangular with curved corners.

What is claimed is:

1. A barrier filter stage comprising a combination v-pack air filter cartridge positioned in a barrier filter housing including a scavenge arrangement wherein:
   (a) the v-pack air filter cartridge comprises:
      (i) first and second panel sections arranged as sides of a v-pack configuration with a narrow end and a wide end;
      (ii) a closed end piece positioned over the narrow end of the v-pack configuration;
      (iii) an open end piece positioned over the wide end of the v-pack configuration; and,
   (b) a scavenge arrangement positioned in a bottom of the housing with the v-pack air filter cartridge positioned thereon:
      (i) the housing bottom having a first end and a second end separated by a distance Y;
         (A) the v-pack filter cartridge being positioned with the open end piece positioned adjacent to the housing bottom first end;
      (ii) the scavenge arrangement comprising first and second scavenge aperture arrangements;
         (A) the v-pack air filter cartridge being positioned on the housing bottom at a location between the first and second scavenge aperture arrangements;
         (B) the first scavenge aperture arrangement having a first total open area $X_1$ and being configured such that at least 90% of the open area $X_1$ is located within a distance of 50% Y across the housing bottom from the housing bottom first end toward the housing bottom second end; and,
         (C) the second scavenge aperture arrangement having a second total open area $X_2$ and being configured such that at least 90% of the open area $X_2$ is located within a distance of 50% Y across the housing bottom from the housing bottom first end toward the housing bottom second end.

2. A barrier filter stage according to claim 1 wherein:
   (a) the first and second panel sections define an interior angle within the range of 5°-7°, inclusive;
   (b) the first and second panels defining an interior volume therebetween;
   (c) the open end piece defines an air flow aperture in communication with the interior volume between the first and second panels; the air flow aperture having a width to height ratio within the range of 0.07-0.14, inclusive;

(d) the interior volume has a length, between the open end piece and the closed end piece within the range of 18-25 inches, inclusive;
(e) the cartridge includes top and bottom frame pieces extending between the closed end piece and the open end piece and having the first and second panel sections therebetween; and,
(f) the cartridge includes at least one divider positioned inside of the v-pack, between the first and second panel sections, dividing the interior volume into at least two stacked regions positioned between the top and bottom frame pieces.

3. A barrier filter stage according to claim 2 including:
(a) at least two spaced dividers positioned inside of the v-pack, between the first and second panel sections, dividing the interior volume into at least three stacked regions positioned between the top and bottom frame pieces.

4. A barrier filter stage according to claim 2 wherein:
(a) the interior angle is within the range of 5.2°-5.9°, inclusive;
(b) the width to height ratio of the air flow aperture is within the range of 0.08-0.13, inclusive;
(c) the v-pack filter cartridge has a dimension, corresponding to a distance between the top and bottom frame pieces, within the range of 24-27 inches, inclusive; and,
(d) at least one of the top and bottom frame pieces has a loop handle member thereon.

5. A barrier filter stage according to claim 2 wherein:
(a) each one of the top and bottom plates includes a collapsible loop handle thereon.

6. A barrier filter stage according to claim 2 including:
(a) a splitter assembly including one splitter arrangement associated with each stacked region within the v-pack air filter cartridge; each splitter arrangement comprising:
  (i) a splitter vane having two sides joined at vertex;
    (A) the splitter vane defining an interior angle within the range of 50°-80°, inclusive; and,
    (B) the splitter vane including an air flow aperture therethrough; the air flow aperture extending across the vertex and having a portion extending through each one of the two sides; and
(b) each splitter arrangement being positioned with an end of the splitter vane remote from the vertex, spaced a distance within the range of 3 to 6 inches, inclusive, from the air flow aperture in the v-pack filter cartridge; and,
(c) each splitter arrangement being positioned with the splitter vane oriented to split a portion of a pulse jet flow operably directed therethrough into a first flow portion directed toward the top frame piece of the v-pack air filter cartridge, a second flow portion directed toward a bottom frame piece of the v-pack filter cartridge; and, a third flow portion directed through the air flow aperture in the splitter vane.

7. A barrier filter stage according to claim 1 wherein:
(a) the first scavenge aperture arrangement having a first total open area $X_1$ is configured such that 100% of the open area $X_1$ is located within a distance of 50% Y across the housing bottom from the housing bottom first end toward the housing bottom second end; and,
(b) the second scavenge aperture arrangement having a second total open area $X_2$ is configured such that 100% of the open area $X_2$ is located within a distance of 50% Y across the housing bottom from the housing bottom first end toward the housing bottom second end.

8. A barrier filter stage according to claim 7 wherein:
(a) the first scavenge aperture arrangement includes a first elongate aperture of a size corresponding to at least 35% of $X_1$, having an aspect ratio within the range of 5-10, inclusive and positioned within a distance of 25% Y across the housing bottom from the housing bottom first end toward the housing bottom second end; and,
(b) the second scavenge aperture arrangement includes a second elongate aperture of a size corresponding to at least 35% of $X_2$, having an aspect ratio within the range of 5-10, inclusive, and positioned within a distance of 25% Y across the housing bottom from the housing bottom first end toward the housing bottom second end.

9. A barrier filter stage according to claim 7 wherein:
(a) the first scavenge aperture arrangement includes two elongate apertures positioned side-by-side; and,
(b) the second scavenge aperture arrangement includes two elongate apertures positioned side-by-side.

10. A barrier filter stage according to claim 1 wherein:
(a) the first scavenge aperture arrangement includes a first plurality of apertures each smaller than any elongate aperture present; and,
(b) the second scavenge aperture arrangement includes a plurality of apertures each smaller than any elongate aperture present.

11. A barrier filter stage according to claim 1 including:
(a) a blower takeoff located closer to the housing bottom first end than to the housing bottom second end.

12. A barrier filter stage according to claim 8 wherein:
(a) the size of the first elongate aperture corresponds to at least 50% of $X_1$; and
(b) the size of the second elongate aperture corresponds to at least 50% of $X_2$.

13. A barrier filter stage according to claim 8 wherein:
(a) the aspect ratio of the first elongate aperture is within the range of 7-10; and
(b) the aspect ratio of the second elongate aperture is within the range of 7-10.

14. A barrier filter stage according to claim 1 wherein:
(a) the filter cartridge includes top and bottom frame pieces extending between the closed end piece and the open end piece and having the first and second panel sections therebetween; and,
(b) the combination includes a splitter assembly including one splitter arrangement associated with each panel section within the v-pack air filter cartridge; each splitter arrangement comprising:
  (i) a splitter vane having two sides joined at vertex;
    (A) the splitter vane defining an interior angle within the range of 50°-80°, inclusive; and
    (B) the splitter vane including an air flow aperture therethrough; the air flow aperture extending across the vertex and having a portion extending through each one of the two sides; and
(c) each splitter arrangement being positioned with the splitter vane oriented to split a portion of a pulse jet flow operably directed therethrough into a first flow portion directed toward the top frame piece of the v-pack air filter cartridge, a second flow portion directed toward a bottom frame piece of the v-pack filter cartridge; and, a third flow portion directed through the air flow aperture in the splitter vane.

* * * * *